(12) United States Patent
Yakes et al.

(10) Patent No.: US 7,711,460 B2
(45) Date of Patent: *May 4, 2010

(54) CONTROL SYSTEM AND METHOD FOR ELECTRIC VEHICLE

(75) Inventors: Christopher K. Yakes, Oshkosh, WI (US); Jon J. Morrow, Neenah, WI (US); Duane R. Pillar, Oshkosh, WI (US); Bradley C. Squires, New London, WI (US)

(73) Assignee: Oshkosh Corporation, Oshkosh, WI (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/761,996

(22) Filed: Jun. 12, 2007

(65) Prior Publication Data
US 2007/0288131 A1    Dec. 13, 2007

Related U.S. Application Data

(63) Continuation of application No. 11/113,470, filed on Apr. 25, 2005, now Pat. No. 7,277,782, which is a continuation of application No. 10/326,862, filed on Dec. 19, 2002, now Pat. No. 6,885,920, which is a continuation-in-part of application No. 09/774,981, filed on Jan. 31, 2001, now Pat. No. 6,757,597.

(60) Provisional application No. 60/342,292, filed on Dec. 21, 2001, provisional application No. 60/360,479, filed on Feb. 28, 2002, provisional application No. 60/388,451, filed on Jun. 13, 2002.

(51) Int. Cl.
*B60L 9/00* (2006.01)
*B60L 11/00* (2006.01)
*G05D 3/00* (2006.01)

(52) U.S. Cl. ............... 701/22; 701/26; 318/139

(58) Field of Classification Search ............ 701/22, 701/26; 141/1, 98, 392; 180/2.1, 65.1, 6.28, 180/53.1; 363/34; 903/943; 318/139
See application file for complete search history.

(56) References Cited

U.S. PATENT DOCUMENTS 1,951,089 A    3/1934 Fielder (Continued)

FOREIGN PATENT DOCUMENTS

BR    7808423 A    7/1979

(Continued)

OTHER PUBLICATIONS

An investigation on energy management system of CJY6470 parallel hybrid electric off-road vehicle with fuzzy logic Zhang, B.J.; Deng, Y.W.; Yu, D.J.; Vehicle Power and Propulsion Conference, 2008. VPPC '08. IEEE; Sep. 3-5, 2008 pp. 1-9; Digital Object Identifier 10.1109/VPPC.2008.4677783.*

(Continued)

*Primary Examiner*—Cuong H Nguyen
(74) *Attorney, Agent, or Firm*—Foley & Lardner LLP

(57) ABSTRACT

An electric traction vehicle is described herein which may be used to provide power to off-board electric power-consuming systems or devices. The electric traction vehicle may provide 250 kilowatts or more of three phase AC power to an off-board electric power consuming system. The electric traction vehicle may also include an electrical power storage device which can be selectively discharged to allow the vehicle to be serviced.

28 Claims, 34 Drawing Sheets

U.S. PATENT DOCUMENTS

| | | |
|---|---|---|
| 2,520,943 A | 9/1950 | Ludeman |
| 3,524,069 A | 8/1970 | Stepanov et al. |
| 3,566,717 A | 3/1971 | Berman et al. |
| 3,567,136 A | 3/1971 | Garrett |
| 3,599,722 A | 8/1971 | Davidson et al. |
| 3,669,191 A | 6/1972 | Livingston |
| 3,690,559 A | 9/1972 | Rudloff |
| 3,720,863 A | 3/1973 | Ringland et al. |
| 3,762,478 A | 10/1973 | Cummins |
| 3,764,867 A | 10/1973 | Smith |
| 3,799,284 A | 3/1974 | Hender |
| 3,840,074 A | 10/1974 | Clark |
| 3,865,209 A | 2/1975 | Aihara et al. |
| 3,966,067 A | 6/1976 | Reese |
| 4,021,704 A * | 5/1977 | Norbeck ................... 361/77 |
| 4,041,470 A | 8/1977 | Slane et al. |
| 4,088,934 A | 5/1978 | D'Atre et al. |
| 4,097,925 A | 6/1978 | Butler, Jr. |
| 4,113,045 A * | 9/1978 | Downing, Jr. .......... 180/65.245 |
| 4,162,714 A | 7/1979 | Correll |
| 4,167,247 A | 9/1979 | Sons et al. |
| 4,180,803 A | 12/1979 | Wesemeyer et al. |
| 4,196,380 A | 4/1980 | Gustavsson et al. |
| 4,196,785 A * | 4/1980 | Downing, Jr. .............. 180/6.28 |
| 4,292,531 A | 9/1981 | Williamson |
| 4,319,140 A | 3/1982 | Paschke |
| 4,336,418 A | 6/1982 | Hoag |
| 4,347,907 A * | 9/1982 | Downing, Jr. .............. 180/65.1 |
| 4,355,385 A | 10/1982 | Hampshire et al. |
| 4,423,362 A | 12/1983 | Konrad et al. |
| 4,423,794 A | 1/1984 | Beck |
| 4,444,285 A * | 4/1984 | Stewart et al. ......... 180/65.245 |
| 4,453,672 A | 6/1984 | Garnett |
| 4,453,880 A | 6/1984 | Leisse |
| 4,461,988 A | 7/1984 | Plunkett |
| 4,497,442 A | 2/1985 | Williams |
| 4,516,121 A | 5/1985 | Moriyama et al. |
| 4,535,846 A | 8/1985 | Gagliardo et al. |
| 4,542,802 A | 9/1985 | Garvey et al. |
| 4,562,894 A | 1/1986 | Yang |
| 4,583,444 A | 4/1986 | Jackson |
| RE32,140 E | 5/1986 | Tokuda et al. |
| 4,593,359 A | 6/1986 | Sadeh |
| 4,596,192 A | 6/1986 | Forster |
| 4,639,609 A | 1/1987 | Floyd et al. |
| 4,646,232 A | 2/1987 | Chang et al. |
| 4,661,714 A | 4/1987 | Satterthwaite et al. |
| 4,676,545 A | 6/1987 | Bonfilio et al. |
| 4,678,041 A | 7/1987 | Staudinger |
| 4,702,333 A | 10/1987 | Lippert |
| 4,744,218 A | 5/1988 | Edwards et al. |
| 4,774,399 A | 9/1988 | Fujita et al. |
| 4,774,811 A | 10/1988 | Kawamura |
| 4,785,513 A | 11/1988 | Lee et al. |
| 4,809,177 A | 2/1989 | Windle et al. |
| 4,809,803 A | 3/1989 | Ahern et al. |
| 4,842,326 A | 6/1989 | Divito |
| 4,843,557 A | 6/1989 | Ina et al. |
| 4,860,633 A | 8/1989 | Wiethoff et al. |
| 4,864,151 A | 9/1989 | Wyczalek et al. |
| 4,864,154 A | 9/1989 | Copeland et al. |
| 4,864,568 A | 9/1989 | Sato et al. |
| 4,881,756 A | 11/1989 | Kumasaka et al. |
| 4,894,781 A | 1/1990 | Sato et al. |
| 4,909,329 A | 3/1990 | Yoshida et al. |
| 4,941,546 A | 7/1990 | Nist et al. |
| 4,949,808 A | 8/1990 | Garnett |
| 4,953,646 A | 9/1990 | Kim |
| 4,955,443 A | 9/1990 | Bausch |
| 4,966,242 A | 10/1990 | Baillargeon |
| 4,985,845 A | 1/1991 | Goetz et al. |
| 5,025,253 A | 6/1991 | Dilullo et al. |
| 5,067,932 A | 11/1991 | Edwards |
| 5,071,307 A | 12/1991 | Carson |
| 5,081,832 A | 1/1992 | Mowill |
| 5,086,863 A | 2/1992 | Tischer |
| 5,088,573 A | 2/1992 | Moll |
| 5,091,856 A | 2/1992 | Hasegawa et al. |
| 5,092,419 A | 3/1992 | Leiber et al. |
| 5,111,901 A | 5/1992 | Bachhuber et al. |
| 5,120,282 A | 6/1992 | Fjaellstroem |
| 5,124,915 A | 6/1992 | Krenzel |
| 5,168,946 A | 12/1992 | Dorgan |
| 5,174,383 A | 12/1992 | Haugen et al. |
| 5,180,456 A | 1/1993 | Schultz et al. |
| 5,189,617 A | 2/1993 | Shiraishi |
| 5,195,600 A | 3/1993 | Dorgan |
| 5,201,629 A | 4/1993 | Simpson et al. |
| 5,205,587 A | 4/1993 | Orr |
| 5,206,572 A | 4/1993 | Farag et al. |
| 5,211,245 A | 5/1993 | Relyea et al. |
| 5,215,423 A | 6/1993 | Schulte-Hinsken et al. |
| 5,222,853 A | 6/1993 | Carson |
| 5,227,703 A | 7/1993 | Boothe et al. |
| 5,263,524 A | 11/1993 | Boardman |
| 5,264,763 A | 11/1993 | Avitan |
| 5,279,481 A | 1/1994 | Trotter et al. |
| 5,289,093 A | 2/1994 | Jobard |
| 5,291,960 A | 3/1994 | Brandenburg et al. |
| 5,300,918 A | 4/1994 | Becker |
| 5,301,756 A | 4/1994 | Relyea et al. |
| 5,301,997 A | 4/1994 | Cudden |
| 5,343,971 A | 9/1994 | Heidelberg et al. |
| 5,345,154 A | 9/1994 | King |
| 5,365,436 A | 11/1994 | Schaller et al. |
| 5,369,540 A | 11/1994 | Konrad et al. |
| 5,389,825 A * | 2/1995 | Ishikawa et al. ............ 307/10.1 |
| 5,409,425 A | 4/1995 | Shibahata |
| 5,411,100 A | 5/1995 | Laskaris et al. |
| 5,416,702 A | 5/1995 | Kitagawa et al. |
| 5,418,437 A | 5/1995 | Couture et al. |
| 5,420,828 A | 5/1995 | Geiger |
| 5,445,347 A | 8/1995 | Ng |
| 5,448,561 A | 9/1995 | Kaiser et al. |
| 5,463,992 A | 11/1995 | Swenson et al. |
| 5,470,187 A | 11/1995 | Smith et al. |
| 5,493,490 A | 2/1996 | Johnson |
| 5,504,655 A * | 4/1996 | Underwood et al. ......... 361/707 |
| 5,508,594 A | 4/1996 | Underwood et al. |
| 5,508,689 A | 4/1996 | Rado et al. |
| 5,516,379 A | 5/1996 | Schultz |
| 5,538,274 A | 7/1996 | Schmitz et al. |
| 5,553,673 A | 9/1996 | Hackman |
| 5,555,171 A | 9/1996 | Sonehara et al. |
| 5,557,257 A | 9/1996 | Gieffers |
| 5,558,588 A | 9/1996 | Schmidt |
| 5,558,589 A | 9/1996 | Schmidt |
| 5,558,595 A | 9/1996 | Schmidt et al. |
| RE35,362 E | 10/1996 | Arvidson et al. |
| 5,568,023 A | 10/1996 | Grayer et al. |
| 5,573,300 A | 11/1996 | Simmons |
| 5,575,730 A | 11/1996 | Edwards et al. |
| 5,575,737 A | 11/1996 | Weiss |
| 5,586,613 A | 12/1996 | Ehsani |
| 5,589,743 A * | 12/1996 | King ......................... 318/139 |
| 5,595,398 A | 1/1997 | Brown |
| 5,601,392 A | 2/1997 | Smith et al. |
| 5,619,412 A | 4/1997 | Hapka |
| 5,623,169 A | 4/1997 | Sugimoto et al. |
| 5,626,194 A | 5/1997 | White |
| 5,629,567 A | 5/1997 | Kumar |
| 5,629,603 A | 5/1997 | Kinoshita |
| 5,636,122 A | 6/1997 | Shah et al. |
| 5,637,933 A | 6/1997 | Rawlings et al. |

| Patent No. | Date | Inventor(s) |
|---|---|---|
| 5,638,272 A | 6/1997 | Minowa et al. |
| 5,646,510 A | 7/1997 | Kumar |
| 5,657,224 A | 8/1997 | Lonn et al. |
| 5,657,544 A | 8/1997 | Ota et al. |
| 5,669,470 A | 9/1997 | Ross |
| 5,670,845 A | 9/1997 | Grant et al. |
| 5,672,920 A | 9/1997 | Donegan et al. |
| 5,679,085 A | 10/1997 | Fredriksen et al. |
| 5,732,074 A | 3/1998 | Spaur et al. |
| 5,736,925 A | 4/1998 | Knauff et al. |
| 5,739,592 A | 4/1998 | Rigsby et al. |
| 5,754,021 A | 5/1998 | Kojima |
| 5,767,584 A | 6/1998 | Gore et al. |
| 5,779,300 A | 7/1998 | McNeilet et al. |
| 5,781,437 A | 7/1998 | Wiemer et al. |
| 5,788,158 A | 8/1998 | Relyea |
| 5,793,648 A | 8/1998 | Nagle et al. |
| 5,794,165 A | 8/1998 | Minowa et al. |
| 5,812,959 A | 9/1998 | Froeburg et al. |
| 5,813,487 A | 9/1998 | Lee et al. |
| 5,813,488 A | 9/1998 | Weiss |
| 5,819,188 A | 10/1998 | Vos |
| 5,819,201 A | 10/1998 | DeGraaf |
| 5,820,150 A | 10/1998 | Archer et al. |
| 5,827,957 A | 10/1998 | Wehinger |
| 5,828,554 A | 10/1998 | Donegan et al. |
| 5,836,398 A | 11/1998 | White |
| 5,838,251 A | 11/1998 | Brinkmeyer et al. |
| 5,839,664 A | 11/1998 | Relyea |
| 5,842,534 A | 12/1998 | Frank |
| 5,844,473 A | 12/1998 | Kaman |
| 5,845,221 A | 12/1998 | Hosokawa et al. |
| 5,848,365 A | 12/1998 | Coverdill |
| 5,851,100 A | 12/1998 | Brandt |
| 5,856,976 A | 1/1999 | Hirano |
| 5,860,479 A | 1/1999 | LaFollette |
| 5,864,781 A | 1/1999 | White |
| 5,879,265 A | 3/1999 | Bek |
| 5,880,570 A | 3/1999 | Tamaki et al. |
| 5,881,559 A | 3/1999 | Kawamura |
| 5,881,818 A | 3/1999 | Lee et al. |
| 5,884,206 A | 3/1999 | Kim |
| 5,890,080 A | 3/1999 | Coverdill et al. |
| 5,890,865 A | 4/1999 | Smith et al. |
| 5,896,418 A | 4/1999 | Hamano et al. |
| 5,899,276 A | 5/1999 | Relyea et al. |
| 5,913,210 A | 6/1999 | Call |
| 5,918,180 A | 6/1999 | Dimino |
| 5,919,237 A | 7/1999 | Balliet |
| 5,922,040 A | 7/1999 | Prabhakaran |
| 5,924,879 A | 7/1999 | Kameyama |
| 5,925,993 A | 7/1999 | Lansberry |
| 5,928,291 A | 7/1999 | Jenkins et al. |
| 5,939,794 A | 8/1999 | Sakai et al. |
| 5,945,919 A | 8/1999 | Trask |
| 5,947,855 A | 9/1999 | Weiss |
| 5,948,025 A | 9/1999 | Sonoda |
| 5,949,330 A | 9/1999 | Hoffman et al. |
| 5,950,144 A | 9/1999 | Hall et al. |
| 5,954,470 A | 9/1999 | Duell et al. |
| 5,957,985 A | 9/1999 | Wong et al. |
| 5,973,463 A | 10/1999 | Okuda et al. |
| 5,986,416 A | 11/1999 | Dubois |
| 5,987,365 A | 11/1999 | Okamoto |
| 5,995,898 A | 11/1999 | Tuttle |
| 5,997,338 A | 12/1999 | Pohjola |
| 5,998,880 A | 12/1999 | Kumar |
| 5,999,104 A | 12/1999 | Symanow et al. |
| 6,005,358 A | 12/1999 | Radev |
| 6,012,004 A | 1/2000 | Sugano et al. |
| 6,023,137 A | 2/2000 | Kumar et al. |
| 6,028,403 A | 2/2000 | Fukatsu |
| 6,029,529 A | 2/2000 | Recker et al. |
| 6,038,500 A * | 3/2000 | Weiss .................... 701/22 |
| 6,041,310 A | 3/2000 | Green et al. |
| 6,054,844 A | 4/2000 | Frank |
| 6,059,058 A | 5/2000 | Dower |
| 6,065,565 A | 5/2000 | Puszkiewicz et al. |
| 6,066,075 A | 5/2000 | Poulton |
| 6,070,538 A | 6/2000 | Flamme et al. |
| 6,088,650 A | 7/2000 | Schipper et al. |
| 6,096,978 A | 8/2000 | Pohjola |
| 6,104,148 A | 8/2000 | Kumar et al. |
| 6,105,984 A | 8/2000 | Schmitz et al. |
| 6,112,152 A | 8/2000 | Tuttle |
| 6,116,363 A | 9/2000 | Frank |
| 6,120,115 A | 9/2000 | Manabe |
| 6,123,497 A | 9/2000 | Duell et al. |
| 6,135,806 A | 10/2000 | Pohjola |
| 6,141,608 A | 10/2000 | Rother |
| 6,141,610 A | 10/2000 | Rothert et al. |
| 6,152,673 A | 11/2000 | Anderson et al. |
| 6,154,122 A | 11/2000 | Menze |
| 6,154,658 A | 11/2000 | Caci |
| 6,157,875 A | 12/2000 | Hedman et al. |
| 6,157,889 A | 12/2000 | Baker |
| 6,170,587 B1 | 1/2001 | Bullock |
| 6,182,807 B1 | 2/2001 | Saito et al. |
| 6,199,550 B1 | 3/2001 | Wiesmann et al. |
| 6,208,948 B1 | 3/2001 | Klingler et al. |
| 6,219,626 B1 | 4/2001 | Steinmetz et al. |
| 6,223,104 B1 | 4/2001 | Kamen et al. |
| 6,230,496 B1 | 5/2001 | Hofmann et al. |
| 6,232,874 B1 | 5/2001 | Murphy |
| 6,239,508 B1 * | 5/2001 | Faris et al. .................... 307/9.1 |
| 6,240,365 B1 | 5/2001 | Bunn |
| 6,243,628 B1 | 6/2001 | Bliley et al. |
| 6,244,758 B1 | 6/2001 | Solymar et al. |
| 6,246,320 B1 | 6/2001 | Monroe |
| 6,256,580 B1 | 7/2001 | Meis et al. |
| 6,263,268 B1 | 7/2001 | Nathanson |
| 6,263,269 B1 | 7/2001 | Dannenberg |
| 6,267,062 B1 | 7/2001 | Hamilton, Jr. |
| 6,281,790 B1 | 8/2001 | Kimmel et al. |
| 6,285,932 B1 | 9/2001 | De Bellefeuille et al. |
| 6,296,960 B1 * | 10/2001 | Faris et al. .................... 429/27 |
| 6,298,932 B1 | 10/2001 | Bowman et al. |
| 6,309,771 B1 * | 10/2001 | Faris et al. .................... 429/27 |
| 6,331,365 B1 | 12/2001 | King |
| 6,332,745 B1 | 12/2001 | Duell et al. |
| 6,338,010 B1 | 1/2002 | Sparks et al. |
| 6,356,826 B1 | 3/2002 | Pohjola |
| 6,370,454 B1 | 4/2002 | Moore |
| 6,387,007 B1 | 5/2002 | Fini, Jr. |
| 6,404,607 B1 | 6/2002 | Burgess et al. |
| 6,405,114 B1 | 6/2002 | Priestley et al. |
| 6,411,874 B2 | 6/2002 | Morgan et al. |
| 6,421,593 B1 | 7/2002 | Kempen et al. |
| 6,429,773 B1 | 8/2002 | Schuyler |
| 6,430,164 B1 | 8/2002 | Jones et al. |
| 6,430,488 B1 | 8/2002 | Goldman et al. |
| 6,433,442 B1 | 8/2002 | Maeckel et al. |
| 6,434,512 B1 | 8/2002 | Discenzo |
| 6,454,540 B1 | 9/2002 | Terefinko et al. |
| 6,457,655 B1 | 10/2002 | Reighard et al. |
| 6,487,717 B1 | 11/2002 | Brunemann et al. |
| 6,496,393 B1 * | 12/2002 | Patwardhan .................... 363/70 |
| 6,496,775 B2 | 12/2002 | McDonald, Jr. et al. |
| 6,501,368 B1 | 12/2002 | Wiebe et al. |
| 6,522,955 B1 | 2/2003 | Colborn |
| 6,539,296 B2 | 3/2003 | Diaz et al. |
| 6,549,827 B1 | 4/2003 | Yen |
| 6,553,290 B1 | 4/2003 | Pillar |
| 6,558,829 B1 * | 5/2003 | Faris et al. .................... 429/27 |
| 6,566,826 B2 | 5/2003 | Imai et al. |
| 6,569,555 B1 * | 5/2003 | Faris et al. .................... 429/27 |

| Patent | Date | Inventor |
|---|---|---|
| 6,580,953 B1 | 6/2003 | Wiebe et al. |
| 6,609,051 B2 | 8/2003 | Fiechter et al. |
| 6,609,108 B1 | 8/2003 | Pulliam et al. |
| 6,611,116 B2 | 8/2003 | Bachman et al. |
| 6,611,740 B2 | 8/2003 | Lowrey et al. |
| 6,611,755 B1 | 8/2003 | Coffee et al. |
| 6,615,186 B1 | 9/2003 | Kolls |
| 6,636,790 B1 | 10/2003 | Lightner et al. |
| 6,643,571 B2 | 11/2003 | Gotvall et al. |
| 6,648,367 B2 | 11/2003 | Breed et al. |
| 6,655,613 B1 | 12/2003 | Brown |
| 6,671,594 B2 | 12/2003 | Miller |
| 6,694,234 B2 | 2/2004 | Lockwood et al. |
| 6,722,458 B2 | 4/2004 | Hofbauer |
| 6,731,022 B2 * | 5/2004 | Silverman .................... 307/43 |
| 6,733,036 B2 | 5/2004 | Breed et al. |
| 6,734,645 B2 * | 5/2004 | Auerbach .................... 318/139 |
| 6,735,504 B2 | 5/2004 | Katagishi et al. |
| 6,737,822 B2 | 5/2004 | King |
| 6,755,258 B1 | 6/2004 | Hunke et al. |
| 6,757,597 B2 | 6/2004 | Yakes et al. |
| 6,761,370 B2 | 7/2004 | Colet |
| 6,795,758 B2 | 9/2004 | Sinex |
| 6,798,344 B2 | 9/2004 | Faulkner et al. |
| 6,804,587 B1 * | 10/2004 | O Connor et al. ............. 701/26 |
| 6,865,460 B2 | 3/2005 | Bray et al. |
| 6,882,917 B2 | 4/2005 | Pillar et al. |
| 6,885,920 B2 | 4/2005 | Yakes et al. |
| 6,892,131 B2 | 5/2005 | Coffee et al. |
| 6,909,944 B2 | 6/2005 | Pillar et al. |
| 6,922,615 B2 | 7/2005 | Pillar et al. |
| 6,928,358 B2 | 8/2005 | Brooks et al. |
| 6,941,202 B2 | 9/2005 | Wilson et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,034,678 B2 | 4/2006 | Burkley et al. |
| 7,072,745 B2 | 7/2006 | Pillar et al. |
| 7,107,129 B2 | 9/2006 | Rowe et al. |
| 7,127,331 B2 | 10/2006 | Pillar et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,254,468 B2 | 8/2007 | Pillar et al. |
| 7,264,350 B2 | 9/2007 | Jannard et al. |
| 7,277,782 B2 | 10/2007 | Yakes et al. |
| 7,302,320 B2 | 11/2007 | Nasr et al. |
| 7,340,260 B2 | 3/2008 | McAlexander |
| 7,379,797 B2 | 5/2008 | Nasr et al. |
| 7,392,122 B2 | 6/2008 | Pillar et al. |
| 7,397,379 B2 | 7/2008 | Richards et al. |
| RE40,663 E * | 3/2009 | Silverman .................... 307/43 |
| 2001/0016797 A1 | 8/2001 | Ogura et al. |
| 2001/0023036 A1 * | 9/2001 | Faris et al. .................... 429/27 |
| 2001/0034573 A1 | 10/2001 | Morgan et al. |
| 2001/0034656 A1 | 10/2001 | Lucas et al. |
| 2001/0044769 A1 | 11/2001 | Chaves |
| 2001/0048215 A1 | 12/2001 | Breed et al. |
| 2002/0005304 A1 | 1/2002 | Bachman et al. |
| 2002/0010643 A1 | 1/2002 | Chaves |
| 2002/0027346 A1 | 3/2002 | Breed et al. |
| 2002/0041229 A1 | 4/2002 | Satoh et al. |
| 2002/0045507 A1 | 4/2002 | Bowen |
| 2002/0049523 A1 | 4/2002 | Diaz et al. |
| 2002/0065594 A1 | 5/2002 | Squires et al. |
| 2002/0065707 A1 | 5/2002 | Lancaster et al. |
| 2002/0103580 A1 | 8/2002 | Yakes et al. |
| 2002/0111725 A1 | 8/2002 | Burge |
| 2002/0123832 A1 | 9/2002 | Gotvall et al. |
| 2002/0133273 A1 | 9/2002 | Lowrey et al. |
| 2002/0158606 A1 | 10/2002 | King |
| 2002/0175007 A1 | 11/2002 | Strong |
| 2003/0001736 A1 | 1/2003 | Lewis |
| 2003/0010399 A1 * | 1/2003 | Friebe et al. .................... 141/98 |
| 2003/0031543 A1 | 2/2003 | Heinrich-Elbrink |
| 2003/0066659 A1 | 4/2003 | Bissen et al. |
| 2003/0071523 A1 * | 4/2003 | Silverman .................... 307/150 |
| 2003/0080619 A1 | 5/2003 | Bray et al. |
| 2003/0081123 A1 | 5/2003 | Rupe |
| 2003/0085562 A1 | 5/2003 | Sparling |
| 2003/0090077 A1 | 5/2003 | Colet |
| 2003/0105565 A1 | 6/2003 | Loda et al. |
| 2003/0114965 A1 | 6/2003 | Fiechter et al. |
| 2003/0122512 A1 * | 7/2003 | Auerbach .................... 318/139 |
| 2003/0130765 A1 | 7/2003 | Pillar et al. |
| 2003/0151526 A1 | 8/2003 | Tanaka et al. |
| 2003/0156020 A1 | 8/2003 | Masuda |
| 2003/0158635 A1 | 8/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0163233 A1 | 8/2003 | Song et al. |
| 2003/0165255 A1 | 9/2003 | Yanagawa et al. |
| 2003/0171854 A1 | 9/2003 | Pillar et al. |
| 2003/0182034 A1 | 9/2003 | Katagishi et al. |
| 2003/0195680 A1 | 10/2003 | Pillar |
| 2003/0200015 A1 | 10/2003 | Pillar |
| 2003/0205422 A1 | 11/2003 | Morrow et al. |
| 2003/0230443 A1 | 12/2003 | Cramer et al. |
| 2003/0233178 A1 | 12/2003 | Sinex |
| 2004/0002794 A1 | 1/2004 | Pillar et al. |
| 2004/0019414 A1 | 1/2004 | Pillar et al. |
| 2004/0024502 A1 | 2/2004 | Squires et al. |
| 2004/0039502 A1 | 2/2004 | Wilson et al. |
| 2004/0039504 A1 | 2/2004 | Coffee et al. |
| 2004/0039510 A1 | 2/2004 | Archer et al. |
| 2004/0055802 A1 | 3/2004 | Pillar et al. |
| 2004/0069865 A1 | 4/2004 | Rowe et al. |
| 2004/0070515 A1 | 4/2004 | Burkley et al. |
| 2004/0124697 A1 | 7/2004 | MacGregor et al. |
| 2004/0129434 A1 | 7/2004 | Tan |
| 2004/0133319 A1 | 7/2004 | Pillar et al. |
| 2004/0133332 A1 | 7/2004 | Yakes et al. |
| 2004/0154715 A1 | 8/2004 | Dufournier |
| 2004/0199302 A1 | 10/2004 | Pillar et al. |
| 2004/0203974 A1 | 10/2004 | Seibel |
| 2004/0247969 A1 * | 12/2004 | Faris et al. .................... 429/27 |
| 2005/0004733 A1 | 1/2005 | Pillar et al. |
| 2005/0038934 A1 | 2/2005 | Gotze et al. |
| 2005/0050872 A1 | 3/2005 | Kempf |
| 2005/0060246 A1 | 3/2005 | Lastinger et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0131600 A1 | 6/2005 | Quiqley et al. |
| 2005/0209747 A1 | 9/2005 | Yakes et al. |
| 2005/0234622 A1 | 10/2005 | Pillar et al. |
| 2006/0201121 A1 | 9/2006 | Straka et al. |
| 2006/0226675 A1 | 10/2006 | Dunn |
| 2007/0172341 A1 | 7/2007 | Gregory |
| 2007/0251737 A1 | 11/2007 | Straka et al. |
| 2008/0027599 A1 | 1/2008 | Logan et al. |
| 2008/0100704 A1 | 5/2008 | Venetianer et al. |
| 2008/0137589 A1 | 6/2008 | Barrett |
| 2008/0297113 A1 * | 12/2008 | Saeki et al. .................... 320/128 |
| 2009/0058329 A1 * | 3/2009 | Ichikawa .................... 318/139 |
| 2009/0109049 A1 | 4/2009 | Frederick et al. |

FOREIGN PATENT DOCUMENTS

| | | |
|---|---|---|
| CA | 1115392 | 12/1981 |
| DE | 2855886 A | 6/1979 |

| | | |
|---|---|---|
| DE | 258663 A1 | 7/1988 |
| EP | 0 630 831 A1 | 12/1994 |
| EP | 0 791 506 A2 | 8/1997 |
| EP | 0 812 720 B1 | 12/1997 |
| EP | O 622 264 B1 | 11/1998 |
| EP | 0 894 739 A1 | 2/1999 |
| EP | 0 898 213 | 2/1999 |
| EP | 1 018 451 A1 | 7/2000 |
| EP | 0 805 059 B1 | 8/2000 |
| EP | 0 564 943 B1 | 6/2001 |
| EP | 1 115 264 A2 | 7/2001 |
| EP | 1 229 636 A2 | 8/2002 |
| EP | 1 424 103 A2 | 6/2004 |
| GB | 1 308 318 | 2/1973 |
| GB | 2 263 376 A | 7/1993 |
| GB | 2 302 850 A | 2/1997 |
| SE | 7813289 A | 7/1979 |
| WO | WO 93/10591 A1 | 5/1993 |
| WO | WO 93/10951 A1 | 6/1993 |
| WO | WO 95/15594 A1 | 6/1995 |
| WO | WO 96/32346 A1 | 10/1996 |
| WO | WO 96/40573 A1 | 12/1996 |
| WO | WO 97/02965 A1 | 1/1997 |
| WO | WO 98/19875 A1 | 5/1998 |
| WO | WO 98/30961 A1 | 7/1998 |
| WO | WO 99/23783 A2 | 5/1999 |
| WO | WO 00/69662 A1 | 11/2000 |
| WO | WO 00/79727 A2 | 12/2000 |
| WO | WO 01/15001 A2 | 3/2001 |
| WO | WO 01/43827 A1 | 6/2001 |
| WO | WO 01/54939 A2 | 8/2001 |
| WO | WO 03/055714 A1 | 7/2003 |
| WO | WO 03/059455 A2 | 7/2003 |
| WO | WO 03/060831 A2 | 7/2003 |
| WO | WO 03/061235 A2 | 7/2003 |
| WO | WO 03/093046 A2 | 7/2003 |
| WO | WO 03/093046 A3 | 11/2003 |
| WO | WO 2004/052756 A1 | 6/2004 |
| WO | WO 2004/102105 A1 | 11/2004 |
| WO | WO 2005/030614 A1 | 4/2005 |

OTHER PUBLICATIONS

Recent status and future prospects of integrated starter-generator based hybrid electric vehicles; Peng Zhang; Williamson, S.S.; Vehicle Power and Propulsion Conference, 2008. VPPC '08. IEEE; Sep. 3-5, 2008 pp. 1-9; Digital Object Identifier 10.1109/VPPC.2008.4677707.*

A Multi Objective Fuzzy-Based Controller for Front Differential Vehicles by Electrical Traction System on Non-Driven Wheels Naderi, P.; Bathaee, S.M.T.; Hosseinnezhad, R.; Wireless Communications, Networking & Mobile Computing, 2008. WiCOM '08. 4th International Conf. on; Oct. 12-14, 2008 pp. 1-10;Digital Object Identifier 10.1109/WiCom.*

Supply adequacy mechanisms and cross-border contracts in the Central American regional electricity market; Karacsonyi, K.; Tinoco M.; Rios R.; Montoya, F.; Power Engineering Society General Meeting, 2006. IEEE; 0-0 0 pp. 8 pp. Digital Object Identifier 10.1109/PES.2006.1708976.*

Development of a mathematical model of a train in the energy point of view for the international conference on control, automation and systems 2007 (ICCAS 2007)Daeki Hong; Hyeongcheol Lee; Jaeho Kwak; Control, Automation and Systems, 2007. ICCAS '07. International Conference on; Oct. 17-20, 2007 pp. 350-355;Digital Object Identifier 10.1109/I.*

Hybrid and Electric Automotive Systems: Combined Electrical, Mechanical, and Fuel Cell Opportunities for Personal Transportation; Krein, P.T.; Power Electronics Systems and Applications, 2006. ICPESA '06. 2nd International Conference on Nov. 12-14, 2006 pp. 139-143; Digital Object Identifier 10.1109/PESA.2006.343086.*

On the Subject of Solar Vehicles and the Benefits of the Technology; Connors, J.; Clean Electrical Power, 2007. ICCEP '07. International Conference on; May 21-23, 2007 pp. 700-705; Digital Object Identifier 10.1109/ICCEP.2007.384287.*

Power distribution systems for future homes; Po-Wa Lee; Yim-Zhu Lee; Bo-Tao Lin; Power Electronics and Drive Systems, 1999. PEDS '99. Proceedings of the IEEE 1999 International Conference on; vol. 2, Jul. 27-29, 1999 pp. 1140-1146 vol. 2; Digital Object Identifier 10.1109/PEDS.1999.792869.*

Comparative Study of Fuel-Cell Vehicle Hybridization with Battery or Supercapacitor Storage Device; Thounthong, P.; Chunkag, V.; Sethakul, P.; Davat, B.; Hinaje, M.; Vehicular Technology, IEEE Transactions on, vol. 58, Issue 8, Oct. 2009 pp. 3892-3904; Digital Object Identifier 10.1109/TVT.2009.2028571.*

Special Section on Vehicular Energy-Storage Systems; Khaligh, A.; Miraoui, A.; Garret, D.; Vehicular Technology, IEEE Transactions on; vol. 58, Issue 8, Oct. 2009 pp. 3879-3881; Digital Object Identifier 10.1109/TVT.2009.2029194.*

Advanced Integrated Bidirectional AC/DC and DC/DC Converter for Plug-In Hybrid Electric Vehicles; Young-Joo Lee; Khaligh, A.; Emadi, A.; Vehicular Technology, IEEE Transactions on; vol. 58, Issue 8, Oct. 2009 pp. 3970-3980 Digital Object Identifier 10.1109/TVT.2009.2028070.*

Influence of Battery/Ultracapacitor Energy-Storage Sizing on Battery Lifetime in a Fuel Cell Hybrid Electric Vehicle; Schaltz, E.; Khaligh, A.; Rasmussen, P.O.; Vehicular Technology, IEEE Transactions on; vol. 58, Issue 8, Oct. 2009 pp. 3882-3891; Digital Object Identifier 10.1109/TVT.2009.2027909.*

Novel Concepts for Integrating the Electric Drive and Auxiliary DC-DC Converter for Hybrid Vehicles; Plesko, H.; Biela, J.; Luomi, J.; Kolar, J.W.; Power Electronics, IEEE Transactions on; vol. 23, Issue 6, Nov. 2008 pp. 3025-3034 Digital Object Identifier 10.1109/TPEL.2008.2005384.*

A Hybrid Fuel Cell Power System; Ke Jin; Xinbo Ruan; Mengxiong Yang; Min Xu; Industrial Electronics, IEEE Transactions on vol. 56, Issue 4, Apr. 2009 pp. 1212-1222; Digital Object Identifier 10.1109/TIE.2008.2008336.*

A. Zuckerberger et al., Single-phase matrix converter, IEE Proceedings of Electric Power Applications, vol. 144, Issue 4, Jul. 1977, pp. 235-240.

Zajac et al., Harmonic distortion caused by suburban and underground rolling stock with DC . . . , Technical Proceedings of Power Electronics Congress, 1996, IEEE International CIEP'96, Oct. 14-17, 1996, pp. 200-206.

Zamora et al., IOnfluence of faults in electric railway systems, Power Electronics, Machines and Drives, 2004, Second International Conf. PEMD 2004 (Conf. Publ. No. 98) vol. 2, Mar. 31-Apr. 2, 2004, pp. 504-409.

H., Weiss, Elimination of the 162/3 Hz, 15 kV main transformer on electric traction vehicle, Proceedings of the European conference on Power Electronics and Application, 1985, pp. 5/83-5/88.

Rentmeister et al., Electrical traction vehicle with 400 Hz transformer, Proceedings of the International conference on Electric machines, Lausanne, Switzerland, 1984, pp. 1142-1144.

Hemmer et al., Recommendations for the calculation of the total disturbing return current from electric traction vehicles, IEEE Transactions on power delivery, vol. 19, No. 3, Jul. 2004, pp. 1190-1197.

R.J. Hill, Electric railway traction, Power Engineering Journal, Feb. 1994, pp. 47-56.

S. Brillante et al., Validation of the analytical model of an electric railway tranction line, in Proc. Int. Conf. Metrology, Jerusalem, Israel, May 16-18, 2002, pp. 355-360.

Advanced Wireless Technology for CAN and DeviceNet, available at www.matrric.com, Apr. 2003, 1 page, Pennsylvania, United States of America.

Aircraft Internal Time Division Multiplex Data Bus, MIL STD 1553 (USAF), Aug. 30, 1973, 29 pgs.

Annex to Form PCT/ISA/206 Communication Relating to the Results of the Partial International Search, International Application No. PCT/US/02/40760, dated Oct. 13, 2003, 2 pgs.

AssetVision Brochure, printed on Aug. 8, 2001, 3 pgs.

AssetVision Product Specification Preliminary, Wireless Link, revised date May 18, 1999, 63 pgs.

Barraco Klement, M.A., Agile Support Project—Global Hawk Program, Jan.-Feb. 1999, pp. 66-70 (5 pgs.).

Bose et al., High Frequency AC vs. DC Distribution System for Next Generation Hybrid Electric Vehicle, Industrial Electronics, Control and Instrumentation, Proceedings of the 1996 IEEE IECON 22nd International Conference on Taipei, Taiwan, Aug. 5-10, 1996, pp. 706-712 (7 pgs.), New York, NY.
CADEC Corporation, Onboard Computer—Mobius TTS Smarter Mobile Logistics on the Road, Londonderry, NH, estimated date obtained of Aug. 8, 2001, 4 pgs.
Caterpillar, Technology Products, printed on Aug. 8, 2001, 2 pgs.
Correspondence from European Patent Office regarding European Patent Application No. 04816888.4, dated Oct. 26, 2007, 3 pgs.
Correspondence from Sonn & Partner regarding European Patent Application No. 04816888.4, dated Oct. 31, 2007, 4 pgs.
Crash Rescue Equipment Service, Inc., Snozzle S2000 CA Series (Auto Controls and Clash Point Protection) Operational Features, 2002, 13 pgs.
Crash Rescue Equipment Service, Inc., Price Schedule, Snozzle Model C 50, Mar. 15, 1995, 4 pgs.
Crash Rescue Equipment Service, Inc., Snozzle Model C 50A Operational Features, May 6, 2003, 7 pgs.
Crash Rescue Equipment Service, Inc., Snozzle Model P 50 Operational Features, May 6, 2003, 9 pgs.
Crash Rescue Equipment Service, Inc., Snozzle S2000 C Series Operational Features, May 6, 2003, 12 pgs.
Dana Corporation, Dana Spicer Central Tire Inflation System Specifications, May 2000, 2 pgs, Kalamazoo, Michigan.
Dearborn Group Technology, Dearborn Group Puts Wireless Vehicle Connectivity in Customers Hands, Mar. 3, 2001, 3 pgs.
DriverTech, Inc., DriverTech—Features, printed on Jul. 29, 2003, 1 page.
DriverTech, Inc., DriverTech—Functional Specifications, printed on Jul. 29, 2003, 5 pgs.
DriverTech, Inc., DriverTech—Hardware & Software, printed on Jul. 29, 2003, 3 pgs.
DriverTech, Inc., DriverTech—Wireless IP Based Fleet Management System, printed on Jul. 29, 2003, 2 pgs.
GEESINK NORBA Group, Instruction and Parts Manual, Machine type: GCB 1000 SPLIT, May 23, 2002, 80 pgs., 80 pgs.
GEESINK NORBA Group, Instruction and Parts Manual, Machine type: GPM Ile, Jul. 10, 2002, 74 pgs.
GEESINK NORBA Group, Instruction Manual for the Training AS-i bus, Aug. 2002, Version 3.0, 31 pgs.
Griffin, J., Look, up in the sky . . . it's . . . it's a . . . fleet management satellite! American Rental Association, MobileNet, printed on Aug. 8, 2001, copyright marked 2000, 4 pgs.
HGI Wireless Inc., HGI Wireless Products and Services, Product and Services, Product Summary HGI Wireless Inc.; printed on Aug. 8, 2001, copyright marked as 2001, 2 pgs.
I.D. Systems, Inc., I.D. Systems | Products Gallery, The I.D. Systems Product Gallery, printed on Aug. 8, 2001, 3 pgs.
IBM Press room, IBM Service After Sales Solutions Open Lucrative New Customer Service Markets for Manufacturers and Service Organizations, Press Release, White Plains, NY, Jun. 26, 2001, 2 pgs.
International Search Report and Written Opinion for International Application No. PCT/US2004/031216, dated Oct. 31, 2005, 13 pgs.
Intertrak Tracking Services, LLC., Home Page, An Introduction to InterTrak, printed on Aug. 8, 2001, copyright marked as 2001, 3 pgs.
Khan, I. A., Automotive Electrical Systems: Architecture and Components, Digital Avionics Systems Conference, 1999, IEEE pp. 8.C.5 1-8.C.5 10 (10 pgs.).
Luka et al., Mobile Diagnosis, Vehicle Electronics Conference, IVEC 99, proceedings of the IEEE International Changchun, China, Sep. 6-9, 1999, 6 pgs.
MATRIC, Wireless CAN Bridge CB 300, Apr. 10, 2002, 20 pgs.
Miltope Receives $13.5 Million Order for Sport, Jan. 25, 2000, 1 page, Montgomery, Alabama.
Miltope Receives $16 Million Defense System Integration Award, PRNewswire, Mar. 26, 2000, 1 page.
Mobilenet, Customer Applications, Benefits of Monitoring and Tracking of Heavy Equipment: MobileNet, printed on Aug. 8, 2001, marked as copyright 2000, 2 pgs.
Mobilenet, FAQ, Global Asset Monitoring, printed on Aug. 8, 2001, copyright marked as 1999, 2 pgs.
Mobilenet, Interests, Global Remote Asset Monitoring, printed on Aug. 8, 2001, copyright marked 2000, 2 pgs.
Mobilenet, Mobile Workstation, MobileNet Mobile Workstation, printed on Aug. 8, 2001, copyright marked 2000, 2 pgs.
Mobilenet, MobilEmail, MobileNet MobilEmail, printed on Aug. 8, 2001, copyright marked 2000, 2 pgs.
Mussaf, J. S., The Space Shuttle Clickable Map, Retrieved from the Internet: http://web.archive.org/web/2001040101, Apr. 1, 2001, 24 pgs.
Namuduri et al., High Power Density Electric Drive for a Hybrid Vehicle, Applied Power Electronics Conference and Exposition, Feb. 15, 1998, pp. 34-40 (7 pgs.).
Nathanson M., Vehicle Intelligence and Remote Wireless OBD, SAE Technical Paper, Dec. 4-6, 2000, 15 pgs.
Nissan Motor Philippines, Inc., Project, RADIX Systems Service Corporation, printed on Aug. 8, 2001, copyright marked 2000, 1 page.
Office Action for U.S. Appl. No. 10/972,085, dated Jun. 19, 2009, 14 pgs.
Smith et al., Coming to a multiplex near you, WasteAge.com, Fire Chief, Feb. 1, 2003, 5 pgs.
Vetronix Corporation, CarPort—The Only Link Between the Auto and the PC, available at http://www.vetronix.com/telematics/carport/description.html, printed on Jul. 30, 2003, 1 page.
Vetronix Corporation, CarPort by Vertronix, User's Guide Version 1.0, Nov. 1999, 40 pgs.
Cadec Corporation, Products—CMS Products, CMS Products, printed on Aug. 8, 2001, copyright marked 2001, 6 pgs.
Cadec Corporation, Products—Mobius TTS, Mobius TTS/Onboard Computer, printed on Aug. 8, 2001, copyright marked 2001, 2 pgs.
Cadec Corporation, Products—Mobius TTS, Mobius TTS, printed on Aug. 8, 2001, copyright marked 2001, 3 pgs.
Cadec Corporation, Products Overview, The Right Stuff for 25 Years, printed on Aug. 8, 2001, copyright marked 2001, 2 pgs.
Caterpillar, Technology Products—MineStar, Minestar, printed on Aug. 8, 2001, 2 pgs.
Caterpillar, Technology Products—VIMS, Technology Products, printed on Aug. 8, 2001, 2 pgs.
Miltope Corporation, Sport Ad and Technical Specifications Sheet, 2 pgs.
Mobilenet, Products, MobileNet Products, printed on Aug. 8, 2001, copyright marked 2000, 2 pgs.
Office Action for U.S. Appl. No. 11/927,363, dated May 29, 2009, 5 pgs.
Office Action for U.S. Appl. No. 11/929,868, dated Jun. 15, 2009, 6 pgs.
Office Action for U.S. Appl. No. 11/944,308, dated Jul. 22, 2009, 13 pgs.
Office Action from the Austrian Patent Office related to a turret targeting system and method for a fire fighting vehicle, stamped Aug. 2, 2004 (6 pgs. including original and English translation).
Oshkosh Truck Corporation, HEMTT—Heavy Expanded Mobility Tactical Truck M977 Series Truck, Mar. 2000, 12 pgs.
Oshkosh Truck Corporation, LHS Decontamination Mission Module, 2 pgs.
Oshkosh Truck Corporation, LVS—Logistic Vehicle System (MK48 Series), 6 pgs.
Oshkosh Truck Corporation, M1070F Heavy Equipment Transporter & Trailer, Sep. 2001, 8 pgs.
Oshkosh Truck Corporation, M1977 CBT (Common Bridge Transporter), 2 pgs.
Oshkosh Truck Corporation, Medium Tactical Vehicle Replacement, Aug. 2000, 6 pgs.
Oshkosh Truck Corporation, MTVR Dump Body Variant (Medium Tactical Vehicle Replacement), Sep. 2001, 2 pgs.
Oshkosh Truck Corporation, MTVR Wrecker Variant (MK36 Wrecker Recovery Vehicle), Sep. 2001, 2 pgs.
Oshkosh Truck Corporation, Oshkosh Demonstrates ProPulse, the First Electric Hybrid Drive Heavy Defense Truck, Feb. 27, 2000, 2 pgs.
Oshkosh Truck Corporation, Oshkosh Receives Federal Government Funding to Develop ProPulse Alternative Drive System for Military Trucks, Aug. 31, 2001, 2 pgs.

Oshkosh Truck Corporation, Oshkosh Showcases ProPulse Hybrid Electric System at Major Defense Exhibition, Oct. 21, 2002, 1 page.

Oshkosh Truck Corporation, Oshkosh Truck and Ohio State University Design Robotic Vehicle to Compete in Desert Race, Feb. 11, 2004, 2 pgs.

Oshkosh Truck Corporation, Oshkosh Truck Awarded Contract for U.S. Army Future Tactical Truck Concepts and Technology Evaluations, Dec. 2, 2003, 2 pgs.

Oshkosh Truck Corporation, Oshkosh Truck Rolls Out Next Generation of Command Zone Advanced Electronics System to Military Market, Oct. 21, 2002, 2 pgs.

Oshkosh Truck Corporation, Oshkosh Truck's Robotic Truck Qualifies for Pentagon's $1 Million Desert Race, Mar. 12, 2004, 2 pgs.

Oshkosh Truck Corporation, Palletized Load System (PLS)—Concrete Mobile Mixer Module, 2 pgs.

Oshkosh Truck Corporation, Palletized Load System (PLS)—Potable Water Distributor Module, 2 pgs.

Oshkosh Truck Corporation, The One to Count on Through Hell and High Water, Sep. 2000, 4 pgs.

Rajashekara, K., History of Electric Vehicles in General Motors, Industry Applications Society Annual Meeting, Oct. 2-8, 1993, pp. 447-454, 8 pgs.

Reitzner et al., Options and risks—PDAs in the automotive area, Aug. 2001, 3 pgs.

RM Michaelides Software & Electronic Corp., RM CANview Bluetooth/TCP/IP, Nov. 19, 2002, 2 pgs.

Shalabi, L., Equipment Tracking—A New Asset Management Method, Equipment Today, Oct. 1999, 3 pgs.

Skibinski et al., Internet-based Vehicle Communication Network, SAE Technical Paper Series, Dec. 4-6, 2000, 8 pgs.

STE/ICE R Design Guide for Vehicle Diagnostic Connector Assemblies, Report No. CR 82 588 003 Rev 1 Feb. 1988, 182 pgs.

Top 100, Construction Equipment's editors pick the 100 most significant product introductions of the year, Construction Equipment Magazine, Dec. 1999, 1 page.

TRAKPAK2000, The TrakPak 2000—A Self-Contained Mobile Tracking Unit, printed on Aug. 8, 2001, copyright marked 2000, 2 pgs.

Trimble Information Services, Trimble Information Services Power the Transformation of Location Data . . . into Location Information printed on Aug. 8, 2001, 4 pgs.

Trimble Navigation Limited, Telvisant Fleet Management—The Concrete Solution, Mar. 2002, 2 pgs.

Trimble Navigation Limited, Telvisant Ready Mix Industry Plan: maximize your ready mix fleet operation, 2004, 2 pgs.

Trimble Navigation Limited, Trimble and McNeilus Enhance Televisant Fleet Management System for the Ready Mix Market, Feb. 4, 2003, 2 pgs.

Trimble Navigation Limited, Trimble and McNeilus Form Alliance to Factory Install Fleet Management Solutions on Ready Mix Concrete Trucks, Mar. 19, 2002, 2 pgs.

Vermeer Deal, MobileNet asset monitoring system selected by Vermeer Manufacturing Company Nov. 1, 1999, 2 pgs, Alpharetta, GA,.

Vetronix Corporation, Telematics Diagram, printed on Jul. 30, 2003, 1 page.

Vetronix Corporation, Vehicle Internet Port (VIP)—Internet Access System for AutoPC, printed on Jul. 30, 2003, 1 page.

Vetronix Corporation, Vehicle Internet Port (VIP) System Description, printed on Jul. 30, 2003, 2 pgs.

Vetronix Corporation, WirelessRoad Fleet Management System, printed on Jul. 30, 2003, 2 pgs.

Vetronix Corporation, WirelessRoad Frequently Asked Questions, printed on Jul. 30, 2003, 2 pgs.

Vetronix Corporation, WirelessRoad System Description, printed on Jul. 30, 2003, 5 pgs.

Welcome to Modular Mining Systems, Inc.—Products, Products—Dispatch Systems for Open Pit Mines, printed on Aug. 8, 2001, copyright marked 1996-2001, 1 page.

Welcome to Modular Mining Systems, Inc.—Products, Products—Vehicle Health Systems (VHS), printed on Aug. 8, 2001, 1 page.

Wireless Data—Introduction, printed on Aug. 8, 2001, 7 pgs.

Wireless Link Corporation—News Room, CSI Wireless Receives $7M Order from InterTrak, Jan. 9, 2001, 3 pgs.

Woodard, S. Computer Diagnoses Vehicle Deficiencies, Fort Jackson Leader, Jul. 26, 2002, 2 pgs.

Wright et al., Oshkosh Trucks—75 Years of Specialty Truck Production, Motorbooks International Publishers & Wholesalers, 1992, pp. 119-126, 10 pgs.

* cited by examiner

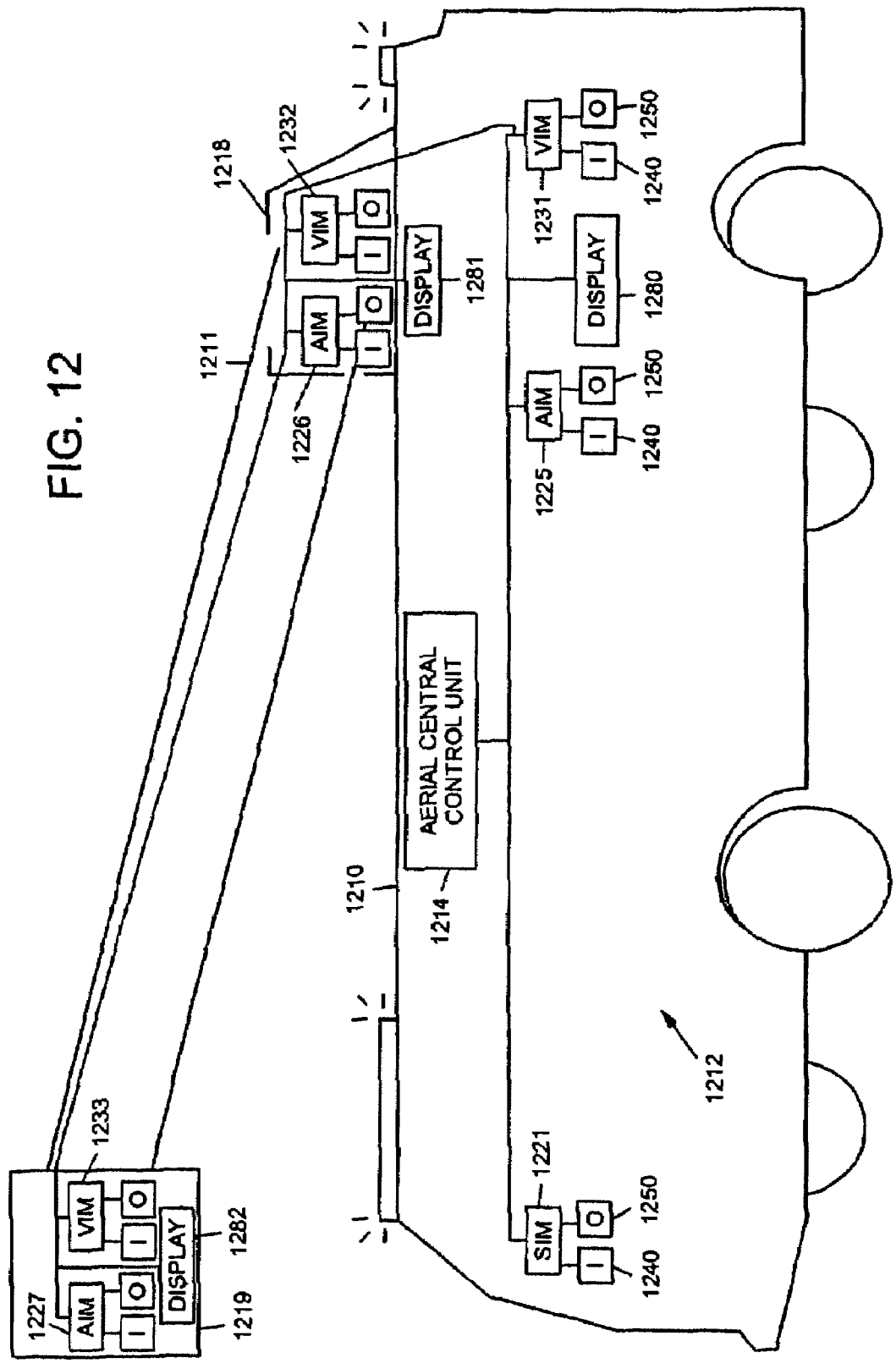

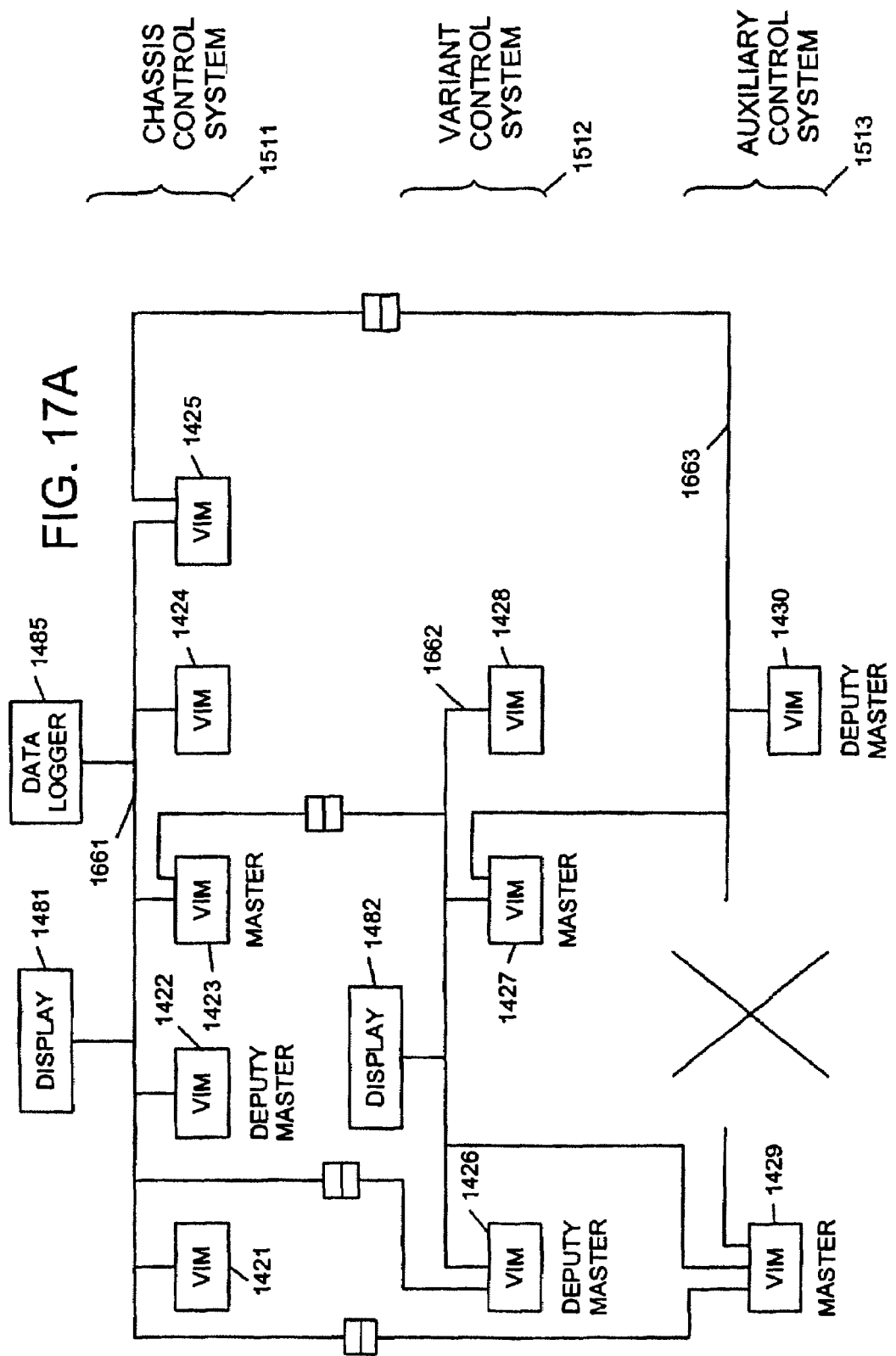

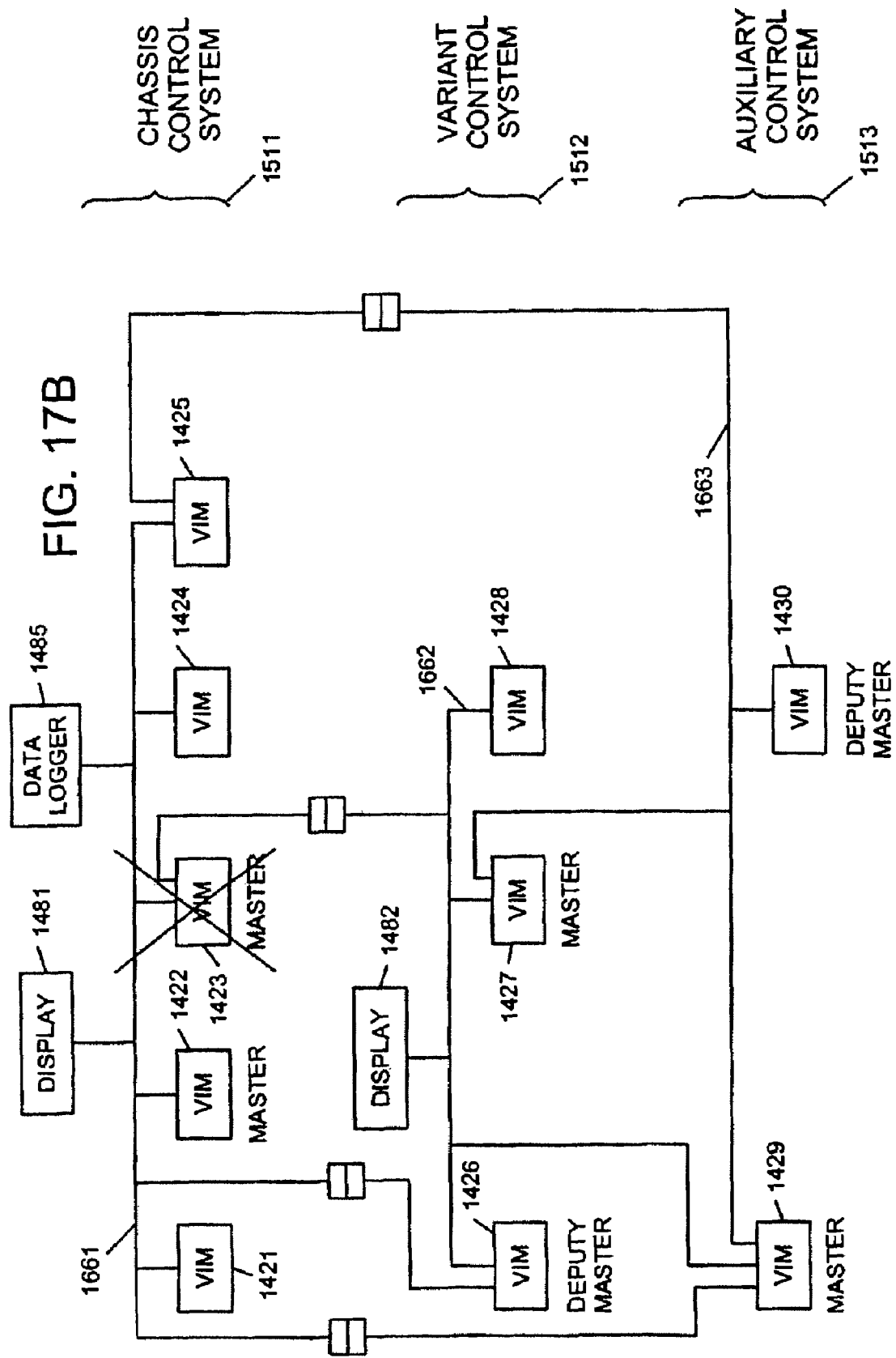

| STATE | INPUT #1 | INPUT #2 | OUTPUT #1 | OUTPUT #2 |
|---|---|---|---|---|
| 1 | OFF | OFF | OFF | OFF |
| 2 | OFF | ON | ON | ON |
| 3 | ON | OFF | OFF | OFF |
| 4 | ON | ON | OFF | OFF |
| 5 | OFF | ? | ON | OFF |
| 6 | ON | ? | OFF | OFF |
| 7 | ? | ON | OFF | OFF |
| 8 | ? | OFF | OFF | OFF |
| 9 | ? | ? | OFF | OFF |

| I-11 | I-12 | I-13 | I-14 | I-15 | IM-11 | O-11 | O-12 | O-13 |
|------|------|------|------|------|-------|------|------|------|
| O-14 | O-15 | I-21 | I-22 | I-23 | I-24  | I-25 | IM-21 | IM-22 |
| O-21 | O-22 | O-23 | O-24 | O-25 | I-31  | I-32 | I-33 | I-34 |
| I-35 | O-31 | O-32 | O-33 | O34  | O-35  | I-41 | I-42 | I-43 |
| I-44 | I-45 | IM-41 | O41 | O-42 | O-43  | O-44 | O-45 | I-51 |
| I-52 | I-53 | I-54 | I-55 | O-51 | O-52  | O-53 | O-54 | O-55 |

1520

CONTROL SYSTEM AND METHOD FOR ELECTRIC VEHICLE

CROSS-REFERENCE TO RELATED APPLICATIONS

This application is a continuation of U.S. patent application Ser. No. 11/113,470, entitled "Control System and Method for Electric Vehicle," filed on Apr. 25, 2005, which is a continuation of U.S. patent application Ser. No. 10/326,862, entitled "Control System for Electric Vehicle," filed on Dec. 19, 2002, issued as U.S. Pat. No. 6,885,920, which (1) is a continuation in part of U.S. patent application Ser. No. 09/774,981, entitled "A/C Bus Assembly for Electronic Traction Vehicle," filed on Jan. 31, 2001, issued as U.S. Pat. No. 6,757,597, and (2) claims priority under 35 U.S.C. §119(e) to: (a) U.S. Provisional Patent Application No. 60/388,451, entitled "Control System and Method for an Equipment Service Vehicle," filed on Jun. 13, 2002, (b) U.S. Provisional Patent Application No. 60/360,479, entitled "Turret Control System and Method for a Fire Fighting Vehicle," filed on Feb. 28, 2002, and (c) U.S. Provisional Patent Application No. 60/342,292, entitled "Vehicle Control and Monitoring System and Method," filed on Dec. 21, 2001, all of which are expressly incorporated by reference herein in their entireties.

This application also incorporates by reference the following documents in their entireties: (1) U.S. patent application Ser. No. 09/927,946, entitled "Control System and Method for an Equipment Service Vehicle," filed on Aug. 10, 2001, issued as U.S. Pat. No. 7,024,296, (2) U.S. patent application Ser. No. 09/500,506, entitled "Equipment Service Vehicle Having On-Board Diagnostic System," filed on Feb. 9, 2000, issued as U.S. Pat. No. 6,553,290, (3) U.S. patent application Ser. No. 09/384,393, entitled "Military Vehicle Having Cooperative Control Network With Distributed I/O Interfacing," filed Aug. 27, 1999, issued as U.S. Pat. No. 6,421,593, (4) U.S. patent application Ser. No. 09/364,690, entitled "Firefighting Vehicle Having Cooperative Control Network With Distributed I/O Interfacing," filed Jul. 30, 1999, abandoned.

BACKGROUND OF THE INVENTION

The present invention relates to electric vehicles. The present invention also relates to control systems and methods for electric vehicles.

An electronic traction vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. In a typical conventional electric traction vehicle, a prime mover, such as a diesel engine, is used to drive an electric generator or alternator which supplies electric current to one or more traction motors. The traction motors typically are coupled to wheel sets on the vehicle. A typical vehicle that utilizes this type of electric traction is a railroad locomotive. In some conventional electric traction vehicles, stored energy is used to provide the main power which provides the electrical current to one or a plurality of traction motors. A typical vehicle that utilizes this type of electric traction is a golf cart or battery powered electric car. In some conventional electric traction vehicles, having more than one sources of energy is desirable. By having more than one source of energy, some optimizations in the design can allow for more efficient power production, thus allowing power to be used from different sources to come up with a more efficient system for traction. These types of vehicles are commonly referred to as hybrid electric vehicles (HEV). Series and Parallel HEV system designs are what is usually encountered.

A master controller is often used to control the overall system and give command signals to the engine, generator/alternator, prime mover energy conversion (AC to DC) stored energy conversion, and/or traction level energy conversion (DC to AC). This controller architecture requires a highly integrated control strategy. It also provide a single point of failure for the traction system.

Thus, there is a need for an electric traction vehicle that is modular in design and control. There is also a need for electric traction vehicle that can be updated and upgraded as new technology and components become available without a required redesign of the overall vehicle system. There is also a need for improved control systems and methods for electric vehicles, and systems and methods for servicing, repairing and monitoring electric vehicles.

SUMMARY OF THE INVENTION

According to a first preferred embodiment, an electric traction vehicle comprises a vehicle platform, a communication network, a power source mounted on the vehicle platform, a plurality of drive wheels rotatably mounted on the vehicle platform, a plurality of electric motors coupled to respective ones of the plurality of drive wheels, and a plurality of microprocessor-based interface modules coupled to the plurality of electric motors. The interface modules are configured to control the plurality of electric motors and are coupled to each other by way of the communication network.

According to a second preferred embodiment, a vehicle comprises first and second drive wheels, a power source, a power transmission link, a plurality of input devices, a plurality of output devices, a communication network, and a plurality of microprocessor-based interface modules. The plurality of output devices include first and second motor drive systems which further include first and second electric motors. The first and second electric motors are respectively coupled to the first and second drive wheel and being capable of applying torque to the first and second drive wheels to drive motion of the vehicle. The plurality of interface modules are coupled to the power source by way of the power transmission link and are interconnected to each other by way of the communication network. Each of the plurality of interface modules is coupled to respective ones of the plurality of input devices and the plurality of output devices by way of respective dedicated communication links. The plurality of interface modules cooperate to control the plurality of output devices based on input status information from the plurality of input devices. At least one of the plurality of interface modules controls power distribution to the first and second motor drive systems to control a speed of the vehicle.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 12 is a schematic view of an aerial device having a control system according to another embodiment of the present invention;

FIGS. 17A-17B are modified views of the block diagram of FIG. 16 showing the operation of the control system to reconfigure itself in a failure mode of operation;

FIG. 19 is truth table in which an output is controlled with an additional layer of failure management for inputs with undetermined states;

FIG. 22 is an I/O status table of FIG. 21 shown in greater detail;

DETAILED DESCRIPTION OF THE PREFERRED EMBODIMENTS

Patent application Ser. No. 09/384,393, filed Aug. 27, 1999, allowed, discloses various embodiments of a control system architecture in connection with fire trucks, military vehicles and other types of vehicles. A particularly advantageous use of the preferred control system architecture is in the context of electric traction vehicles and, as described below, the vehicles disclosed in these applications may be implemented as electric traction vehicles. For such uses, the control systems described in the above-mentioned applications may be used to control additional output devices associated with the electric traction vehicle such as electric motors used to drive motion of the vehicle, and to provide I/O status information which may be transmitted off-board the vehicle. For convenience, the contents of the above-mentioned application is repeated below, followed by a description of an electric traction vehicle embodiment and remote monitoring applications which in a preferred embodiment use a control system of a type disclosed in the above-mentioned applications.

A. Fire Truck Control System

1. Architecture of Preferred Fire Truck Control System

Figure 1:
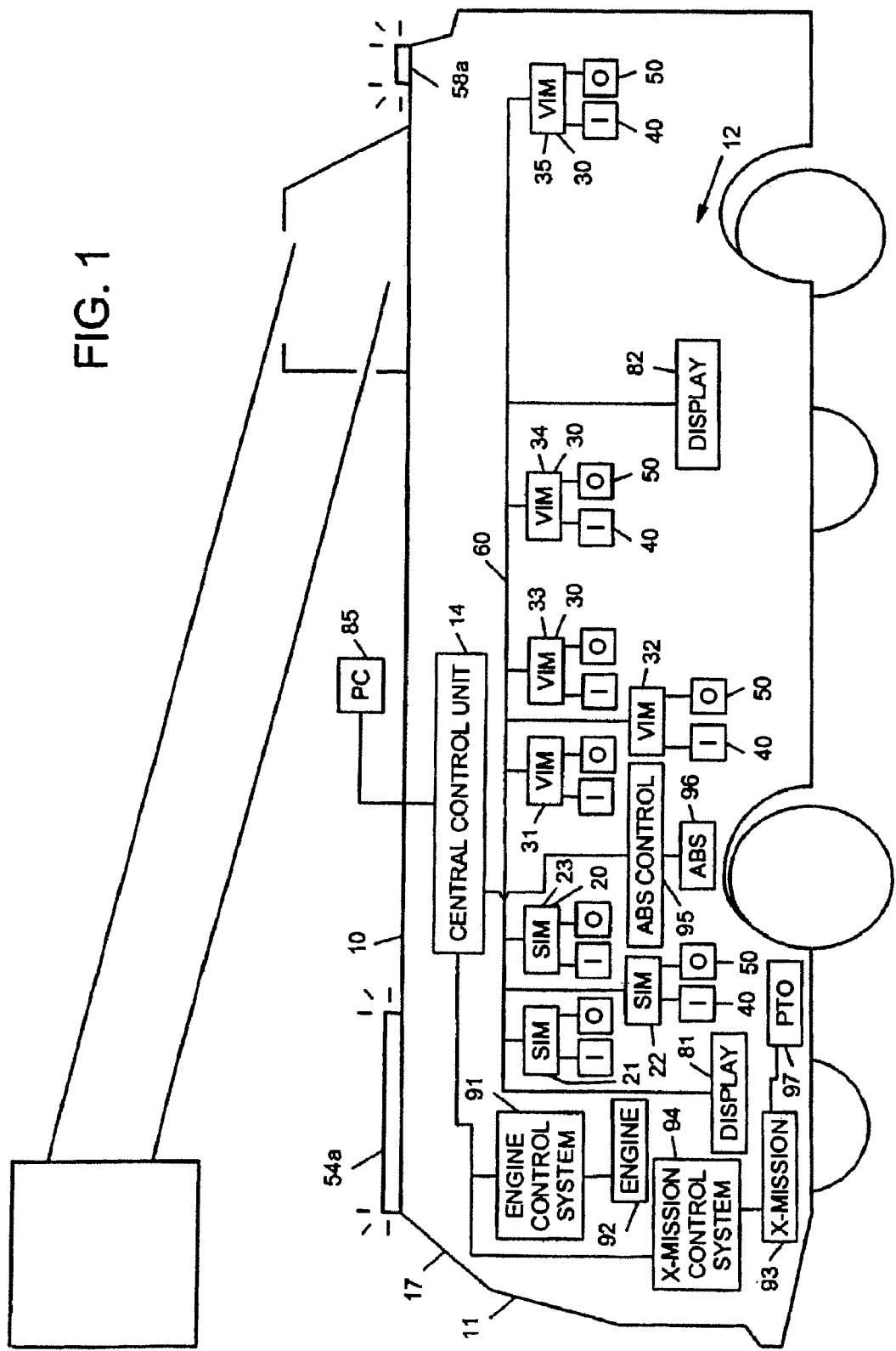
FIG. 1 is a schematic view of a fire truck having a control system according to one embodiment of the present invention.

Referring now to FIG. 1, a preferred embodiment of a fire truck 10 having a control system 12 is illustrated. By way of overview, the control system 12 comprises a central control unit 14, a plurality of microprocessor-based interface modules 20 and 30, a plurality of input devices 40 and a plurality of output devices 50. The central control unit 14 and the interface modules 20 and 30 are connected to each other by a communication network 60.

More specifically, the central control unit 14 is a microprocessor-based device and includes a microprocessor 15 that executes a control program 16 (see FIG. 2) stored in memory of the central control unit 14. The control program is shown and described in greater detail below in conjunction with the flowcharts of FIGS. 4, 5, 7, 8 and 10. In general, the control unit 14 executes the program to collect and store input status information from the input devices 40, and to control the output devices 50 based on the collected status information. The control program preferably implements an interlock system (e.g., FIG. 5), a load manager (e.g., FIGS. 7-8), and a load sequencer (e.g., FIGS. 10A-10B). As described below, the central control unit 14 is preferably not connected to the I/O devices 40 and 50 directly but rather only indirectly by way of the interface modules 20 and 30, thereby enabling distributed data collection and power distribution. The I/O devices 40 and 50 are located on a chassis 11 of the fire truck 10, which includes both the body and the underbody of the fire truck 10.

In the illustrated embodiment, two different types of interface modules are used. The interface modules 20 interface mainly with switches and low power indicators, such as LEDs that are integrally fabricated with a particular switch and that are used to provide visual feedback to an operator regarding the state of the particular switch. For this reason, the interface modules 20 are sometimes referred to herein as "SIMs" ("switch interface modules"). Herein, the reference numeral "20" is used to refer to the interface modules 20 collectively, whereas the reference numerals 21, 22 and 23 are used to refer to specific ones of the interface modules 20.

The interface modules 30 interface with the remaining I/O devices 40 and 50 on the vehicle that do not interface to the interface modules 20, and therefore are sometimes referred to herein as "VIMs" ("vehicle interface modules"). The interface modules 30 are distinguishable from the interface modules 20 mainly in that the interface modules 30 are capable of handling both analog and digital inputs and outputs, and in that they are capable of providing more output power to drive devices such as gauges, valves, solenoids, vehicle lighting and so on. The analog outputs may be true analog outputs or they may be pulse width modulation outputs that are used to emulate analog outputs. Herein, the reference numeral "30" is used to refer to the interface modules 30 collectively, whereas the reference numerals 31, 32, 33, 34 and 35 are used to refer to specific ones of the interface modules 30.

Although two different types of interface modules are used in the illustrated embodiment, depending on the application, it may be desirable to use only a single type of interface module in order to reduce inventory requirements. Additionally, while in FIG. 1 three of the interface modules 20 and five of the interface modules 30 are shown, this arrangement is again simply one example. It may be desirable to provide each interface module with more I/O points in order to reduce the number of interface modules that are required, or to use more interface modules with a smaller number of I/O points in order to make the control system 12 more highly distributed. Of course, the number of interface modules will also be affected by the total number of I/O points in the control system.

FIG. 1 shows an approximate distribution of the interface modules 20 and 30 throughout the fire truck 10. In general, in order to minimize wiring, the interface modules 20 and 30 are placed so as to be located as closely as possible to the input devices 40 from which input status information is received and the output devices 50 that are controlled. As shown in FIG. 1, there is a large concentration of interface modules 20 and 30 near the front of the fire truck 10, with an additional interface module 34 at mid-length of the fire truck 10 and another interface module 35 at the rear of the fire truck 10. The large concentration of interface modules 20 and 30 at the front of the fire truck 10 is caused by the large number of switches (including those with integral LED feedback output devices) located in a cab of the fire truck 10, as well as the large number of other output devices (gauges, lighting) which tend to be located in the cab or otherwise near the front of the fire truck 10. The interface module 34 that is located in the middle of the truck is used in connection with I/O devices 40 and 50 that are located at the fire truck pump panel (i.e., the operator panel that has I/O devices for operator control of the fire truck's pump system). The interface module 35 that is located at the rear of the fire truck 10 is used in connection with lighting and other equipment at the rear of the fire truck 10.

Figure 2:
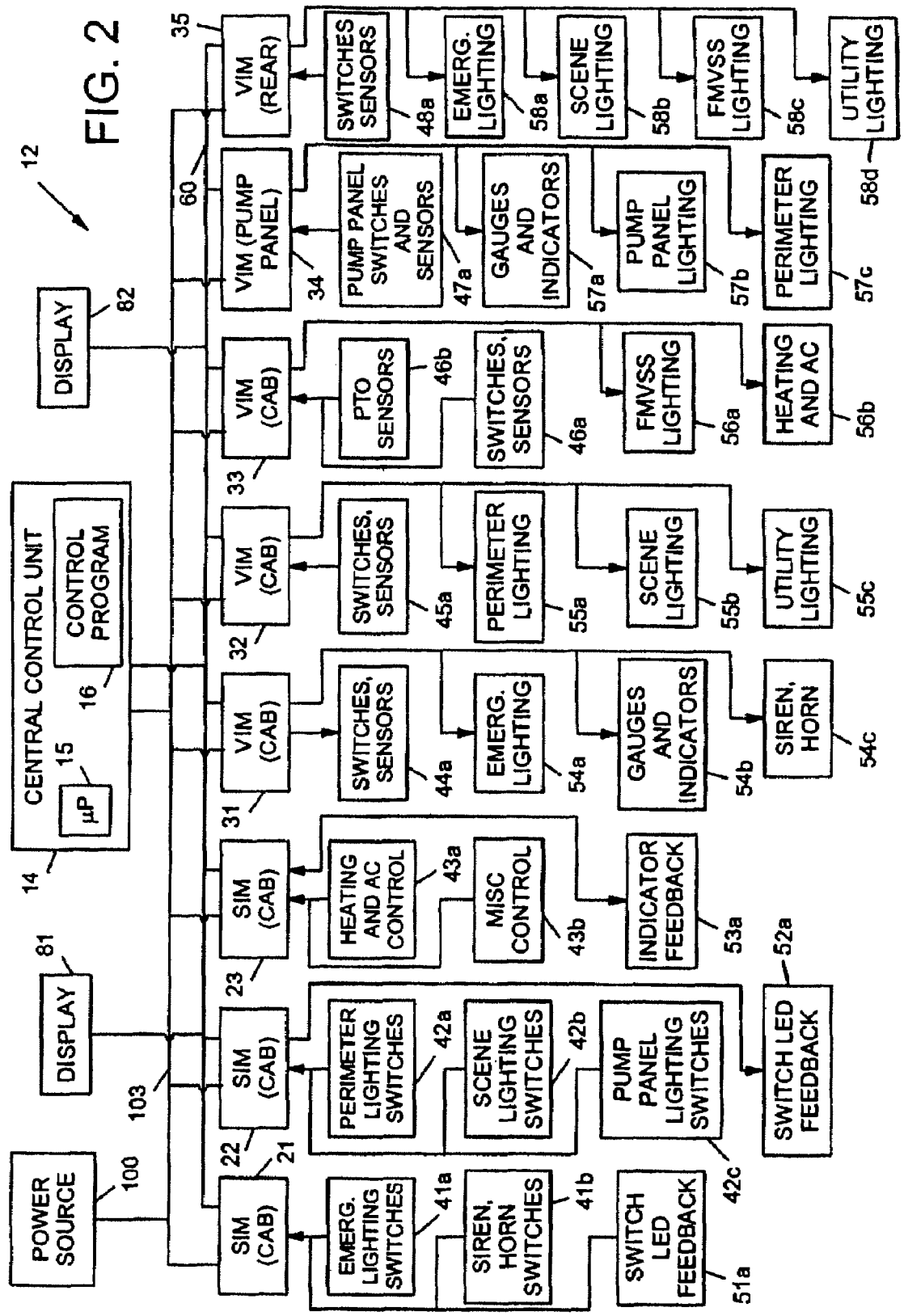
FIG. 2 is a block diagram of the control system of FIG. 1 showing selected aspects of the control system in greater detail.

The advantage of distributing the interface modules 20 and 30 in this manner can be more fully appreciated with reference to FIG. 2, which shows the interconnection of the interface modules 20 and 30. As shown in FIG. 2, the interface modules 20 and 30 receive power from a power source 100 by way of a power transmission link 103. The power transmission link 103 may comprise for example a single power line that is routed throughout the fire truck 10 to each of the interface modules 20 and 30. The interface modules then distribute the power to the output devices 50, which are more specifically designated with the reference numbers 51a, 52a, 53a, 54a-c, 55a-c, 56a-b, 57a-c and 58a-d in FIG. 2.

It is therefore seen from FIGS. 1 and 2 that the relative distribution of the interface modules 20 and 30 throughout the fire truck 10 in combination with the arrangement of the power transmission link 103 allows the amount of wiring on the fire truck 10 to be dramatically reduced. The power source 100 delivers power to the interface modules 20 and 30, which act among other things as power distribution centers, and not directly to the output devices 50. Because the interface modules 20 and 30 are located so closely to the I/O devices 40 and 50, most of the I/O devices can be connected to the interface modules 20 and 30 using only a few feet of wire or less. This eliminates the need for a wire harness that extends the length of the fire truck (about forty feet) to establish connections for each I/O devices 40 and 50 individually.

Continuing to refer to FIG. 2, the switch interface modules 20 and the interconnection of the interface modules 20 with various I/O devices will now be described in greater detail. The interface modules 20 are microprocessor-based, as previously noted, and include a microprocessor that executes a program to enable communication over the communication network 60, as detailed below.

The same or a different microprocessor of the interface modules 20 may also be used to process input signals received from the input devices 40. In particular, the interface modules 20 preferably perform debounce filtering of the switch inputs, so as to require that the position of the switch become mechanically stable before a switch transition is reported to the central control unit 14. For example, a delay of fifty milliseconds may be required before a switch transition is reported. Performing this filtering at the interface modules 20 reduces the amount of processing that is required by the central control unit 14 to interpret switch inputs, and also reduces the amount of communication that is required over the communication network 60 because each switch transition need not be reported.

Physically, the interface modules 20 may be placed near the headliner of a cab 17 of the fire truck 10. Traditionally, it is common practice to locate panels of switches along the headliner of the cab for easy access by an operator of the fire truck. Additionally, as detailed below, in the preferred embodiment, the interface modules 20 are connected to switches that have integrally fabricated LEDs for indicating the state of the output device controlled by the switch to provide maximum operator feedback. These LEDs are output devices which are connected to the interface modules 20. Therefore, by locating the interface modules near the headliner of the cab, the amount of wiring required to connect the interface modules 20 not only to the switches and but also to the LED indicators is reduced.

In the preferred embodiment, the interface modules 20 have between ten and twenty-five each of inputs and outputs and, more preferably, have sixteen digital (on/off switch) inputs and sixteen LED outputs. Most of these inputs and outputs are utilized in connection with switches having integrally fabricated LEDs. However, it should be noted that there need not be a one-to-one correspondence between the switches and the LEDs, and that the inputs and the outputs of the interface modules 20 need not be in matched pairs. For example, some inputs may be digital sensors (without a corresponding output device) and some of the outputs may be ordinary digital indicators (without a corresponding input device). Additionally, the LED indicators associated with the switch inputs for the interface module 21 could just as easily be driven by the interface module 23 as by the interface module 21, although this arrangement is not preferred. Of course, it is not necessary that all of the inputs and outputs on a given interface module 20 be utilized and, in fact, it is likely that some will remain unutilized.

One way of establishing a dedicated link between the I/O devices 40 and 50 and the interface modules 20 is through the use of a simple hardwired link. Considering for example an input device which is a switch, one terminal of the switch may be connected (e.g., by way of a harness connector) to an input terminal of the interface module 20 and the other terminal of the switch may be tied high (bus voltage) or low (ground). Likewise, for an output device which is an LED, one terminal of the LED may be connected to an output terminal of the interface module 20 and the other terminal of the LED may again be tied high or low. Other dedicated links, such as RF links, could also be used.

To provide maximum operator feedback, the LEDs that are located with the switches have three states, namely, off, on, and blinking. The off state indicates that the switch is off and therefore that the device controlled by the switch is off. Conversely, the on state indicates that the switch is on and that the device controlled by the switch is on. The blinking state indicates that the control system 12 recognizes that a switch is on, but that the device which the switch controls is nevertheless off for some other reason (e.g., due to the failure of an interlock condition, or due to the operation of the load manager or load sequencer). Notably, the blinking LED feedback is made possible by the fact that the LEDs are controlled by the control unit 14 and not directly by the switches themselves, since the switches themselves do not necessarily know the output state of the devices they control.

A specific example will now be given of a preferred interconnection of the interface modules 21, 22, and 23 with a plurality of I/O devices 40 and 50. Many or all of the I/O devices 40 and 50 could be the same as those that have previously been used on fire trucks. Additionally, it should be noted that the example given below is just one example, and that a virtually unlimited number of configurations are possible. This is especially true since fire trucks tend to be sold one or two at a time and therefore each fire truck that is sold tends to be unique at least in some respects.

In FIG. 2, the interface module 21 receives inputs from switches 41a that control the emergency lighting system of the fire truck. As previously noted, the emergency lighting system includes the flashing emergency lights (usually red and white) that are commonly associated with fire trucks and that are used to alert other motorists to the presence of the fire truck on the roadway or at the scene of a fire. One of the switches 41a may be an emergency master on/off (E-master) switch used to initiate load sequencing, as described in greater detail below. The interface module 21 may also be connected, for example, to switches 41b that control the emergency siren and horn. The interface module 21 is also connected to LEDs 51a that are integrally located in the switches 41a and 41b and that provide operator feedback regarding the positions of the switches 41a and 41b, as previously described.

The interface module 22 receives inputs from switches 42a that control lighting around the perimeter of the fire truck 10, switches 42b that control scene lighting, and switches 42c that control lighting which aids the operators in viewing gauges and other settings at the pump panel. The interface module 22 is also connected to LEDs 52a that are integrally located in the switches 42a, 42b and 42c and that provide operator feedback regarding the positions of the switches 42a, 42b and 42c.

The interface module 23 receives inputs from switches 43a that control heating and air conditioning, and switches 43b that controls miscellaneous other electrical devices. The interface module 23 is connected to LED indicators, some of which may be integrally located with the switches 43a and 43b and others of which may simply be an LED indicator that is mounted on the dashboard or elsewhere in the cab of the fire truck 10.

Continuing to refer to FIG. 2, the vehicle interface modules 30 and the interconnection of the interface modules 20 with various I/O devices will now be described in greater detail. As previously mentioned, the interface modules 30 are distinguishable from the interface modules 20 mainly in that the interface modules 30 are capable of handling both analog and digital inputs and outputs, and in that they are capable of providing more output power to drive output devices such as digitally-driven gauges, solenoids, and so on. The interface modules 30 preferably have between fifteen and twenty-five each inputs and outputs and, more preferably, have twenty inputs (including six digital inputs, two frequency counter inputs, and six analog inputs) and twenty outputs (including six outputs that are configurable as analog outputs).

Like the interface modules 20, the interface modules 30 are microprocessor-based and include a microprocessor that executes a program to enable communication over the communication network 60. The same or a different microprocessor of the interface modules 30 may also be used to process input signals received from the input devices 40 and to process output signals transmitted to the output devices 50.

For the interface modules 30, this processing includes not only debounce filtering, in the case of switch inputs, but also a variety of other types of processing. For example, for analog inputs, this processing includes any processing that is required to interpret the inputs from analog-to-digital (A/D) converters, including converting units. For frequency inputs, this processing includes any processing that is required to interpret inputs from frequency-to-digital converters, including converting units. This processing also includes other simple filtering operations. For example, in connection with one analog input, this processing may include notifying the central control unit 14 of the status of an input device only every second or so. In connection with another analog input, this processing may include advising the central control unit 14 only when the status of the input device changes by a predetermined amount. For analog output devices, this processing includes any processing that is required to interpret the outputs for digital-to-analog (D/A) converters, including converting units. For digital output devices that blink or flash, this processing includes implementing the blinking or flashing (i.e., turning the output device on and off at a predetermined frequency) based on an instruction from the central control unit 14 that the output device should blink or flash. In general, the processing by the interface modules 30 reduces the amount of information which must be communicated over the communication link, and also reduces the amount of time that the central control unit 14 must spend processing minor changes in analog input status.

Preferably, the configuration information required to implement the I/O processing that has just been described is downloaded from the central control unit 14 to each interface module 30 (and each interface module 20) at power-up. Additionally, the harness connector that connects to each of the interface modules 20 and 30 are preferably electronically keyed, such that being connected to a particular harness connector provides the interface modules 20 and 30 with a unique identification code (for example, by tying various connector pins high and low to implement a binary code). The advantage of this approach is that the interface modules 20 and 30 become interchangeable devices that are customized only at power-up. As a result, if one of the interface modules 30 malfunctions, for example, a new interface module 30 can be plugged into the control system 12, customized automatically at power-up (without user involvement), and the control system 12 then becomes fully operational. This enhances the maintainability of the control system 12.

A specific example will now be given of a preferred interconnection of the interface modules 31, 32, and 33 with a plurality of I/O devices 40 and 50. This example continues the example that was started in connection with the interface modules 21, 22, and 23. Again, it should be noted that the configuration described herein is just one example.

The interface modules 31, 32, 33, 34 and 35 all receive inputs from additional switches and sensors 44a, 45a, 46a, 47a and 48a. The switches may be additional switches that are located in the cab of the fire truck or elsewhere throughout the vehicle, depending on the location of the interface module. The sensors may be selected ones of a variety of sensors that are located throughout the fire truck. The sensors may be used to sense the mechanical status of devices on the fire truck, for example, whether particular devices are engaged or disengaged, whether particular devices are deployed, whether particular doors on the fire truck are open or closed, and so on. The sensors may also be used to sense fluid levels such as fuel level, transmission fluid level, coolant level, foam pressure, oil level, and so on.

In addition to the switches and sensors 44a, the interface module 31 is also connected to a portion 54a of the emergency lighting system. The emergency lighting system includes emergency lights (usually red and white) at the front, side and rear of the fire truck 10. The emergency lights may, for example, be in accordance with the guidelines provided by the National Fire Protection Association. Because the interface module 31 is located at the front of the fire truck, the interface module 31 is connected to the red and white emergency lights at the front of the fire truck.

The interface module 31 is also connected to gauges and indicators 54b which are located on the dashboard of the fire truck 10. The gauges may indicate fluid levels such as fuel level, transmission fluid level, coolant level, foam pressure, oil level and so on. The indicators may include, for example, indicators that are used to display danger, warning and caution messages, warning lights, and indicators that indicate the status of various mechanical and electrical systems on the fire truck. The interface module 31 may also be connected, for example, to an emergency sound system including an emergency siren and emergency air horns 54c, which are used in combination with the emergency lights 54a.

In addition to the switches and sensors 45a, the interface module 32 is also connected to perimeter lighting 55a, scene lighting 55b and utility lighting 55c. The perimeter lighting 55a illuminates the perimeter of the fire truck 10. The scene lighting 55b includes bright flood lights and/or spot lights to illuminate the work area at a fire. The utility lighting 55c includes lighting used to light operator panels, compartments and so on of the fire truck 10.

In addition to the switches and sensors 46a, the interface module 33 is also connected to PTO sensors 46b. The PTO sensors 46b monitor the status of a power take-off mechanism 97 (see FIG. 1), which diverts mechanical power from the engine/transmission from the wheels to other mechanical subsystems, such as the pump system, an aerial system and so on. The interface module 33 is also connected to a portion 56a of the FMVSS (Federal Motor Vehicle Safety Standard) lighting. The FMVSS lighting system includes the usual types of lighting systems that are commonly found on most types of vehicles, for example, head lights, tail lights, brake lights, directional lights (including left and right directionals), hazard lights, and so on. The interface module 33 is also connected to the heating and air conditioning 56b.

In addition to the switches and sensors 47a, the interface module 34, which is disposed near the pump panel, is connected to pump panel switches and sensors 47a, pump panel gauges and indicators 57a, pump panel lighting 57b, and perimeter lighting 57c. The pump system may be manually controlled or may be automatically controlled through the use of electronically controlled valves. In either case, the various fluid pressures are measured by sensors and displayed on the gauges and indicators 57a.

Finally, in addition to the switches and sensors 48a, the interface module 35 is also connected to emergency lighting 58a, scene lighting 58b, FMVSS lighting 58c, and the utility lighting 58d. These lighting systems have been described above.

The interface modules 20 and the interface modules 30 are connected to the central control unit 14 by the communication network 60. The communication network may be implemented using a network protocol, for example, which is in compliance with the Society of Automotive Engineers (SAE) J1708/1587 and/or J1939 standards. The particular network protocol that is utilized is not critical, although all of the devices on the network should be able to communicate effectively and reliably.

The transmission medium may be implemented using copper or fiber optic cable. Fiber optic cable is particularly advantageous in connection with fire trucks because fiber optic cable is substantially immune to electromagnetic interference, for example, from communication antennae on mobile news vehicles, which are common at the scenes of fires. Additionally, fiber optic cable is advantageous because it reduces RF emissions and the possibility of short circuits as compared to copper-based networks. Finally, fiber optic cable is advantageous because it reduces the possibility of electrocution as compared to copper in the event that the cable accidentally comes into contact with power lines at the scene of a fire.

Also connected to the communication network 60 are a plurality of displays 81 and 82. The displays 81 and 82 permit any of the data collected by the central control unit 14 to be displayed to the firefighters in real time. In practice, the data displayed by the displays 81 and 82 may be displayed in the form of text messages and may be organized into screens of data (given that there is too much data to display at one time) and the displays 81 and 82 may include membrane pushbuttons that allow the firefighters to scroll through, page through, or otherwise view the screens of data that are available. Additionally, although the displays 81 and 82 are both capable of displaying any of the information collected by the central control unit 14, in practice, the displays 81 and 82 are likely to be used only to display selected categories of information. For example, assuming the display 81 is located in the cab and the display 82 is located at the pump panel, the display 81 is likely to be used to display information that pertains to devices which are controlled from within the cab, whereas the display 82 is likely to be used to display information pertaining to the operation of the pump panel. Advantageously, the displays 81 and 82 give firefighters instant access to fire truck information at a single location, which facilitates both normal operations of the fire truck as well as troubleshooting if problems arise.

Also shown in FIG. 2 is a personal computer 85 which is connected to the control unit 14 by way of a communication link 86, which may be a modem link, an RS-232 link, an Internet link, and so on. The personal computer 85 allows diagnostic software to be utilized for remote or local troubleshooting of the control system 12, for example, through direct examination of inputs, direct control of outputs, and viewing and controlling internal states, including interlock states. Because all I/O status information is stored in the central control unit 14, this information can be easily accessed and manipulated by the personal computer 85. If a problem is encountered, the personal computer can be used to determine whether the central control unit 14 considers all of the interface modules 20 and 30 to be "on-line" and, if not, the operator can check for bad connections and so on. If a particular output device is not working properly, the personal computer 85 can be used to trace the I/O status information from the switch or other input device through to the malfunctioning output device. For example, the personal computer 85 can be used to determine whether the switch state is being read properly, whether all interlock conditions are met, and so on.

The personal computer 85 also allows new firmware to be downloaded to the control unit 14 remotely (e.g., from a different city or state or other remote location by way of the Internet or a telephone link) by way of the communication link 86. The firmware can be firmware for the control unit 14, or it can be firmware for the interface modules 20 and 30 that is downloaded to the control unit 14 and then transmitted to the interface modules 20 and 30 by way of the communication network 60.

Finally, referring back to FIG. 1, several additional systems are shown which will now be briefly described before proceeding to a discussion of the operation of the control system 12. In particular, FIG. 1 shows an engine system including an engine 92 and an engine control system 91, a transmission system including a transmission 93 and a transmission control system 94, and an anti-lock brake system including an anti-lock brake control system 95 and anti-lock brakes 96. The transmission 93 is mechanically coupled to the engine 92, and is itself further mechanically coupled to a PTO system 97. The PTO system 97 allows mechanical power from the engine to be diverted to water pumps, aerial drive mechanisms, stabilizer drive mechanisms, and so on. In combination, the engine system, the transmission system and the PTO system form the power train of the fire truck 10.

The control systems 92, 94 and 95 may be connected to the central control unit 14 using the same or a different communication network than is used by the interface modules 30 and 40. In practice, the control systems 92, 94 and 95 are likely to be purchased as off-the-shelf systems, since most fire truck manufacturers purchase rather than manufacture engine systems, transmission systems and anti-lock brake systems. As a result, it is likely that the control systems 92, 94 and 95 will use a variety of different communication protocols and therefore that at least one additional communication network will be required.

By connecting the systems 92, 94 and 95 to the central control unit 14, an array of additional input status information becomes available to the control system 12. For example, for the engine, this allows the central control unit 14 to obtain I/O status information pertaining to engine speed, engine hours, oil temperature, oil pressure, oil level, coolant level, fuel level, and so on. For the transmission, this allows the central control unit 14 to obtain, for example, information pertaining transmission temperature, transmission fluid level and/or transmission state (1st gear, 2nd gear, and so on). Assuming that an off-the-shelf engine or transmission system is used, the information that is available depends on the manufacturer of the system and the information that they have chosen to make available.

Connecting the systems 92, 94 and 95 to the central control unit 14 is advantageous because it allows information from these subsystems to be displayed to firefighters using the displays 81 and 82. This also allows the central control unit 14 to implement various interlock conditions as a function of the state of the transmission, engine or brake systems. For example, in order to turn on the pump system (which is mechanically driven by the engine and the transmission), an interlock condition may be implemented that requires that the transmission be in neutral or 4th lockup (i.e., fourth gear with the torque converter locked up), so that the pump can only be engaged when the wheels are disengaged from the power train. The status information from these systems can therefore be treated in the same manner as I/O status information from any other discrete I/O device on the fire truck 10. It may also be desirable to provide the central control unit 14 with a limited degree of control over the engine and transmission systems, for example, enabling the central control unit 14 to issue throttle command requests to the engine control system 91. This allows the central control unit to control the speed of the engine and therefore the voltage developed across the alternator that forms part of the power source 100.

2. Manner of Operation of Preferred Fire Truck Control System

The operation of the control system 12 will now be described in greater detail, including the manner in which interlock control, load management, and load sequencing are implemented by the control system 12.

a. Operation Overview and Interlock Control

Figure 3:
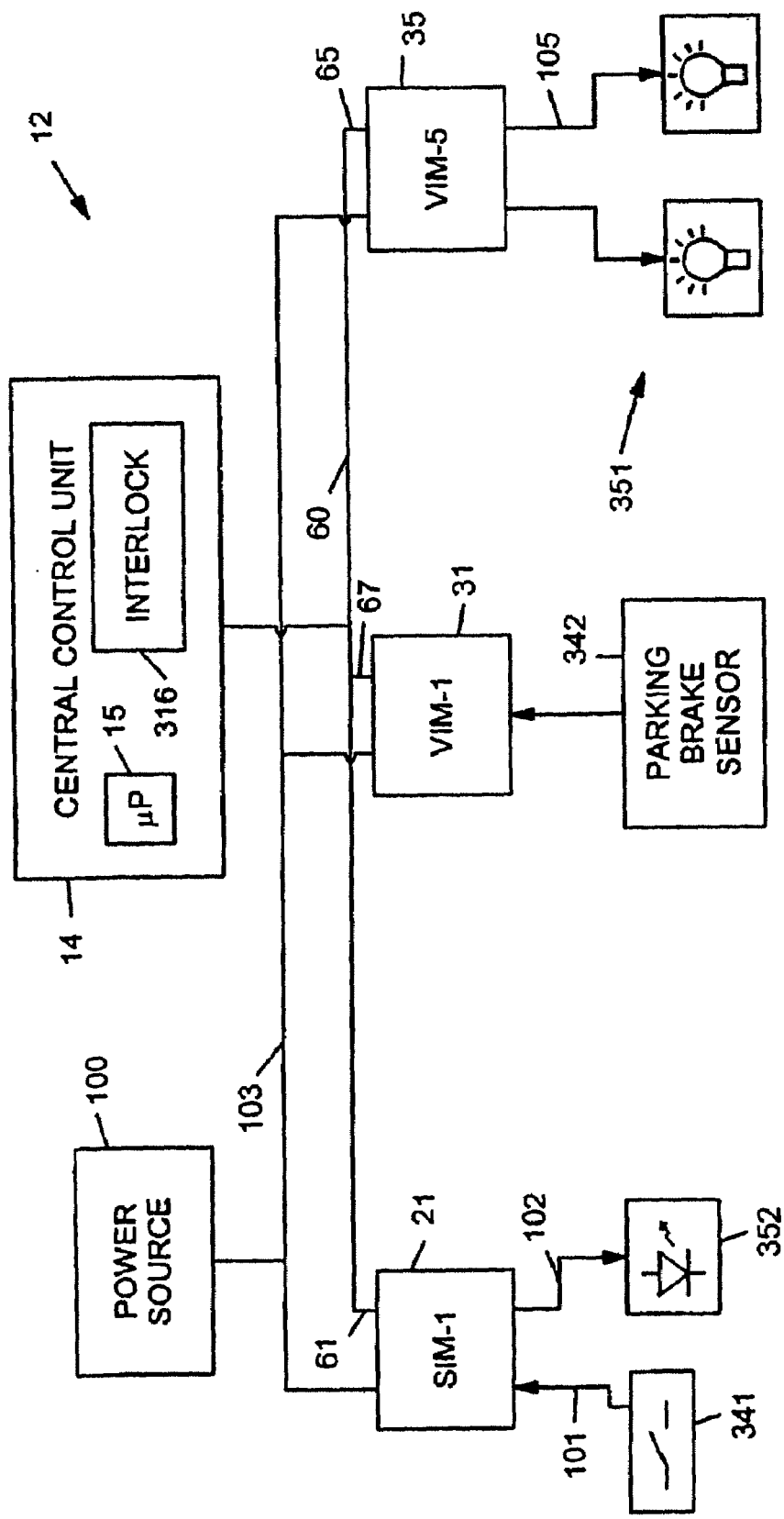
FIG. 3. is a simplified block diagram of the control system of FIGS. 1-2.
Figure 4:
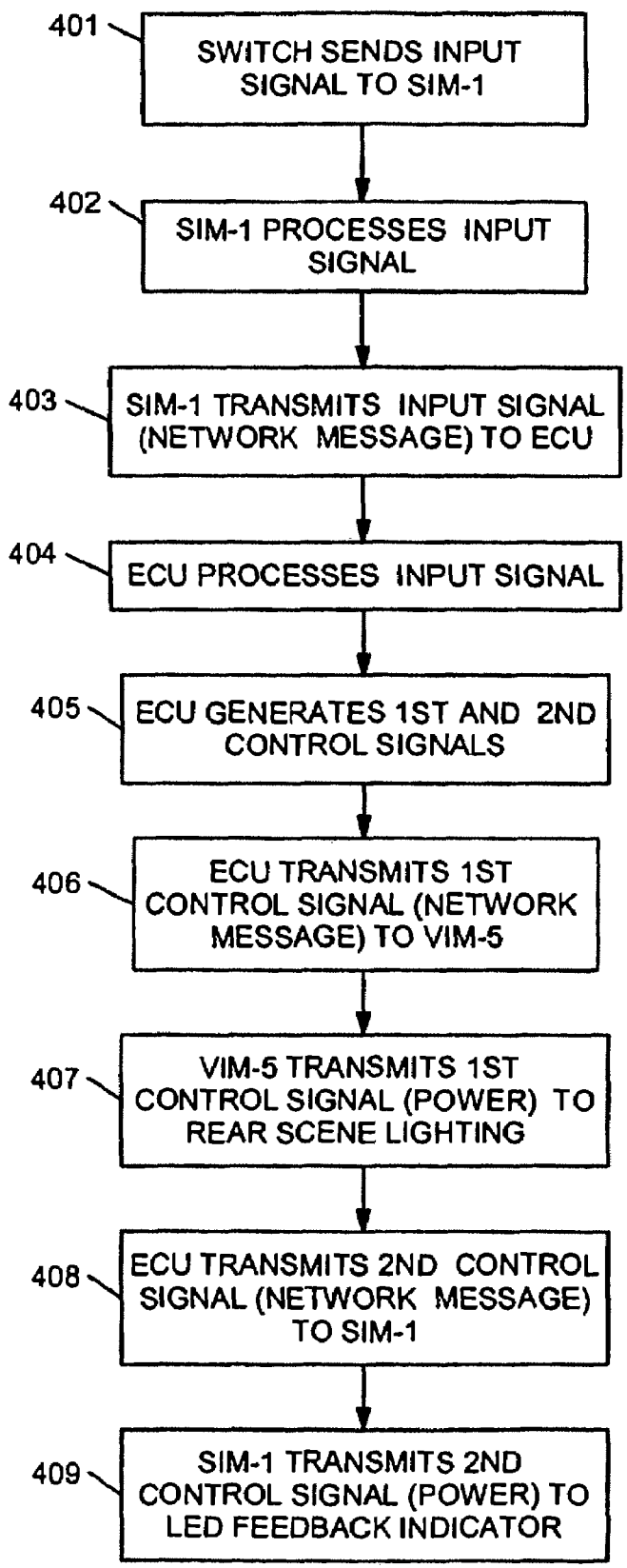
FIG. 4 is a flowchart showing the operation of the control system of FIG. 3 to turn on an output device in response to an operator input.
Figure 5:
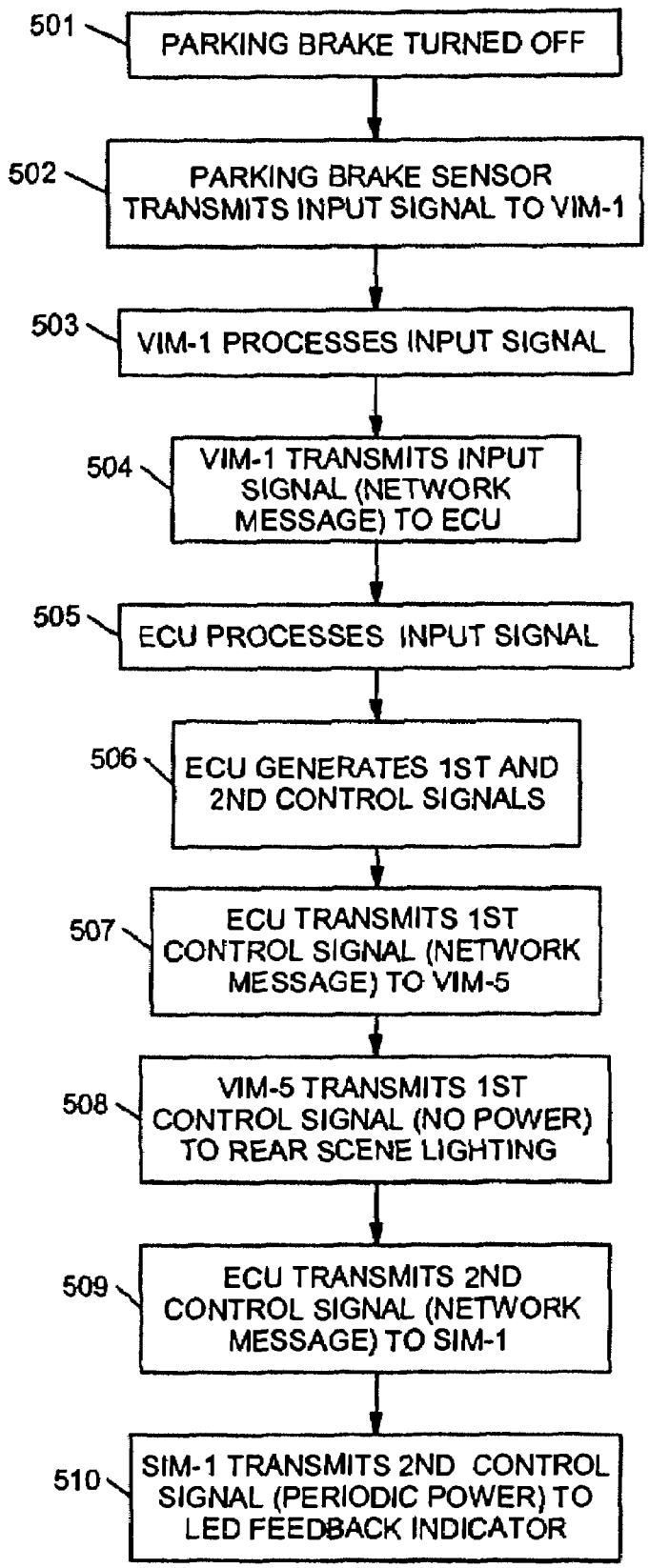
FIG. 5 is a flowchart showing the operation of the control system of FIG. 3 to turn off an output device in response to the failure of an interlock condition.

Referring now to FIGS. 3-5, a first example of the operation of the control system 12 is given. FIG. 3 is a block diagram of the control system 12, which has been simplified to the extent that some of the structure shown in FIGS. 1-2 is not shown in FIG. 3. Additionally, FIG. 3 shows in greater detail a switch 341 (which is one of the switches 41*a* in FIG. 2), rear scene lights 351 (which are part of the rear scene lighting 58*b* in FIG. 2), and an LED indicator 352 (which is one of the switch LED feedback indicators 51*a* in FIG. 2). The rear scene lights 351 are considered a single output device since they are both connected to one output of the interface module 35, even though there are in fact two lights. Finally, the central control unit 14 is also shown to include an interlock system 316, which is implemented in the control program 16 executed by the microprocessor 15.

FIG. 4 is a flowchart showing the operation of the control system 12 to activate the rear scene lights 351 in response to an input signal received from the switch 341. One of the advantages of the control system 12 is that input signals from the input devices 40 are processed by the control unit 14 and do not directly control the output devices 50. Switches represent user input commands but do not close the electrical circuit between the power source 100 and the output device controlled by the switch. As will be described below, this simplifies control system wiring and makes possible more flexible control of output devices.

In order to highlight this aspect of the control system 12, it will be assumed that the switch 341 is a soft toggle switch. Thus, the switch 341 is physically a momentary switch, i.e., a switch that closes when pressed but, when pressure is removed, automatically returns to an open position. The control system 12 makes the switch 341 emulate a latched switch, i.e., a switch that remains closed when pressed and returns to an open position only when pressed again.

First, in step 401, the switch 341 transmits an input signal to the interface module 21. The input signal is transmitted to the interface module 21 as a result of a change in the status of the switch, for example, when an operator presses the switch. The input signal from the switch 341 is transmitted to the interface module 21 by way of a hardwired communication link 101 which may, for example, comprise a wire that connects a terminal of the switch 341 to an input terminal of the interface module 21 (with the other terminal of the switch 341 being tied high or low). Other types of dedicated links may also be used.

At step 402, the interface module 21 processes the input signal. For the switch 341, the interface module performs debounce filtering, for example, by waiting until the mechanical position of the switch stabilizes (e.g., fifty milliseconds) before the transmitting the input signal to the control unit 14.

At step 403, the interface module 21 transmits the input signal in the form of a network message to the control unit 14 ("ECU" in FIG. 4). The network message is sent by way of the communication network 60 and, in particular, by way of a network communication link 61 that links the interface module 21 to the control unit 14.

At step 404, the control unit 14 processes the input signal. As previously noted, the switch 341 is physically a momentary switch (i.e., a switch that closes when pressed but, when pressure is removed, automatically returns to an open position) but is made to emulate a latched switch (i.e., a switch that remains closed when pressed and returns to an open position only when pressed again). Accordingly, to process the input signal, the control unit 14 first determines that the switch 341 has experienced an off→on transition (i.e., because the switch 341 was previously off but is now on), and then determines that the present state of the rear scene lights 351 are off. Accordingly, at step 405, the control unit 14 generates a first control signal to turn on the rear scene lights 351, as well as a second control signal to turn on LED indicator 352.

At step 406, the control unit 14 transmits the first control signal in the form of a second network message to the interface module 35. The network message is sent by way of the communication network 60 and, in particular, by way of a network communication link 65 that links the central control unit 14 to the interface module 35. In practice, the network communication link 65 may utilize some or all of the same physical media utilized by the network communication link 61, depending on the network architecture that is utilized. In the illustrated embodiment a bus architecture is utilized, but it should be understood of course that other types of network architectures (such as ring or star architectures) may also be utilized.

At step 407, the interface module 35 transmits the first control signal to the rear scene lights 351. The control signal is transmitted in the form of a power control signal on a hardwired communication link 105. The hardwired communication link 105 may, for example, comprise a wire that connects a terminal of the switch 341 to an input terminal of the interface module 21. The power control signal from the interface module 35 has two states, namely, an "on" state in which power is provided to the lighting system 351 and an "off" in which power is not provided to the lighting system 351.

At step 408, the control unit 14 transmits the second control signal to the interface module 21 by way of the network communication link 61 in the form of a third network message. At step 409, the interface module 21 transmits the second control signal to the LED indicator 352 in the form of a power control signal on a hardwired communication link 102. As previously noted, the LED indicator 352 is located integrally with the switch 341 (e.g., at the tip of the lever of the switch 341, in a manner such that the LED is clearly associated with the switch 341). Therefore, when the second control signal is transmitted to the LED indicator 352, thereby turning on the LED indicator 352, the LED indicator provides feedback to the operator regarding the status of the rear scene lights 351. In the present situation, the on state of the LED indicator 352 indicates that the rear scene lights 351 are on.

When the switch 341 is released, another input signal (not shown) is sent to the interface module 21 which indicates that the input state of the switch has changed from on to off. The control unit 14 recognizes the on→off transition, but ignores the transition pursuant to making the switch 341 emulate a latched switch.

It may be noted therefore that the switch 341 does not complete the electrical power circuit for the rear scene lights 351. When the switch 341 is released, the switch 341 opens but this change does not cause any change in the output status of the scene lights 351. The opportunity for the central control unit 14 to process the input signal from the switch 341 (as well as other input devices) makes the control system 12 more flexible and robust while at the same time reducing wiring and therefore reducing the number of failure points.

For example, a feature that is easily implemented in the control system 12 is two-way or, more generally, N-way switching. To implement N-way switching, it is only necessary to define N switches as inputs that control a given lighting system, and to program the control unit 14 to toggle the state of the lighting system every time the latched state of one of the N switches changes. A complicated and wiring-intensive N-way switching circuit is not required because the control logic required to implement N-way switching is not hardwired but rather is programmed into the control unit 14. Another feature that is easily implemented is progressive switching, in which the control unit 14 responds differently each time a given switch is pressed.

In addition to the advantages that are achieved due to the processing of the inputs, additional advantages are achieved in connection with processing the outputs. Thus, another advantage of the control system 12 is that the outputs are capable of multiple modes of operation, without any additional hardware, depending on the mode of operation of the vehicle. Thus, the same output device can have a digital mode of operation, an analog mode of operation, and a flashing mode of operation. For example, the same set of lights can be made to operate as high beam headlights at night (digital), as day-time running lights during the day (analog), and as flashing white lights in an emergency situation. (This is especially true if analog outputs are implemented using pulse width modulation to emulate a true analog-type output.) Because specialized hardware for each mode of operation is not required, it is much easier to provide any given output device with the ability to operate in different modes.

Another advantage with respect to the processing of outputs is that the central control unit 14 has the ability to synchronize or desynchronize different output devices. For example, in connection with the flashing emergency lights, it is possible to more precisely control the emergency lights and to have different lights flashing with exactly the same frequency but at a different phase. This prevents multiple sets of lights from undesirably turning on at the same time. For fire trucks with circuit breakers, this situation is undesirable because it can cause the current draw of the multiple sets of lights to trip a circuit breaker, thereby rendering the flashing emergency lights inoperative altogether.

Referring now to FIG. 5, the operation of the control system 12 to disengage the rear scene lights 351 in response to a changed interlock condition is illustrated. Federal Motor Vehicle Safety Standard (FMVSS) regulations prohibit the use of white lights on the back of a vehicle when the vehicle is moving forward. This regulation prevents other drivers from confusing the vehicle with oncoming traffic. Therefore, if a fire truck at the scene of a fire has white rear scene lights turned on and a firefighter decides to move the fire truck, the firefighter must first remember to turn off the white rear scene lights. FIG. 5 illustrates the operation of the control system to implement an interlock system 316 that eliminates the need for the firefighter to have to remember to turn off the rear scene lights in this situation.

To implement this type of control, a sensor 342 that monitors the status of the parking brake is utilized. The control rules governing the interlock condition for this example are then as follows. The rear scene lights 351 should disengage when the parking brake is disengaged. However, the rear scene lights are allowed to be on when the parking brake is off. Therefore, the rear scene lights are turned off only when there is an on→off transition of the parking brake and, otherwise, the rear scene lights are allowed to be on.

Accordingly, by way of example, the parking brake is turned off at step 501. At step 502, the parking brake sensor 342 transmits an input signal to the interface module 31. At step 503, the interface module 31 processes the input signal. For example, the interface module 31 performs debounce filtering to require stabilization of the mechanical state of the sensor before a state change is recognized.

At step 504, the interface module 31 transmits the input signal in the form of a network to the control unit 14 by way of a network communication link 67. At step 505, the control unit 14 processes the input signal. For example, the control unit 14 determines that the rear scene lights 351 are on, and that there has been an on→off transition in the state of the parking brake sensor 342. Accordingly, at step 506, the control unit 14 generates a first control signal to turn off the rear scene lights 351 and a second control signal to cause the LED indicator 352 to blink.

At step 507, the control unit 14 transmits the first control signal in the form of a network message to the interface module 35. In turn, at step 508, the interface module 35 transmits the control signal to the rear scene light lights 351, thereby causing the rear scene lights to turn off.

At step 509, the control unit 14 transmits the second control signal in the form of a network message to the interface module 21. In turn, at step 510, the interface module 35 transmits the control signal to the LED indicator 352, thereby causing the LED indicator 352 to blink. The blinking state of the LED indicator 352 indicates to the operator that the control unit 14 considers the switch 341 to be on, but that the rear scene lights 351 are nevertheless off because some other condition on the fire truck is not met. In this case, the rear scene lights 351 are off due to the on→off transition in the state of the parking brake. In this way, operator feedback is maximized.

The flowchart of FIG. 4, at step 510, shows the use of a single control signal to cause the LED indicator 352 to blink. In practice, the blinking of the LED indicator 352 may be achieved in a variety of ways. For example, if a simple hard-wired connection between the interface module 21 and the LED indicator 352 is utilized, the interface module 21 may periodically provide periodic on and off control signals to the LED indicator 352 by periodically applying power to the output terminal that is connected to the LED indicator 352. Alternatively, if a blinker module is utilized, the interface module may provide a single control signal to the blinker module, which then controls blinking of the LED indicator 352.

If the operator then pushes and releases the switch 341a second time while the parking brake is off, the process in FIG. 4 is repeated and the rear scene lights 351 turn on. In this case, the rear scene lights 351 turn on even though the parking brake is off, because the control system 12 only prevents the rear scene lights from being on when the parking brake is first released. If the operator pushes and releases the switch 341 a third time, the control system 12 turns off the rear scene lights 351.

b. Load Management

Figure 6:
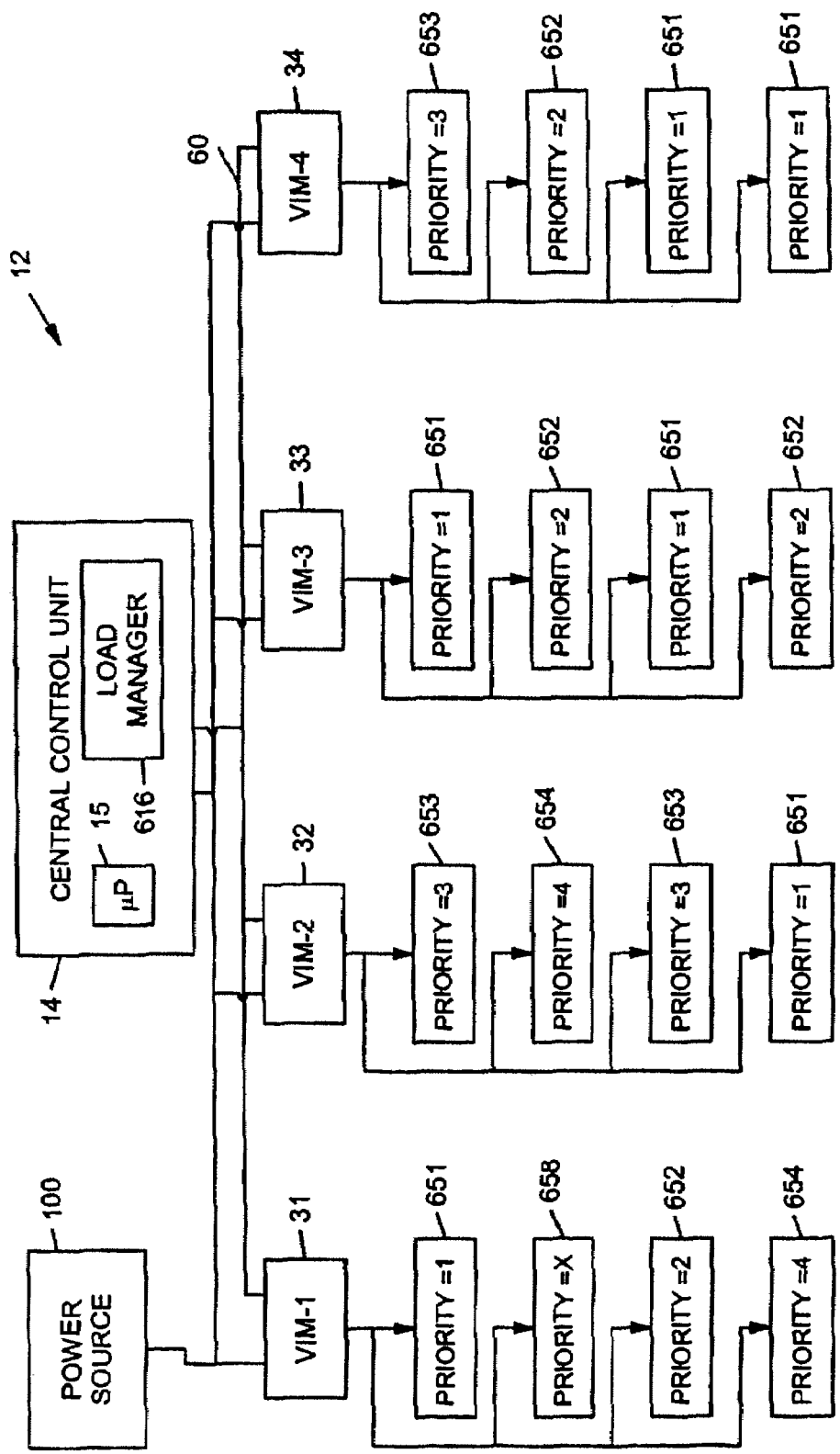
FIG. 6 is another simplified block diagram of the control system of FIGS. 1-2.
Figure 7:
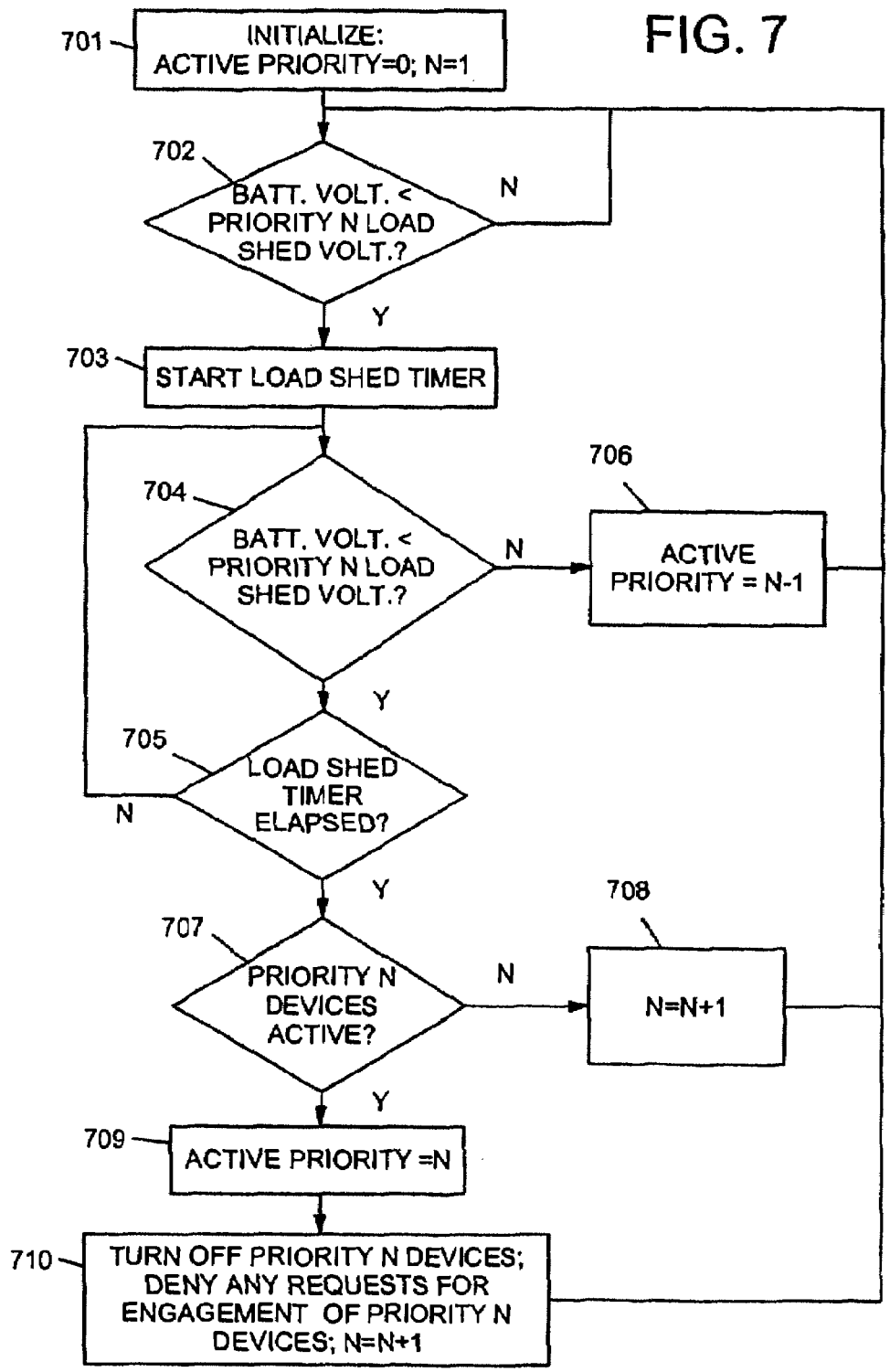
FIG. 7 is a flowchart showing the operation of the control system of FIG. 6 to implement load management when battery voltage decreases.
Figure 8:
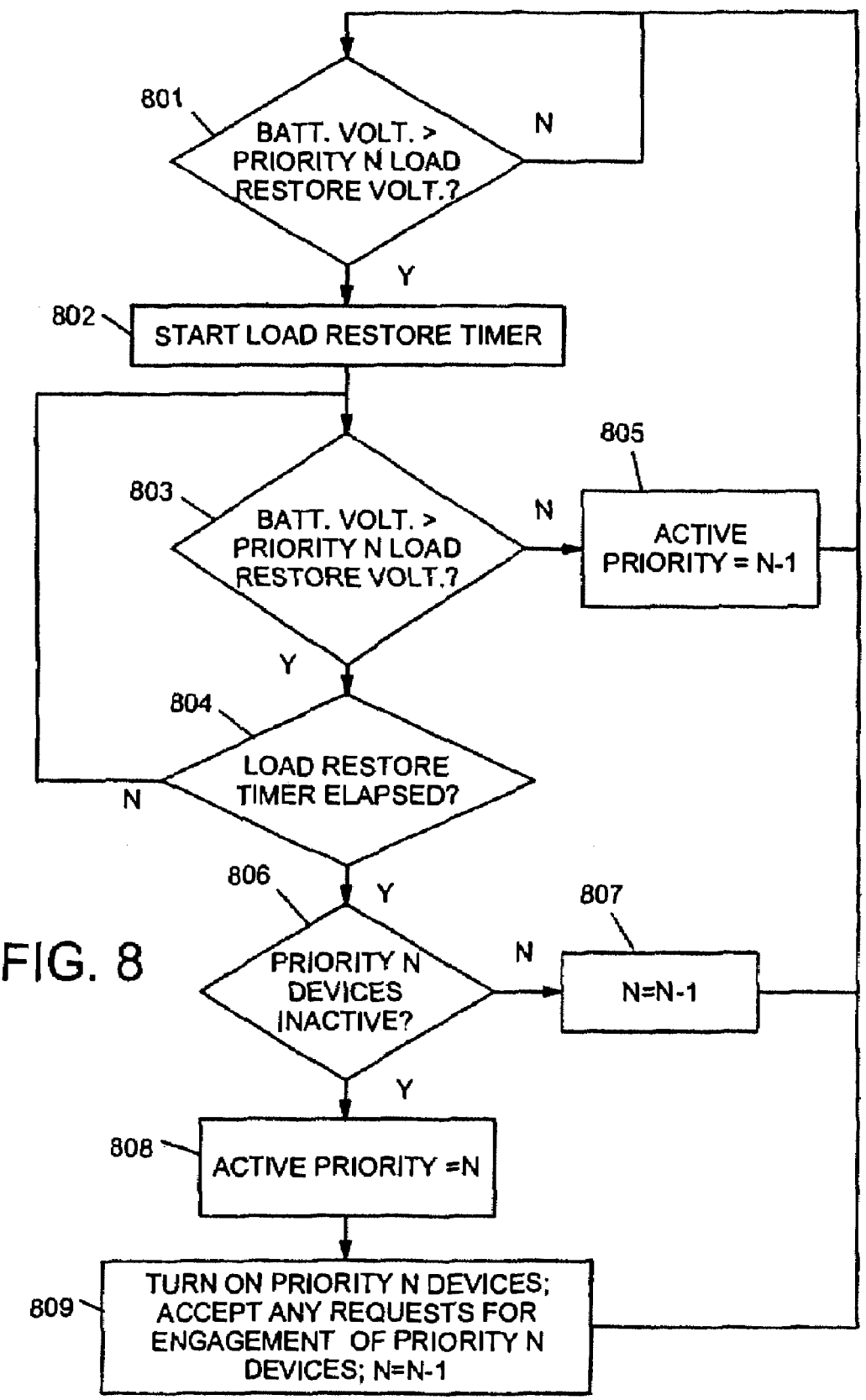
FIG. 8 is a flowchart showing the operation of the control system of FIG. 6 to restore power to output devices that have been shed during the load management illustrated in FIG. 7.

Referring now to FIGS. 6-8, a second example of the operation of the control system 12 is given. FIG. 6 is another block diagram of the control system 12, which has been simplified to the extent that some of the structure shown in FIGS. 1-2 is not shown in FIG. 6. Additionally, FIG. 6 shows a plurality of output devices 651, 652, 653 and 654 that have load management priority levels equal to one, two, three and four, respectively. The output devices 651, 652, 653 and 654 are exemplary ones of the output devices 50 of FIGS. 1-2. Finally, the central control unit 14 is shown to include a load manager 616, which is implemented in the control program 16 executed by the microprocessor 15.

Because the output devices 651, 652, 653 and 654 are assigned four different load management priority levels, the load manager 616 is referred to as a four level load manager. As will become apparent, implementing a load manager with additional priority levels can be achieved simply by defining additional priority levels. Indeed, it is even possible for the load manager 616 to have the same number of levels as there are output devices, by assigning every output device a different priority level and by shedding the output devices one by one as the battery voltage drops.

FIG. 7 is a flowchart showing the operation of the load manager 616. In particular, the flowchart of FIG. 7 describes the operation of the load manager 616 to turn off output devices in layers when the system voltage decreases. It may be noted that a similar approach may be used when the system voltage increases, in which case devices that are sensitive to over voltage conditions may be turned off in layers as the system voltage increases.

At step 701, the load manager initializes tracking variables and sets the active priority equal to zero. The active priority is the priority level that is currently shed. (In the described embodiment, the parameter N is typically equal to the active priority minus one. However, the parameter N could also simply be equal to the active priority.) Therefore, assuming that none of the output devices 651, 652, 653, 654 are shed, then the active priority level is equal to zero. The active priority increases as shedding occurs.

At step 702, the control unit 14 determines whether the battery voltage has decreased to the priority N load shed voltage. Initially, the tracking variable N is equal to one and so, initially, the control unit 14 is determining in step 702 whether the battery voltage has decreased enough for the first layer of shedding to occur. If the battery voltage has not decreased, then the control unit 14 continues to monitor the battery voltage until the priority 1 load shed voltage is reached.

At step 703, when the battery voltage has decreased to the priority 1 load shed voltage, then the control unit 14 starts a load shed timer. The purpose of the load shed timer is to ensure that a temporary reduction in the battery voltage (for example, caused by engagement of an output device that draws a significant amount of current) is not misinterpreted as the battery running out of power, so that the control unit 14 does not unnecessarily start shedding output devices.

The control unit 14 continues to monitor the battery voltage at step 704 until the load shed timer elapses at step 705. During this time, the control unit 14 continues to monitor whether the battery voltage is equal to or less than the priority 1 load shed voltage. If the battery returns above the load shed voltage, then that indicates only a temporary voltage reduction has occurred and therefore the process returns to step 702 after the active priority is set equal to N−1 at step 706. In this case, since N is equal to one, the active priority remains equal to zero, in other words, no output devices are shed.

If the battery voltage is still equal to or less than the priority 1 load shed voltage when the load shed timer elapses at step 705, then the process proceeds to step 707. At step 707, the control unit 14 determines whether any of the priority 1 output devices are active. If none of the priority 1 output devices 651 are active, then N is incremented by one, and the process proceeds to step 702. At step 702, the control unit 14 determines whether the battery voltage has decreased to the priority 2 load shed voltage. Thus, because the battery voltage is low, but there were no priority 1 output devices 651 to shed at step 707, the control unit determines whether it is appropriate to start shedding priority 2 output devices 652. The control unit 14 repeats the process and continues to search for a level of devices to shed until either the battery voltage is not low enough to justify shedding the next layer of devices (in which case the process proceeds to step 706, where the active priority is set equal to the highest level at which the battery voltage is low enough to cause shedding, if there were output devices to shed, and then the process returns to step 702) or until step 707 is answered affirmatively (in which case the process proceeds to step 709, where the active priority is set equal to the priority level at which output devices are available for shedding, and then the process proceeds to step 710).

At step 710, these output devices are shed, the variable N is incremented, and the process proceeds to step 702 where the control unit 14 determines whether the battery voltage is less than the load shed voltage of the next priority level. The process then repeats until the battery voltage is greater than the load shed voltage of the next priority level.

When the active priority level becomes non-zero, the control unit 14 denies all requests for engagement of devices that have a priority level which is equal to or less than the active priority level. Thus, all devices that have a priority level which is equal to or less than the active priority level remain off, at least until the battery voltage increases and it becomes appropriate to restore some output devices, as described below in connection with FIG. 8.

As previously described, some output devices are controlled by switches that are integrally fabricated with an LED indicator. For such output devices, the control unit 14 causes the appropriate LED indicator to start blinking, thereby advising the operator that the switch is recognized by the control unit 14 as being turned on, but that the associated output device is nevertheless disengaged because it is being load managed. The process of making indicator LEDs blink was described previously in connection with FIG. 4.

Referring now to FIG. 8, a process for restoring power to output devices is illustrated. The battery is connected to the alternator and, if loading is reduced enough, the battery will begin to regain voltage. Therefore, it may become appropriate to restore power to at least some output devices. The process shown in FIG. 8 for restoring power is essentially the opposite of the process shown in FIG. 7. The process of FIG. 8 may be performed in time alternating fashion with respect to the process of FIG. 7.

In particular, at step 801, it is determined whether the battery voltage has increased to the priority N load restore voltage. For example, if the active priority is currently set equal to three, then step 801 determines whether the battery voltage is greater than or equal to the priority 3 load restore voltage. The priority 3 load restore voltage is preferably larger than the priority 3 load shed voltage in order to implement a hysteresis effect that avoids output devices from flickering on and off.

At step 802, when the battery voltage has increased to the priority 3 load restore voltage, then the control unit 14 starts a load restore timer. The purpose of the load restore timer is to ensure that a temporary voltage surge is not misinterpreted as the battery regaining power, so that the control unit 14 does not inappropriately start restoring output devices.

The control unit continues to monitor the battery voltage at step 803 until the load restore timer elapses at step 804. During this time, the control unit 14 continues to monitor whether the battery voltage is still equal to or greater than the priority 3 load shed voltage. If the battery returns below the load restore voltage, then that indicates only a temporary voltage surge and therefore the process returns to step 801 after the active priority is set equal to N−1 at step 805. In this case, since N is equal to four (N is always one greater than the active priority in the described embodiment), the active priority remains equal to three, in other words, no output devices are restored.

If the battery voltage is still equal to or greater than the priority 3 load restore voltage at step 804, then the process proceeds to step 806. At step 806, the control unit 14 determines whether any of the priority 3 output devices 653 are inactive. If none of the priority 3 output devices are inactive, then N is decremented by one, and the process proceeds to step 801. At step 801, the control unit 14 determines whether the battery voltage has increased to the priority 2 load restore voltage. Thus, because the battery voltage has increased, but there were no priority 3 output devices 653 to restore at step 806, the control unit determines whether it is appropriate to start restoring priority 2 output devices 652. The control unit 14 continues to search for a level of devices to restore until either the battery voltage is not high enough to justify restoring the next layer of devices (in which case the process proceeds to step 805, where the active priority is set equal to the highest level at which the battery voltage is high enough to permit restoring, if there were output devices to restore, and then the process returns to step 801) or until step 806 is answered affirmatively (in which case process proceeds to step 808, where the active priority is set equal to the priority level at which output devices are available for restoring, and then the process proceeds to step 809).

At step 809, these output devices are restored, the variable N is decremented, and the process proceeds to step 702 where the control unit 14 determines whether the battery voltage is greater than the load restore voltage of the next priority level. The process then continues until the battery voltage is less than the load restore voltage of the next priority level, or until all devices have been restored. Once a level of output devices has been restored, the control unit 14 starts accepting requests to turn on output devices having the restored priority level.

The implementation of the load manager 616 in the control unit 14 permits a high degree of flexibility to be obtained. For example, the priority level of output devices can be changed without requiring any hardware changes. For example, air conditioning might be given a higher priority in summer, when air conditioning is more critical for cooling off firefighters that have been inside a burning building, and less of a priority in winter when the outside temperature may be below freezing.

Further, the priority of the output devices can change dynamically as a function of the operating mode of the fire truck. Thus, in FIG. 6, the output device 658 is illustrated as having a priority X. The variable X may be set equal to one value for most operating conditions. However, upon receiving a request for the output device 658, the central control unit can review the I/O state of the fire truck and, if predetermined I/O conditions are met, give the output device 658 a higher load management priority level, thereby allowing the output device 658 to turn on. Because the load management priority level is a software-assigned value, and is not hardwired by relay logic, it is possible to change the load management priority level of output devices dynamically while the fire truck is operating at the scene of a fire.

An additional advantage of the control system 12 is that it is more flexible and allows a higher level of load management granularity to be achieved. With the control system 12, it is possible to shed individual output devices instead of just groups of devices. For example, it is possible to shed individual lights within a lighting system without turning off the whole lighting system.

Another advantage of the control system 12 is that it can be given the ability to predict operational requirements of the fire truck, such that potential operational difficulties can be avoided. For example, with the load manager 616, the battery current draw may be monitored and very low priority loads may be preemptively shed in order to slow down or prevent the loss of battery power.

Another advantage of the control system 12 is that can be given the ability to perform prognoses of various system conditions and use the information obtained to alleviate or prevent operational difficulties. For example, the load manager 616 can predict, based on a knowledge of how much battery current is being drawn, how long the battery will last until it is necessary to start shedding output devices. Other examples also exist. For example, water flow from an on-board water supply can be monitored and the amount of time remaining until water is depleted can be displayed to an operator of the fire truck 10. This allows firefighters to know with greater accuracy how quickly they need to get the fire truck connected to a fire hydrant before the water supply is depleted. Similarly, for oxygen masks used in the basket of an aerial, oxygen flow can be monitored and the amount of time remaining until oxygen is depleted can be displayed to an operator of the fire truck. Again, this allows firefighters to know with greater accuracy how quickly the oxygen supply should be replenished. Although conventionally, fire trucks have level indicators that indicate the amount of water or oxygen remaining, firefighters are generally more concerned about the amount of time remaining rather than the absolute quantity of water/oxygen remaining. This is especially true since the water and oxygen flow rates can vary significantly during the operation of the fire truck.

c. Load Sequencing

Figure 9:
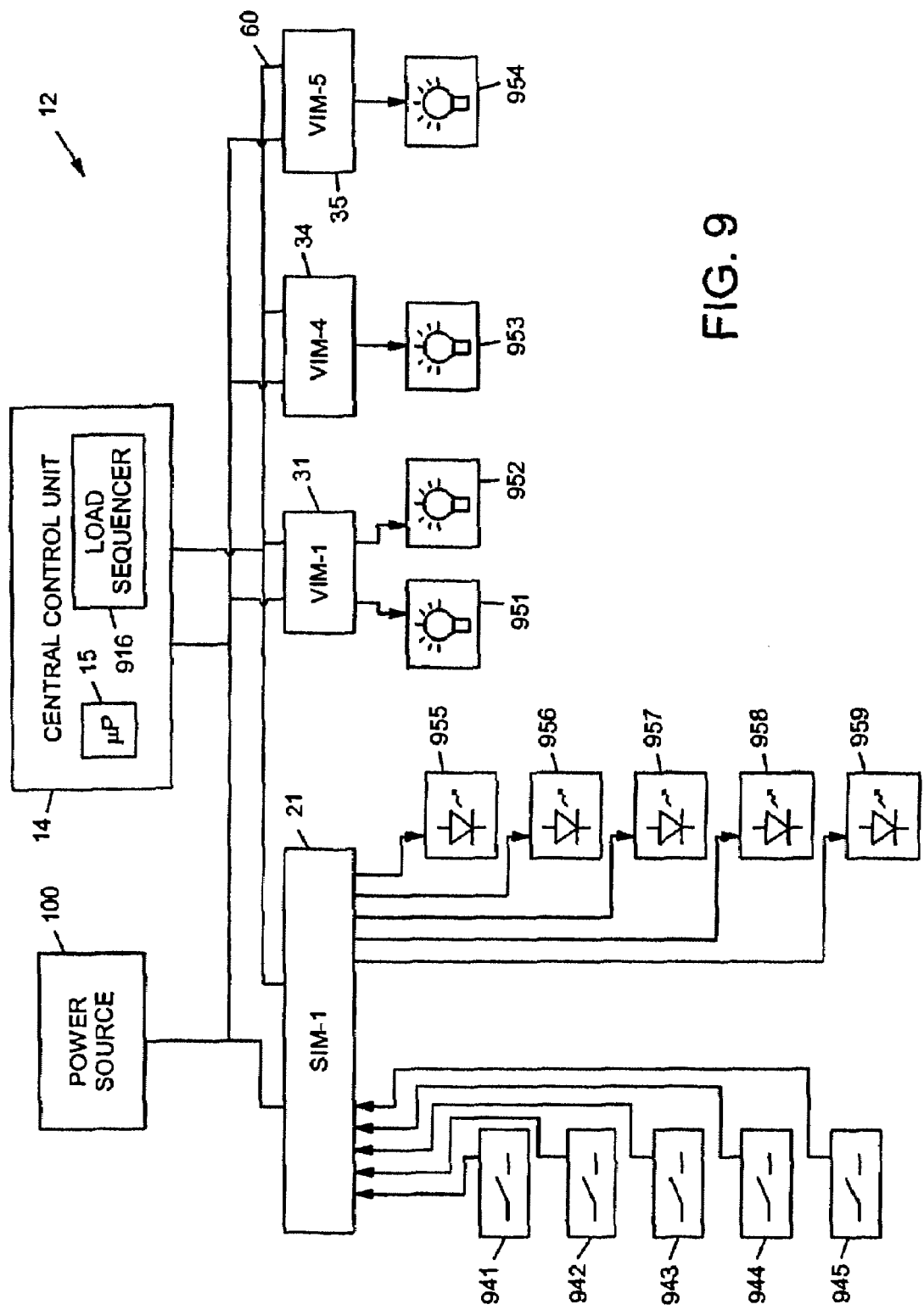
FIG. 9 is another simplified block diagram of the control system of FIGS. 1-2.
Figure 10A:
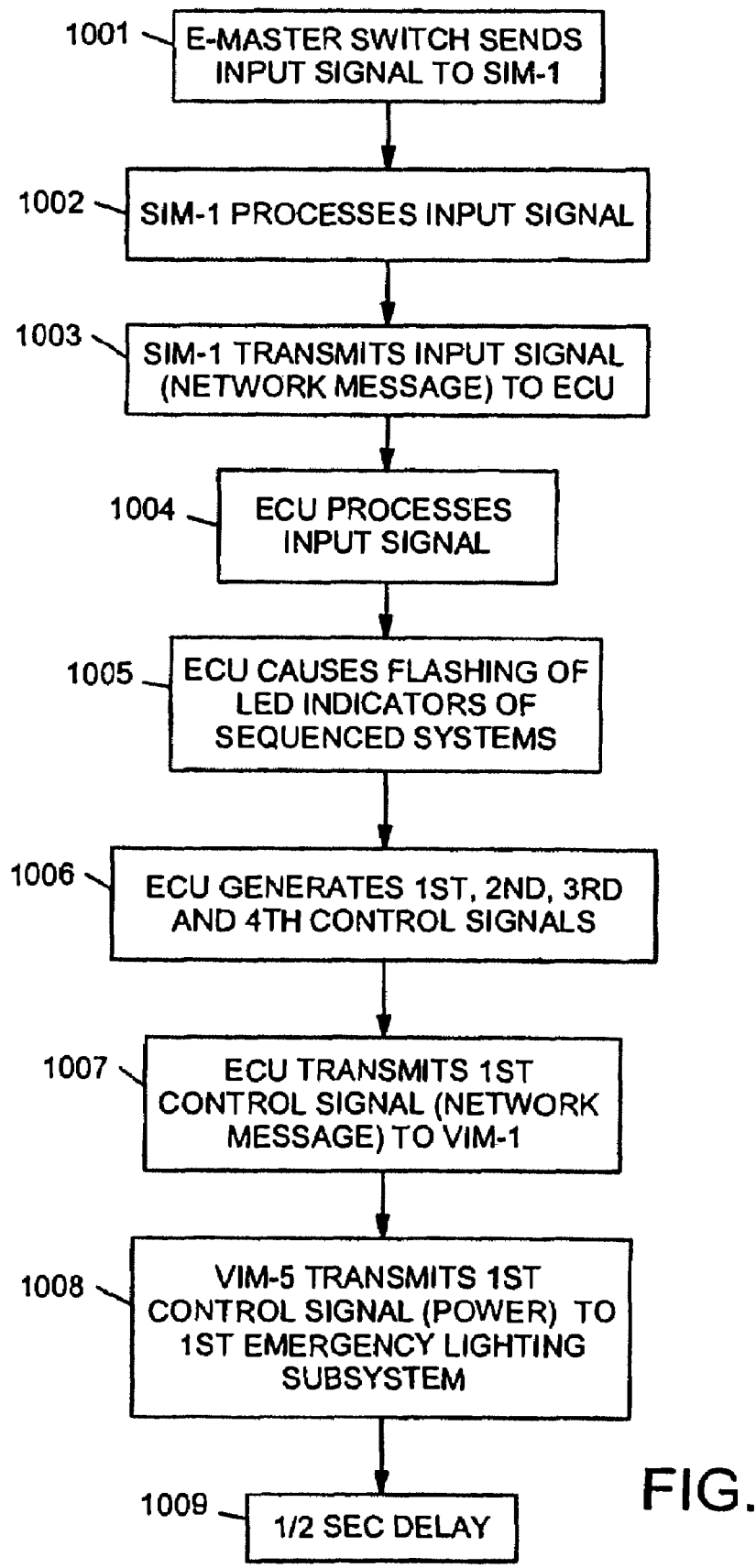
FIGS. 10A-10B are flowcharts showing the operation of the control system of FIG. 9 to implement load sequencing in response to an operator input.
Figure 10B:
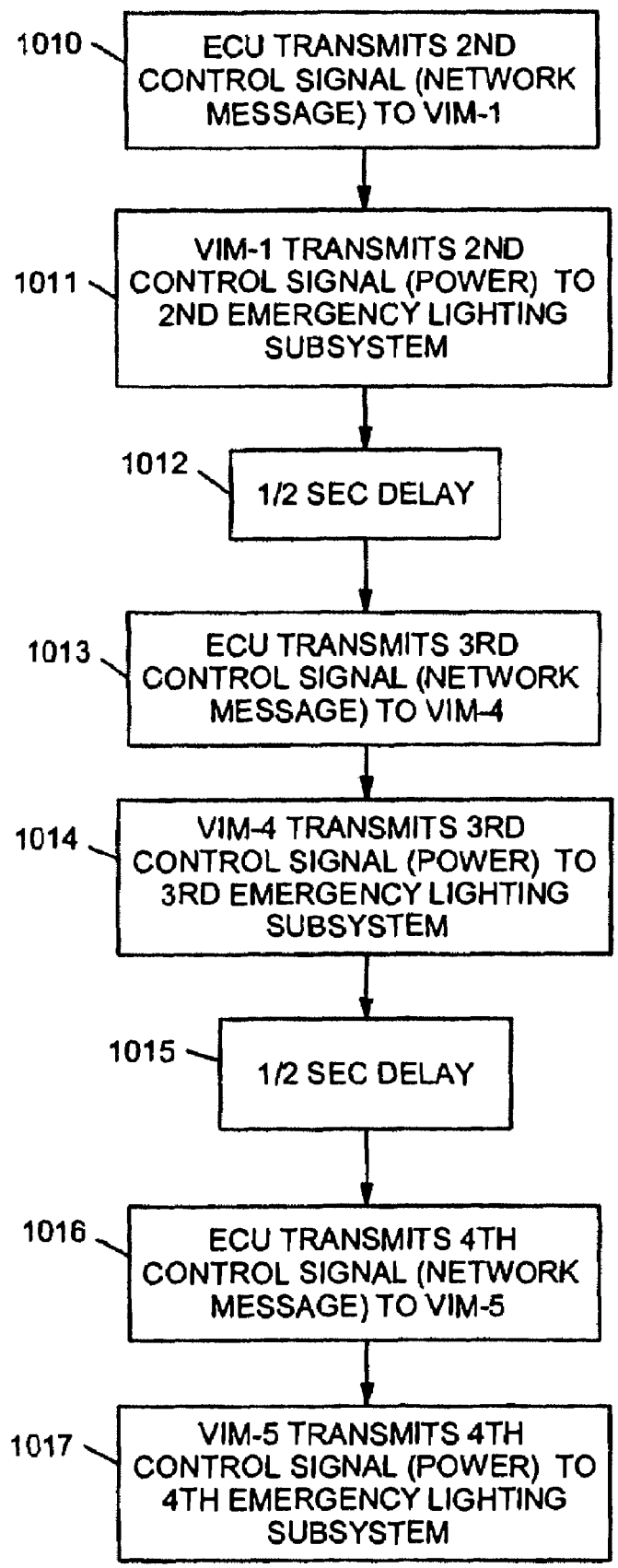

Referring now to FIGS. 9, 10A, and 10B, a second example of the operation of the control system 12 is given. FIG. 9 is another block diagram of the control system 12, which has been simplified to the extent that some of the structure shown in FIGS. 1-2 is not shown in FIG. 9. Additionally, FIG. 6 shows a plurality of switches 941-945, a plurality of emergency lighting subsystems 951-954, and a plurality of LED indicators 955-959. The central control unit 14 includes a load sequencer 916, which is implemented in the control program 16 executed by the microprocessor 15.

In FIGS. 9, 10A and 10B, the operation of the load sequencer is described with respect to four emergency lighting subsystems 951-959. It may be noted that the load sequencer may be used in other situations to control other output devices. For example, another load sequencer may be used when battery power is first applied, and another when the ignition is first turned on.

The lighting subsystems 951-59 may each, for example, comprise one emergency light or a set of emergency lights that are coupled to an output of one of the interface modules 30. Additionally, while only four subsystems are shown, in practice the load sequencer may be used to control additional emergency lighting subsystems.

The switches 941, 942, 943 and 944 respectively control the emergency lights 951, 952, 953 and 954. The remaining switch 945 is the E-master switch. For any given set of emergency lights, both the E-master switch and the respective switch 941-944 must be turned on. Initially, the previous active on/off states of the switches 941-944, which have been stored in non-volatile memory, are recalled. Then, when an emergency call is received, an operator activates the E-master switch 945.

At step 1001, E-master switch 945 transmits an input signal to the interface module 21. At step 1002, the interface module processes the input signal. At step 1003, the interface module 21 transmits the input signal in the form of a network message to the central control unit 14. At step 1004, the central control unit processes input signal.

At step 1005, the control unit causes blinking of the LED indicators 955-959 of the sequenced emergency lighting subsystems 951-954. In particular, the control unit transmits control signals (in the form of network messages) to the interface modules that are connected to the LED indicators 955-959, which in turn transmit the control signals to the LED indicators 955-959 themselves, in the manner previously described. The operation of the indicators 955-959 is the same as has previously been described, namely, the LED indicators 955-959 blink when the switches 941-944 are turned on but the lighting subsystems 951-954 are not turned on. As the subsystems 951-954 turn on one by one, so too do the LED indicators 955-959. Accordingly, because the operation of the LED indicators 955-959 indicators is the same as has been described elsewhere, the operation of the LED indicators 955-959 will not be described further.

At step 1006, the central control unit generates first, second, third, fourth and fourth control signals. At step 1007, the central control unit 14 transmits the first control signal in the form of a network message to the interface module 35. At step 1008, the interface module 35 transmits the first control signal in the form of a power signal to the first emergency lighting subsystem 951.

The control unit 14 then transmits additional control signals at one-half second intervals. Thus, after a one-half second delay at step 1009, the central control unit transmits the second control signal in the form a network message to the interface module 31 at step 1010. At step 1011, the interface module 31 then sends the second control signal in the form of a power signal to the second emergency lighting subsystem 952. After another one-half second delay at step 1012, the central control unit 14 transmits the third control signal in the form a network message to the interface module 34 at step 1013. At step 1014, the interface module 34 then sends the third control signal in the form of a power signal to the third emergency lighting subsystem 953. Finally, after another one-half second delay at step 1015, the central control unit 14 transmits the third control signal in the form a network message to the interface module 35 at step 1016. At step 1017, the interface module 35 then sends the second control signal in the form of a power signal to the fourth emergency lighting subsystem 954. As previously indicated in connection with step 510 of FIG. 5, there are a variety of ways in which the blinking/flashing of outputs can be achieved, using either only a single control signal or using a first control signal followed by multiple additional control signals.

Figure 11A:
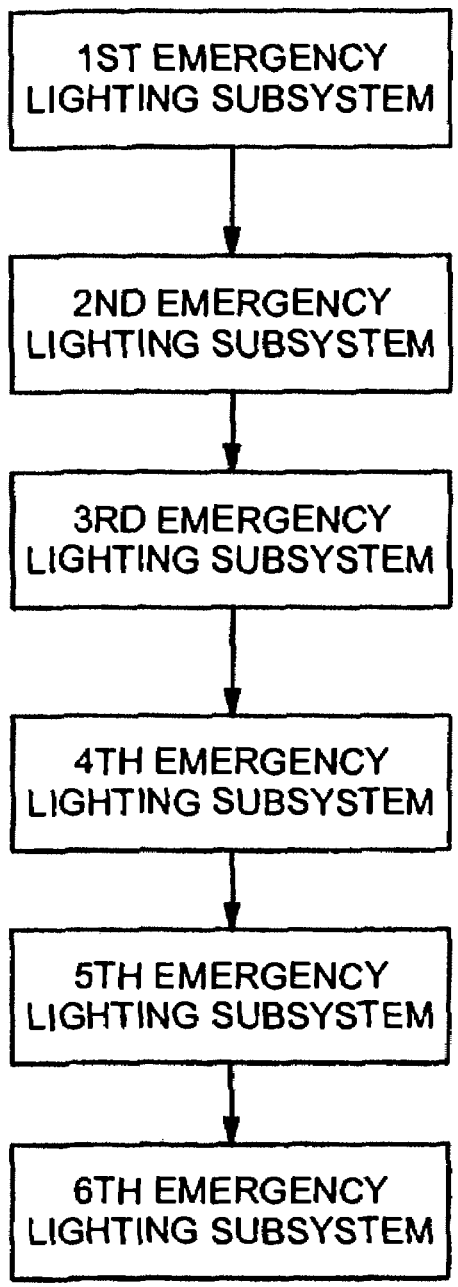
FIGS. 11A-11B are flowcharts showing the operation of the control system of FIG. 9 to implement load sequencing in different orders depending on an operating mode of the fire truck.
Figure 11B:
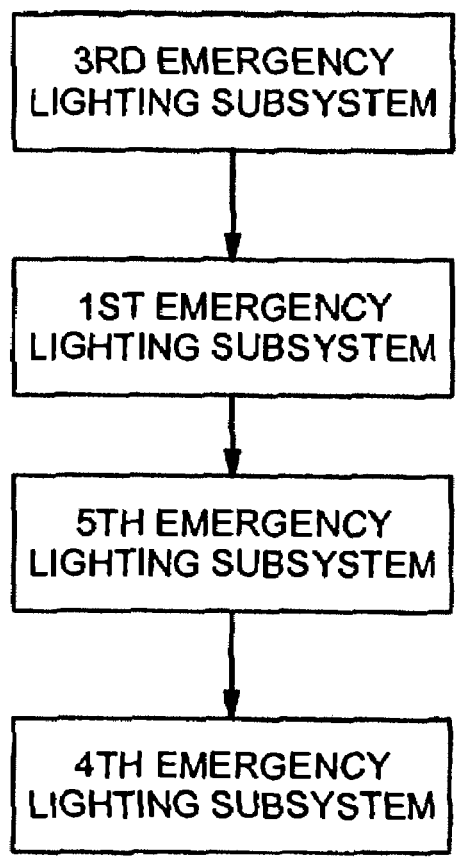
Figure 13:
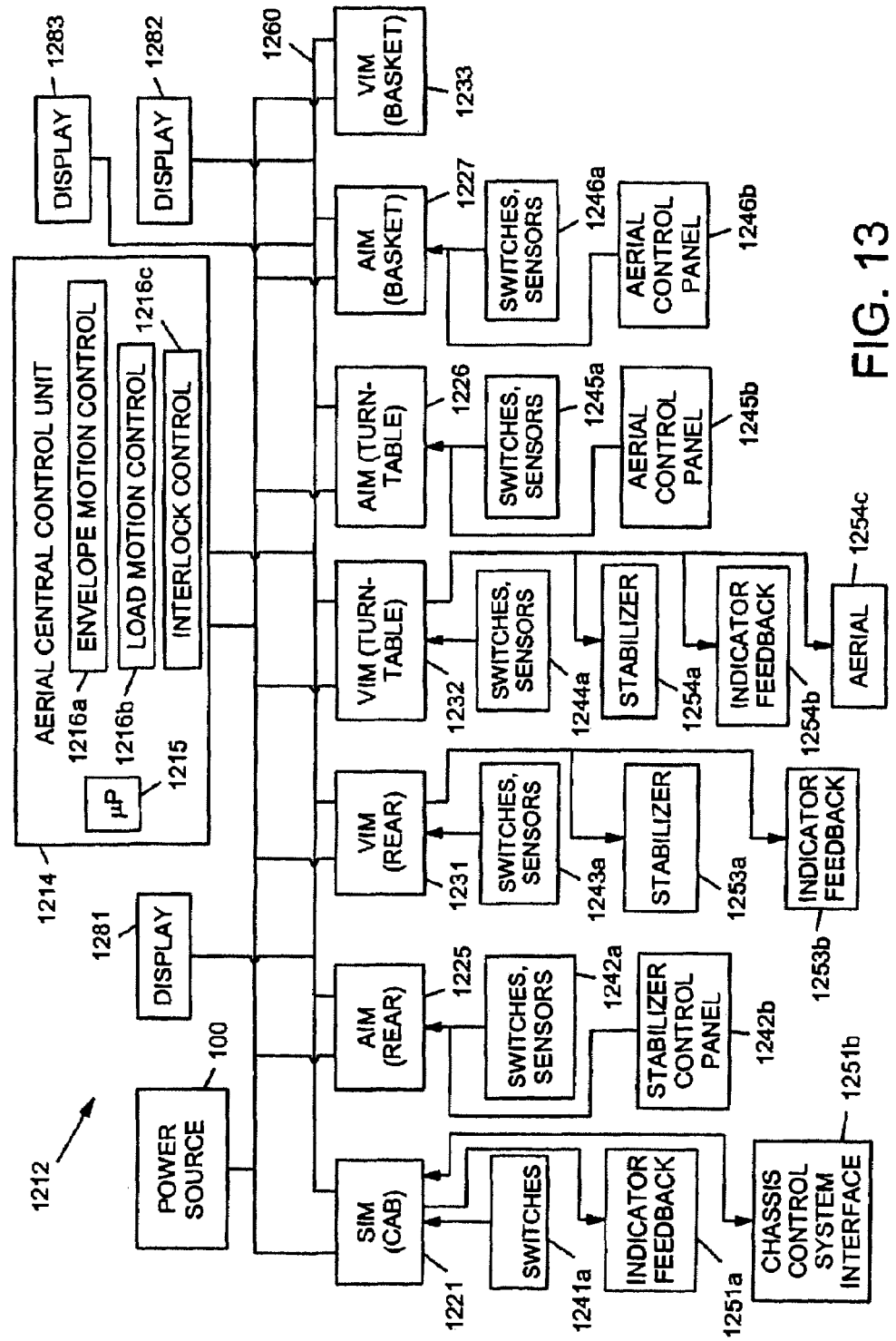
FIG. 13 is a more detailed block diagram of the control system of FIG. 12.

Referring now to FIGS. 11A and 11B, another advantage of the control system 12 is the flexibility of the load sequencer 916. Like the load manager 616, the load sequencer 916 can operate as a function of the operating mode of the fire truck. Thus, in FIG. 11A, the load sequencer 916 turns subsystems on in a first order (1st, 2nd, 3rd, 4th, 5th, 6th) in a first operating mode of the fire truck 10. In a different operating mode of the fire truck, a somewhat different group of subsystems is load sequenced and they are load sequenced in a different order (3rd, 1st, 5th, 4th, 7th, 8th). The two different modes of operation can be activated, for example by two different master on/off switches. In the context of emergency lighting systems, this arrangement is useful where it is desirable to have the emergency lighting subsystems load sequence differently depending on whether the fire truck is traveling from the fire station to the fire or vice versa.

As another example of load sequencing performed as a function of the operating mode of the truck, it may be noted that, because the control unit 14 knows the on/off states of all of the output devices 50, load sequencing can be performed taking into account the current on/off state of the output devices that are load sequenced. For example, if some output devices are already turned on, then the load sequencer 916 can immediately proceed to the next output device without wasting time turning on a device that is already turned on. This advantageously permits load sequencing to be performed more quickly.

3. Aerial Control

Referring now to FIG. 12, a preferred embodiment of a fire truck 1210 with an aerial 1211 having an aerial control system 1212 is illustrated. By way of overview, the control system 1212 comprises an aerial central control unit 1214, a plurality of microprocessor-based interface modules 1220, 1230 and 1235, a plurality of input devices 1240, and a plurality of output devices 1250. The central control unit 1214 and the interface modules 1220, 1230 and 1235 are connected to each other by a communication network 1260.

The control system 1212 is similar in most respect to the control system 12, with the primary difference being that the control system 1212 is used to control the output devices 1250 on the aerial 1211 based on input status information from the input devices 1240, rather than to control the output devices 50 on the chassis 11. The interface modules 1220 and 1230 may be identical to the interface modules 20 and 30, respectively, and the central control unit 1214 may be identical to the central control unit 14 except that a different control program is required in connection with the aerial 1211. Accordingly, the discussion above regarding the interconnection and operation of the interface modules 20 and 30 with the input devices 40 and output devices 50 applies equally to the central control unit 1214, except to the extent that the control system 1212 is associated with the aerial 1211 and not with the chassis 11.

The aerial control system 1212 also includes the interface modules 1225-1227, which are similar to the interface modules 20 and 30 except that different I/O counts are utilized. In the preferred embodiment, the interface modules 1225-1227 have twenty-eight switch inputs (two of which are configurable as frequency inputs). As previously noted, rather than using several different types of interface modules, it may be desirable to use only a single type of interface module in order to reduce inventory requirements. Additionally, the number of interface modules and the I/O counts are simply one example of a configuration that may be utilized.

It is desirable to use a control system 1212 for the aerial 1211 which is separate from the control system 12 in order to provide a clear separation of function between systems associated with the aerial 1211 and systems associated with the chassis 11. Additionally, as a practical matter, many fire trucks are sold without aerials and therefore providing a separate aerial control system enables a higher level commonality with respect to fire trucks that have aerials and fire trucks that do not have aerials.

A specific example will now be given of a preferred interconnection of the interface modules with a plurality of input devices 1240 and output devices 1250. The interface module 1221 receives inputs from switches 1241a which may include for example an aerial master switch that activates aerial electrical circuits, an aerial PTO switch that activates the transmission to provide rotational input power for the hydraulic pump, and a platform leveling switch that momentarily activates a platform (basket) level electrical circuit to level the basket relative to the current ground grade condition. The LED indicators 1251 provide visual feedback regarding the status of the input switches 1241a.

The interface modules 1225 and 1231 are located near a ground-level control station at a rear of the fire truck 10. The interface modules 1225 and 1231 receive inputs from switches 1242a and 1243a that include, for example, an auto level switch that activates a circuit to level the fire truck using the stabilizer jacks and an override switch that overrides circuits for emergency operation. The interface modules 1225 and 1231 may also receive inputs from an operator panel such as a stabilizer control panel 1242b, which includes switches that control the raising and lowering of front and rear stabilizer jacks, and the extending and retracting of front and rear stabilizer jacks. The stabilizer is an outrigger system which is deployed to prevent the fire truck from becoming unstable due to the deployment of an aerial system (e.g., an eighty-five foot extendable ladder). The interface module 1231 may drive outputs that are used to control deployment the stabilizer, which can be deployed anywhere between zero and five feet.

The interface modules 1226 and 1232 are located near a turn table 1218 at the rear of the fire truck 10. The interface modules may receive inputs from switches and sensors 1244a and 1245a, as well as switches that are part of an aerial control panel 1245b and are used to control the extension/retraction, raising/lowering, and rotation of the aerial 1211. The interface modules 1226 and 1232 drive outputs that control the extension/retraction, raising/lowering, and rotation of the aerial 1211, as well as LED indicators 1254b that provide operator feedback regarding the positions of switches and other I/O status information. The interface modules 1227 and 1233 are located in the basket of the aerial and provide duplicate control for the extension/retraction, raising/lowering, and rotation of the aerial.

Additional inputs and outputs 1251b may be used to establish a communication link between the control system 12 and the control system 1212. In other words, the digital on/off outputs of one control system can be connected to the switch inputs of the other control system, and vice versa. This provides for a mechanism of transferring I/O status information back and forth between the two control systems 12 and 1212.

The control system 1212 has complete motion control of the aerial 1211. To this end, the control program 1216 includes an envelope motion controller 1216a, load motion controller 1216b and interlock controller 1216c. Envelope motion control refers to monitoring the position of the aerial and preventing the aerial from colliding with the remainder of the fire truck 10, and otherwise preventing undesirable engagement of mechanical structures on the fire truck due to movement of the aerial. Envelope motion control is implemented based on the known dimensions of the aerial 1211 and the known dimensions and position of other fire truck structures relative to the aerial 1211 (e.g., the position and size of the cab 17 relative to the aerial 1211) and the position of the aerial 1211 (which is measured with feedback sensors 1244a and 1245a). The control system 1212 then disallows inputs that would cause the undesirable engagement of the aerial 1211 with other fire truck structures.

Load motion control refers to preventing the aerial from extending so far that the fire truck tips over due to unbalanced loading. Load motion control is implemented by using an appropriate sensor to measure the torque placed on the cylinder that mechanically couples the aerial 1211 to the remainder of the fire truck. Based on the torque and the known weight of the fire truck, it is determined when the fire truck is close to tipping, and warnings are provided to the operator by way of text messages and LED indicators.

Interlock control refers to implementing interlocks for aerial systems. For example, an interlock may be provided that require the parking brake be engaged before allowing the aerial to move, that require the stabilizers to be extended and set before moving the aerial 1211, that require that the aerial PTO be engaged before attempting to move the aerial, and so on.

Advantageously, therefore, the control system makes the operation of the aerial much safer. For example, with respect to load motion control, the control system 1212 automatically alerts firefighters if the extension of the aerial is close to causing the fire truck to tip over. Factors such as the number and weight of people in the basket 1219, the amount and weight of equipment in the basket 1219, the extent to which the stabilizers are deployed, whether and to what extent water is flowing through aerial hoses, and so on, are taken into account automatically by the torque sensors associated with the cylinder that mounts the aerial to the fire truck. This eliminates the need for a firefighter to have to monitor these conditions manually, and makes it possible for the control system 1212 to alert an aerial operator to unsafe conditions, and puts less reliance on the operator to make sure that the aerial is operating under safe conditions.

4. Additional Aspects

From the foregoing description, a number advantages of the preferred fire truck control system are apparent. In general, the control system is easier to use, more flexible, more robust, and more reliable than existing fire truck control systems. In addition, because of these advantages, the control system also increases firefighter safety because the many of the functions that were previously performed by firefighters are performed automatically, and the control system also makes possible features that would otherwise be impossible or at least impractical. Therefore, firefighters are freed to focus on fighting fires.

The control system is easier to use because the control system provides a high level of cooperation between various vehicle subsystems. The control system can keep track of the mode of operation of the fire truck, and can control output devices based on the mode of operation. The functions that are performed on the fire truck are more fully integrated to provide a seamless control system, resulting in better performance.

For example, features such as load management and load sequencing are implemented in the control program executed by the central control unit. No additional hardware is required to implement load management and load sequencing. Therefore, if it is desired to change the order of load sequencing, all that is required is to modify the control program. It is also possible to have different load sequencing defined for different modes of operation of the vehicle with little or no increase in hardware. The manner in which load management is performed can also be changed dynamically during the operation of the fire truck.

The control system is robust and can accept almost any new feature without changes in wiring. Switches are connected to a central control unit and not to outputs directly, and new features can be programmed into the control program executed by the central control unit. A system can be modified by adding a new switch to an existing interface module, or by modifying the function of an existing switch in the control program. Therefore, modifying a system that is already in use is easy because little or no wiring changes are required.

Additionally, because the control system has access to input status information from most or all of the input devices on the fire truck and has control over most or all of the output devices on the fire truck, a high level of cooperation between the various subsystems on the fire truck is possible. Features that require the cooperation of multiple subsystems are much easier to implement.

The fire truck is also easier to operate because there is improved operator feedback. Displays are provided which can be used to determine the I/O status of any piece of equipment on the vehicle, regardless of the location of the display. Additionally, the displays facilitate troubleshooting, because troubleshooting can be performed in real time at the scene of a fire when a problem is occurring. Troubleshooting is also facilitated by the fact that the displays are useable to display all of the I/O status information on the fire truck. There is no need for a firefighter to go to different locations on the fire truck to obtain required information. Troubleshooting is also facilitated by the provision of a central control unit which can be connected by modem to another computer. This allows the manufacturer to troubleshoot the fire truck as soon as problems arise.

LED indicators associated with switches also improve operator feedback. The LEDs indicate whether the switch is considered to be off or on, or whether the switch is considered to be on but the output device controlled by the switch is nevertheless off due to some other condition on the fire truck.

Because the control system is easier to use, firefighter safety is enhanced. When a firefighter is fighting fires, the firefighter is able to more fully concentrate on fighting the fire and less on having to worry about the fire truck. To the extent that the control system accomplishes tasks that otherwise would have to be performed by the firefighter, this frees the firefighter to fight fires.

The control system is also more reliable and maintainable, in part because relay logic is replaced with logic implemented in a control program. The logic in the control program is much easier to troubleshoot, and troubleshooting can even occur remotely by modem. Also mechanical circuit breakers can be replaced with electronic control, thereby further reducing the number of mechanical failure points and making current control occur more seamlessly. The simplicity of the control system minimizes the number of potential failure points and therefore enhances reliability and maintainability.

The system is also more reliable and more maintainable because there is less wire. Wiring is utilized only to established dedicated links between input/output devices and the interface module to which they are connected. The control system uses distributed power distribution and data collecting. The interface modules are interconnected by a network communication link instead of a hardwired link, thereby reducing the amount of wiring on the fire truck. Most wiring is localized wiring between the I/O devices and a particular interface module.

Additionally, the interface modules are interchangeable units. In the disclosed embodiment, the interface modules 20 are interchangeable with each other, and the interface modules 30 are interchangeable with each other. If a greater degree of interchangeability is required, it is also possible to use only a single type of interface module. If the control system were also applied to other types of equipment service vehicles (e.g., snow removal vehicles, refuse handling vehicles, cement/concrete mixers, military vehicles such as those of the multipurpose modular type, on/off road severe duty equipment service vehicles, and so on), the interface modules would even be made interchangeable across platforms since each interface module views the outside world in terms of generic inputs and outputs, at least until configured by the central control unit. Because the interface modules are interchangeable, maintainability is enhanced. An interface module that begins to malfunction due to component defects may be replaced more easily. On power up, the central control unit downloads configuration information to the new interface module, and the interface module becomes fully operational. This enhances the maintainability of the control system.

Because the interface modules are microprocessor-based, the amount of processing required by the central control unit as well as the amount of communication that is necessary between the interface modules and the central control unit is reduced. The interface modules perform preprocessing of input signals and filter out less critical input signals and, as a result, the central control unit receives and responds to critical messages more quickly.

B. Military Vehicle Control System

Figure 14:
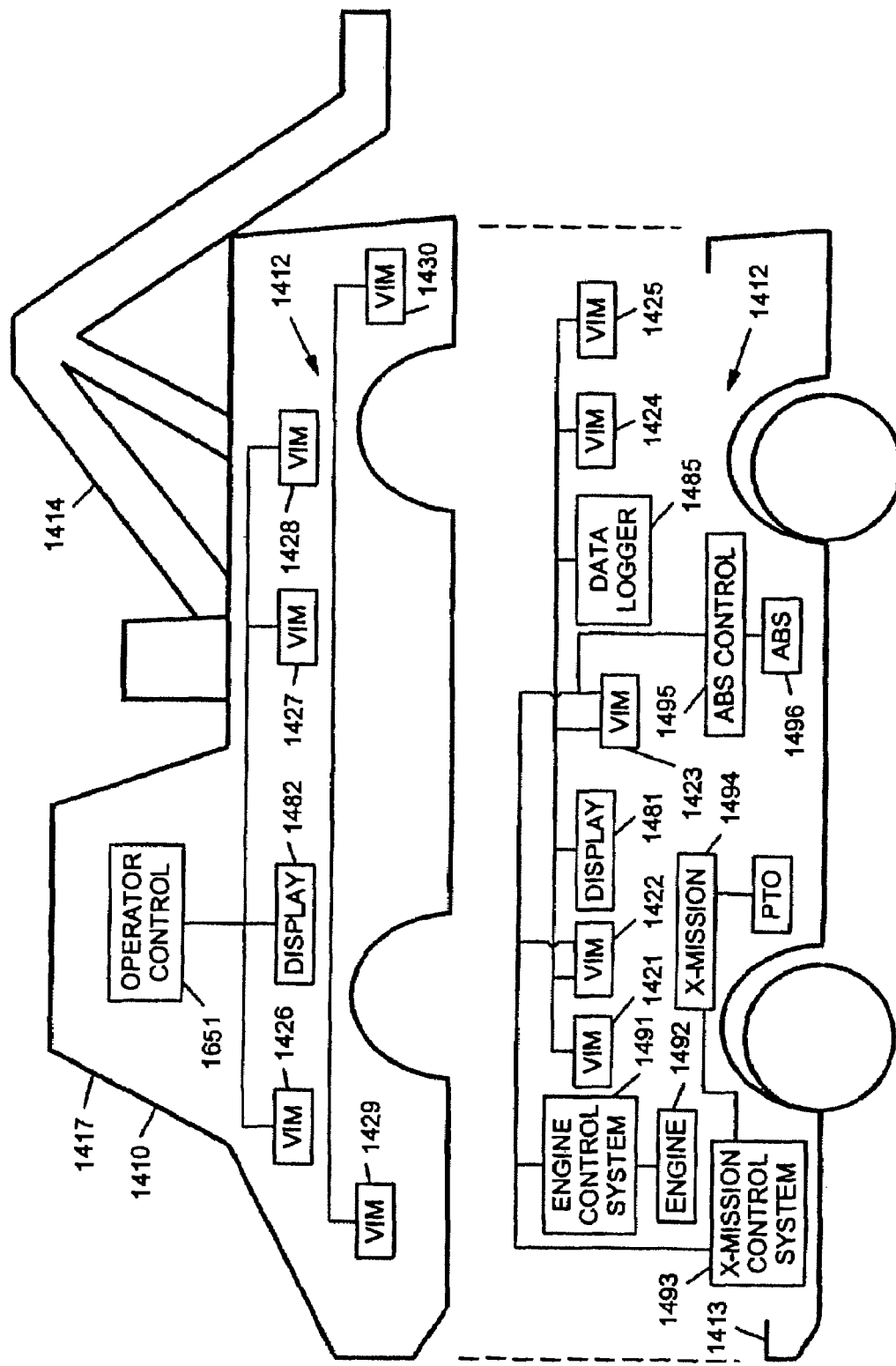
FIG. 14 is a schematic view of a military vehicle having a control system according to another embodiment of the present invention.

Referring now to FIG. 14, a preferred embodiment of a military vehicle 1410 having a control system 1412 is illustrated. As previously indicated, the control system described above can be applied to other types of equipment service vehicles, such as military vehicles, because the interface modules view the outside world in terms of generic inputs and outputs. Most or all of the advantages described above in the context of fire fighting vehicles are also applicable to military vehicles. As previously described, however, it is sometimes desirable in the context of military applications for the military vehicle control system to be able to operate at a maximum level of effectiveness when the vehicle is damaged by enemy fire, nearby explosions, and so on. In this situation, the control system 1412 preferably incorporates a number of additional features, discussed below, that increase the effectiveness of the control system 1412 in these military applications.

By way of overview, the control system 1412 comprises a plurality of microprocessor-based interface modules 1420, a plurality of input and output devices 1440 and 1450 (see FIG. 15) that are connected to the interface modules 1420, and a communication network 1460 that interconnects the interface modules 1420. The control system 1412 preferably operates in the same manner as the control system 12 of FIGS. 1-13, except to the extent that differences are outlined are below. A primary difference between the control system 12 and the control system 1412 is that the control system 1412 does not include a central control unit that is implemented by a single device fixed at one location. Rather, the control system 1412 includes a central control unit that is allowed to move from location to location by designating one of the interface modules 1420 as a "master" interface module and by further allowing the particular interface module that is the designated master interface module to change in response to system conditions. As will be detailed below, this feature allows the control system 1412 to operate at a maximum level of effectiveness when the military vehicle 1410 is damaged. Additional features that assist failure management are also included.

Figure 20:
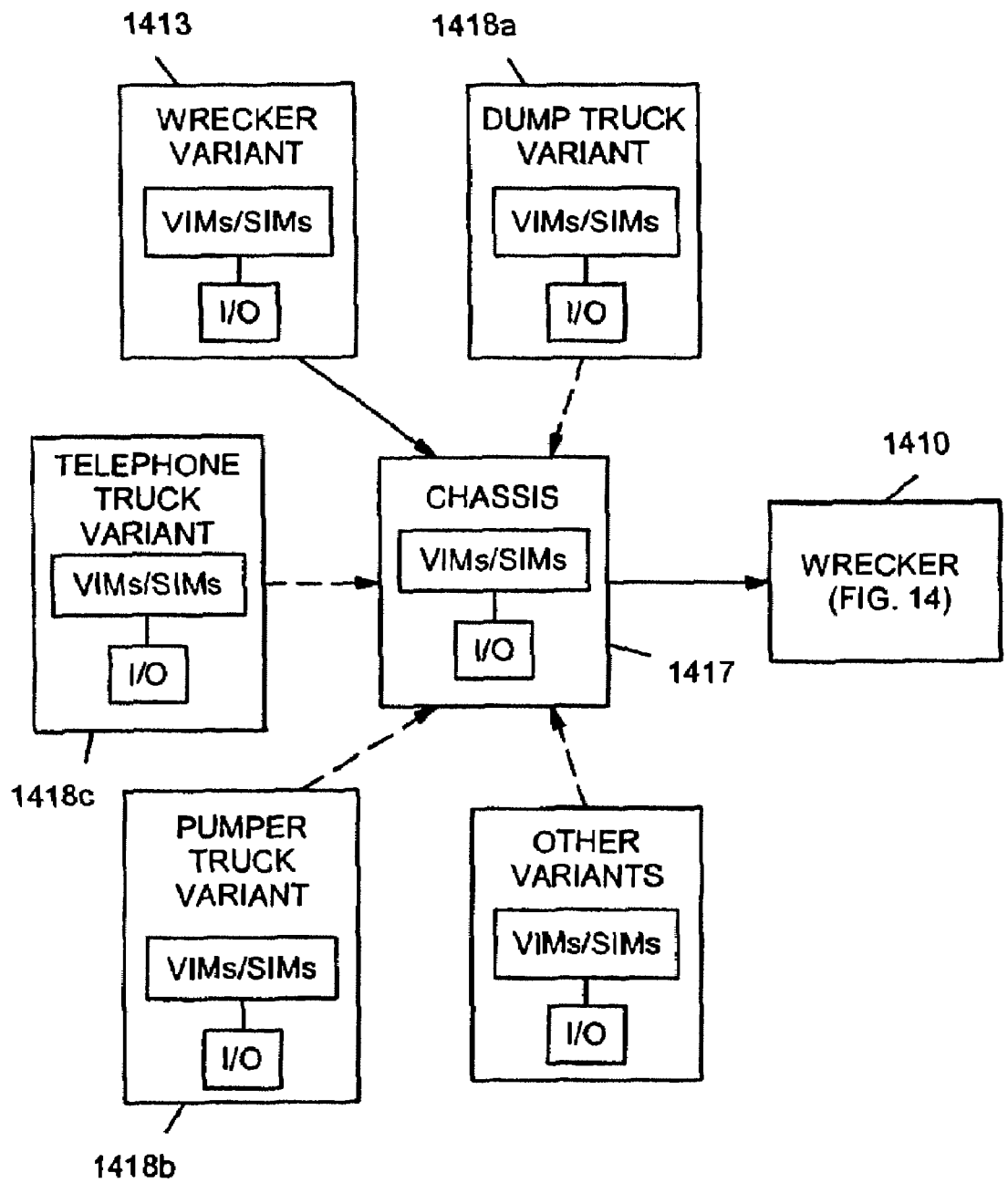
FIG. 20 is an overview of a preferred variant vehicle system.

More specifically, in the illustrated embodiment, the control system 1412 is used in connection with a military vehicle 1410 which is a multipurpose modular military vehicle. As is known, a multipurpose module vehicle comprises a chassis and a variant module that is capable of being mounted on the chassis, removed, and replaced with another variant module, thereby allowing the same chassis to be used for different types of vehicles with different types of functionality depending on which variant module is mounted to the chassis. In the illustrated embodiment, the military vehicle 1410 is a wrecker and includes a wrecker variant module 1413 mounted on a chassis (underbody) 1417 of the military vehicle 1410. The weight of the variant module 1413 is supported by the chassis 1417. The variant module 1413 includes a mechanical drive device 1414 capable of imparting motion to solid or liquid matter that is not part of the military vehicle 1410 to provide the military vehicle 1410 with a particular type of functionality. In FIG. 14, where the variant module 1413 is a wrecker variant, the mechanical drive device is capable of imparting motion to a towed vehicle. As shown in FIG. 20, the variant module 1413 is removable and replaceable with other types of variant modules, which may include a dump truck variant 1418a, a water pump variant 1418b, a telephone variant 1418c, and so on. Thus, for example, the wrecker variant 1413 may be removed and replaced with a water pump variant 1418b having a different type of drive mechanism (a water pump) to provide a different type of functionality (pumper functionality). The I/O devices 1440 and 1450 used by the vehicle 1410 include devices that are the same as or similar to the non-fire truck specific I/O devices of FIGS. 1-13 (i.e., those types of I/O devices that are generic to most types of vehicles), as well as I/O devices that are typically found on the specific type of variant module chosen (in FIG. 14, a wrecker variant).

The interface modules 1420 are constructed in generally the same manner as the interface modules 20 and 30 and each include a plurality of analog and digital inputs and outputs. The number and type of inputs and outputs may be the same, for example, as the vehicle interface modules 30. Preferably, as described in greater detail below, only a single type of interface module is utilized in order to increase the field serviceability of the control system 1412. Herein, the reference numeral 1420 is used to refer to the interface modules 1420 collectively, whereas the reference numerals 1421-1430 are used to refer to specific ones of the interface modules 1420. The interface modules are described in greater detail in connection with FIGS. 15-18.

Also connected to the communication network 1460 are a plurality of displays 1481 and 1482 and a data logger 1485. The displays 1481 and 1482 permit any of the data collected by the control system 1412 to be displayed in real time, and also display warning messages. The displays 1481 and 1482 also include membrane pushbuttons that allow the operators to scroll through, page through, or otherwise view the screens of data that are available. The membrane pushbuttons may also allow operators to change values of parameters in the control system 1412. The data logger 1485 is used to store information regarding the operation of the military vehicle 1410. The data logger 1485 may also be used as a "black box recorder" to store information logged during a predetermined amount of time (e.g., thirty seconds) immediately prior to the occurrence of one or more trigger events (e.g., events indicating that the military vehicle 1410 has been damaged or rendered inoperative, such as when an operational parameter such as an accelerometer threshold has been exceeded).

Finally, FIG. 14 shows an engine system including an engine 1492 and an engine control system 1491, a transmission system including a transmission 1493 and a transmission control system 1494, and an anti-lock brake system including an anti-lock brake control system 1495. These systems may be interconnected with the control system 1412 in generally the same manner as discussed above in connection with the engine 92, the engine control system 91, the transmission 93, the transmission control system 94, and the anti-lock brake system 36 of FIG. 1.

Figure 15:
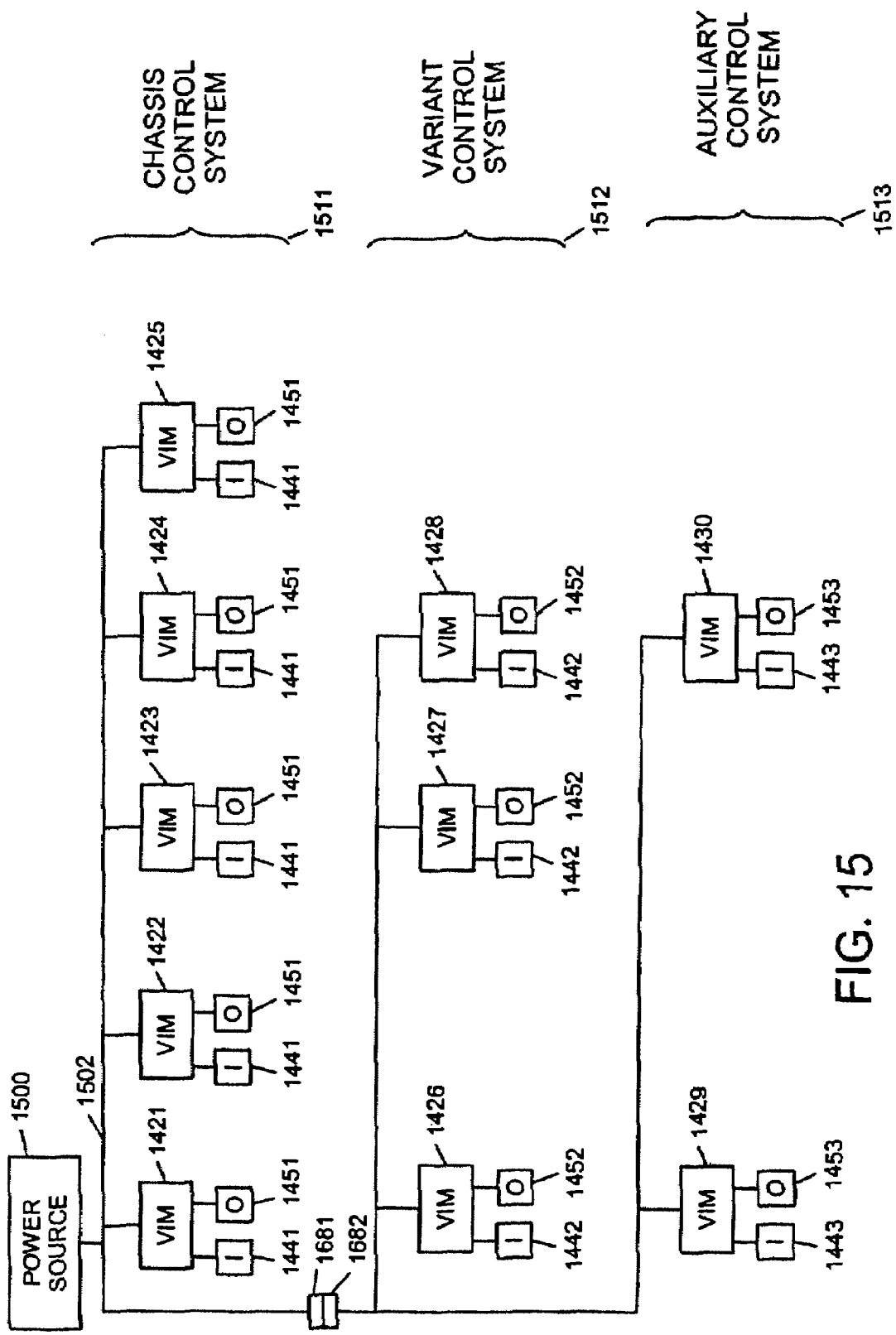
FIGS. 15-16 are block diagrams of the control system of FIG. 14 showing selected aspects of the control system in greater detail.

Referring now also to FIG. 15-18, the structure and interconnection of the interface modules 1420 is described in greater detail. Referring first to FIG. 15, the interconnection of the interface modules 1420 with a power source 1500 is described. The interface modules 1420 receive power from the power source 1500 by way of a power transmission link 1502. The interface modules 1420 are distributed throughout the military vehicle 1410, with some of the interface modules 1420 being located on the chassis 1417 and some of the interface modules 1420 being located on the variant module 1413.

The control system is subdivided into three control systems including a chassis control system 1511, a variant control system 1512, and an auxiliary control system 1513. The chassis control system 1511 includes the interface modules 1421-1425 and the I/O devices 1441 and 1451, which are all mounted on the chassis 1417. The variant control system 1512 includes the interface modules 1426-1428 and the I/O devices 1442 and 1452, which are all mounted on the variant module 1413. The auxiliary control system 1513 includes the interface modules 1429-1430 and the I/O devices 1443 and 1453, which may be mounted on either the chassis 1417 or the variant module 1413 or both.

The auxiliary control system 1513 may, for example, be used to control a subsystem that is disposed on the variant module but that is likely to be the same or similar for all variant modules (e.g., a lighting subsystem that includes headlights, tail lights, brake lights, and blinkers). The inclusion of interface modules 1420 within a particular control system may also be performed based on location rather than functionality. For example, if the variant module 1413 has an aerial device, it may be desirable to have one control system for the chassis, one control system for the aerial device, and one control system for the remainder of the variant module.

Additionally, although each interface module 1420 is shown as being associated with only one of the control systems 1511-1513, it is possible to have interface modules that are associated with more than one control system. It should also be noted that the number of sub-control systems, as well as the number of interface modules, is likely to vary depending on the application. For example, a mobile command vehicle is likely to have more control subsystems than a wrecker variant, given the large number of I/O devices usually found on mobile command vehicles.

The power transmission link 1502 may comprise a single power line that is routed throughout the military vehicle 1410 to each of the interface modules 1420, but preferably comprises redundant power lines. Again, in order to minimize wiring, the interface modules 1420 are placed so as to be located as closely as possible to the input devices 1440 from which input status information is received and the output devices 1450 that are controlled. This arrangement allows the previously-described advantages associated with distributed data collection and power distribution to be achieved. Dedicated communication links, which may for example be electric or photonic links, connect the interface modules 1421-1430 modules with respective ones of the I/O devices, as previously described.

Figure 16:
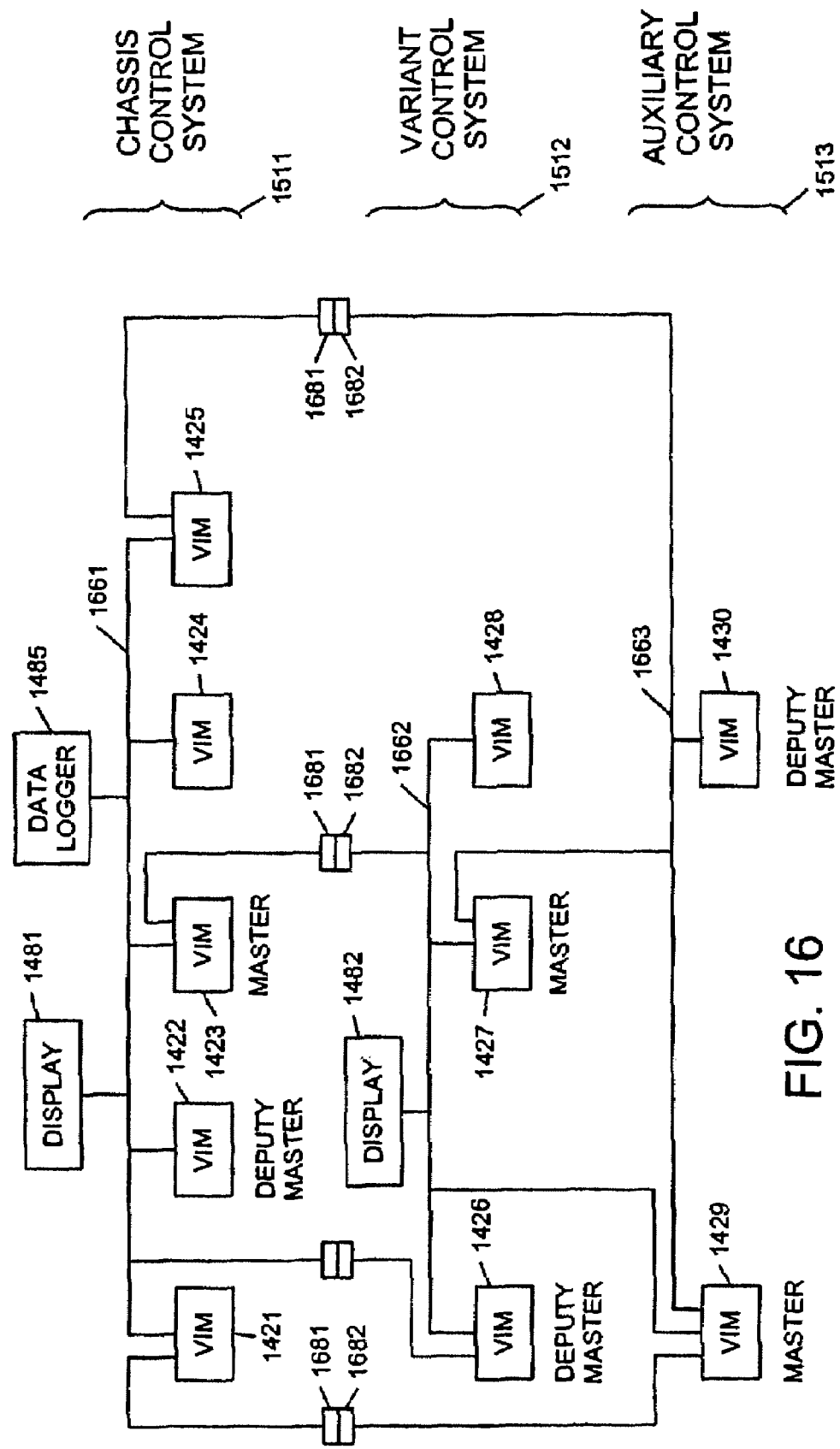

Referring next to FIG. 16, the interconnection of the interface modules 1420 by way of the communication network 1460 is illustrated. As previously indicated, the control system 1412 is subdivided into three control systems 1511, 1512 and 1513. In accordance with this arrangement, the communication network 1460 is likewise further subdivided into three communication networks 1661, 1662, and 1663. The communication network 1661 is associated with the chassis control system 1511 and interconnects the interface modules 1421-1425. The communication network 1662 is associated with the variant control system 1512 and interconnects the interface modules 1426-1428. The communication network 1663 is associated with the auxiliary control system 1513 and interconnects the interface modules 1429-1430. Communication between the control systems 1511-1513 occurs by way of interface modules that are connected to multiple ones of the networks 1661-1663. Advantageously, this arrangement also allows the interface modules to reconfigure themselves to communicate over another network in the event that part or all of their primary network is lost. For example, in FIG. 17A, when a portion of the communication network 1663 is lost, the interface module 1429 reconfigures itself to communicate with the interface module 1430 by way of the communication network 1662 and the interface module 1427.

In practice, each of the communication networks 1661-1663 may be formed of two or more communication networks to provide redundancy within each control system. Indeed, the connection of the various interface modules 1420 with different networks can be as complicated as necessary to obtain the desired level of redundancy. For simplicity, these potential additional levels of redundancy will be ignored in the discussion of FIG. 16 contained herein.

The communication networks 1661-1663 may be implemented in accordance with SAE J1708/1587 and/or J1939 standards, or some other network protocol, as previously described. The transmission medium is preferably fiber optic cable in order to reduce the amount of electromagnetic radiation that the military vehicle 1410 produces, therefore making the vehicle less detectable by the enemy. Fiber optic networks are also more robust to the extent that a severed fiber optic cable is still usable to create two independent networks, at least with reduced functionality.

When the variant module 1413 is mounted on the chassis 1417, connecting the chassis control system 1511 and the variant control system 1512 is achieved simply through the use of two mating connectors 1681 and 1682 that include connections for one or more communication busses, power and ground. The chassis connector 1682 is also physically and functionally mateable with connectors for other variant modules, i.e., the chassis connector and the other variant connectors are not only capable of mating physically, but the mating also produces a workable vehicle system. A given set of switches or other control devices 1651 on the dash (see FIG. 14) may then operate differently depending on which variant is connected to the chassis. Advantageously, therefore, it is possible to provide a single interface between the chassis and the variant module (although multiple interfaces may also be provided for redundancy). This avoids the need for a separate connector on the chassis for each different type of variant module, along with the additional unutilized hardware and wiring, as has conventionally been the approach utilized.

Upon power up, the variant control system 1512 and the chassis control system 1511 exchange information that is of interest to each other. For example, the variant control system 1512 may communicate the variant type of the variant module 1413. Other parameters may also be communicated. For example, information about the weight distribution on the variant module 1413 may be passed along to the chassis control system 1511, so that the transmission shift schedule of the transmission 1493 can be adjusted in accordance with the weight of the variant module 1413, and so that a central tire inflation system can control the inflation of tires as a function of the weight distribution of the variant. Similarly, information about the chassis can be passed along to the variant. For example, where a variant module is capable of being used by multiple chassis with different engine sizes, engine information can be communicated to a wrecker variant module so that the wrecker variant knows how much weight the chassis is capable of pulling. Thus, an initial exchange of information in this manner allows the operation of the chassis control system 1511 to be optimized in accordance with parameters of the variant module 1413, and vice versa.

It may also be noted that the advantages obtained for military variants can also be realized in connection with commercial variants. Thus, a blower module, a sweeper module, and a plow module could be provided for the same chassis. This would allow the chassis to be used for a sweeper in summer and a snow blower or snow plow in winter.

As shown in FIG. 16, each control system 1511-1513 includes an interface module that is designated "master" and another that is designated "deputy master." Thus, for example, the chassis control system 1511 includes a master interface module 1423 and a deputy master interface module 1422. Additional tiers of mastership may also be implemented in connection with the interface modules 1421, 1424 and 1425.

The interface modules 1420 are assigned their respective ranks in the tiers of mastership based on their respective locations on the military vehicle 1410. A harness connector at each respective location of the military vehicle 1410 connects a respective one of the interface modules 1420 to the remainder of the control system 1412. The harness connector is electronically keyed, such that being connected to a particular harness connector provides an interface module 1420 with a unique identification code or address M. For simplicity, the value M is assumed to be a value between 1 and N, where N is the total number of interface modules on the vehicle (M=10 in the illustrated embodiment).

The interface modules 1420 each store configuration information that, among other things, relates particular network addresses with particular ranks of mastership. Thus, for example, when the interface module 1423 boots up, it ascertains its own network address and, based on its network address, ascertains that it is the master of the control system 1511. The interface module 1423 serves as the central control unit so long as the interface module 1423 is competent to do so. As shown in FIG. 17B, if it is determined that the interface module 1423 is no longer competent to serve as master (e.g., because the interface module 1423 has been damaged in combat), then the interface module 1422 becomes the master interface module and begins serving as the central control unit. This decision can be made, for example, by the interface module 1423 itself, based on a vote taken by the remaining interface modules 1420, or based on a decision by the deputy master.

Figure 18:
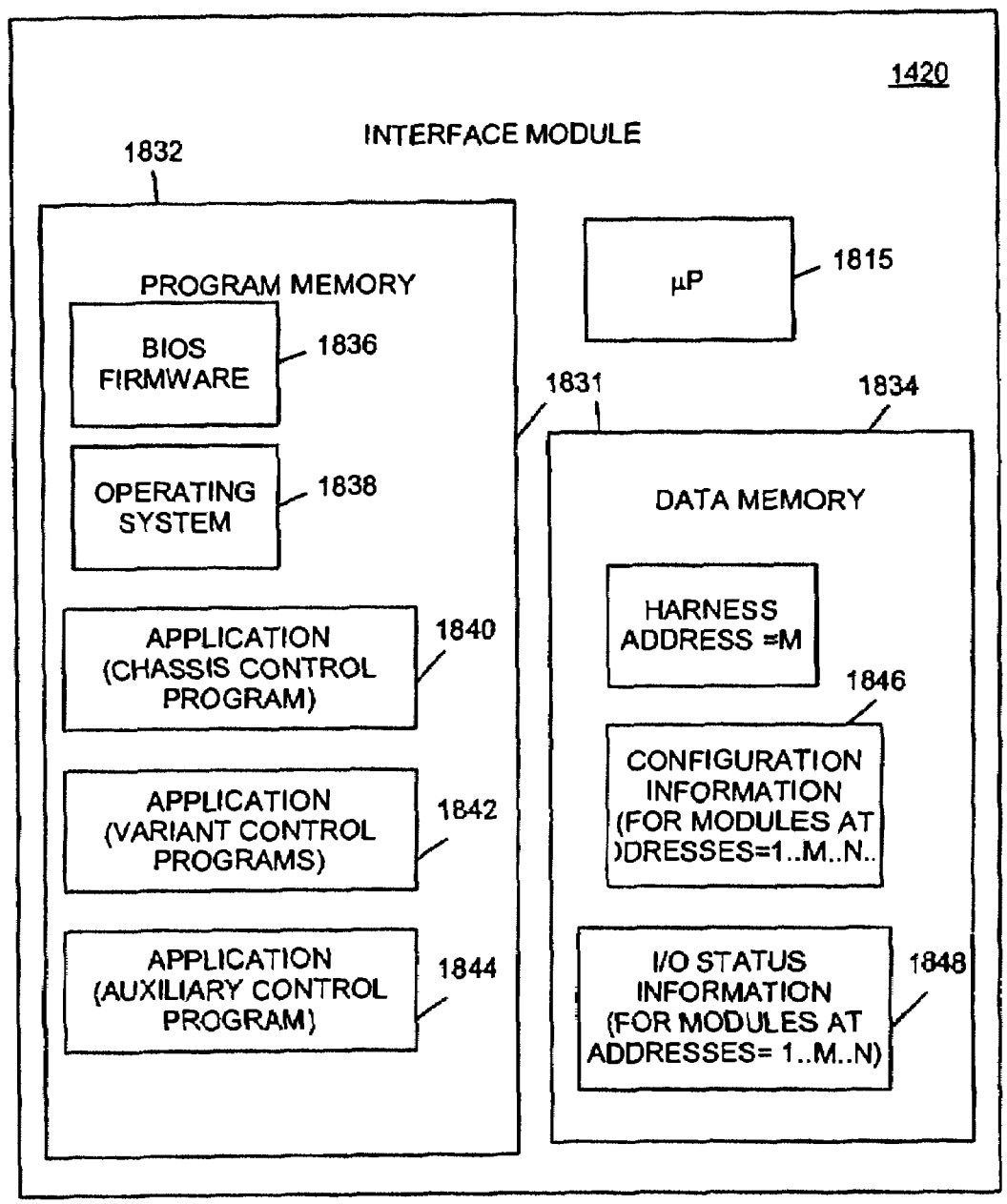
FIG. 18 is a diagram showing the memory contents of an exemplary interface module in greater detail.

Referring next to FIG. 18, an exemplary one of the interface modules 1420 is shown in greater detail. The interface modules 1420 each include a microprocessor 1815 that is sufficiently powerful to allow each interface module to serve as the central control unit. The interface modules are identically programmed and each include a memory 1831 that further includes a program memory 1832 and a data memory 1834. The program memory 1832 includes BIOS (basic input/output system) firmware 1836, an operating system 1838, and application programs 1840, 1842 and 1844. The application programs include a chassis control program 1840, one or more variant control programs 1842, and an auxiliary control program 1844. The data memory 1834 includes configuration information 1846 and I/O status information 1848 for all of the modules 1420-1430 associated with the chassis 1417 and its variant module 1413, as well as configuration information for the interface modules (N+1 to Z in FIG. 18) of other variant modules that are capable of being mounted to the chassis 1417.

It is therefore seen that all of the interface modules 1420 that are used on the chassis 1417 and its variant module 1413, as well as the interface modules 1420 of other variant modules that are capable of being mounted to the chassis 1417, are identically programmed and contain the same information. Each interface module 1420 then utilizes its network address to decide when booting up which configuration information to utilize when configuring itself, and which portions of the application programs 1840-1844 to execute given its status as a master or non-master member of one of the control systems 1511-1513. The interface modules are both physically and functionally interchangeable because the interface modules are capable of being plugged in at any slot on the network, and are capable of performing any functions that are required at that slot on the network.

This arrangement is highly advantageous. Because all of the interface modules 1420 are identically programmed and store the same information, the interface modules are physically and functionally interchangeable within a given class of vehicles. Thus, if an interface module 1420 on one variant module is rendered inoperative, but the variant module is otherwise operational, the inoperative interface module can be replaced with an interface module scavenged from another inoperative vehicle. When the replacement interface module 1420 reboots, it will then reconfigure itself for use in the new vehicle, and begin operating the correct portions of the application programs 1840-1844. This is the case even when the two vehicles are different types of vehicles.

Additionally, if a highly critical interface module is rendered inoperable, the highly critical interface module can be swapped with an interface module that is less critical.

Although the input/output devices associated with the less critical interface module will no longer be operable, the input/output devices associated with the more critical interface module will be operable. This allows the effectiveness of the military vehicle to be maximized by allowing undamaged interface modules to be utilized in the most optimal manner. In this way, the field serviceability of the control system 1412 is dramatically improved. Further, the field serviceability of the control system 1412 is also improved by the fact that only a single type of interface module is used, because the use of a single type of interface module makes it easier to find replacement interface modules.

Additionally, as previously noted, each interface module 1420 stores I/O status information for all of the modules 1420-1430 associated with the chassis 1417 and its variant module 1413. Therefore, each interface module 1420 has total system awareness. As a result, it is possible to have each interface module 1420 process its own inputs and outputs based on the I/O status information in order to increase system responsiveness and in order to reduce the amount of communication that is required with the central control unit. The main management responsibility of the central control unit or master interface module above and beyond the responsibilities of all the other interface modules 1420 then becomes, for example, to provide a nexus for interface operations with devices that are external to the control system of which the central control unit is a part.

Referring now to FIG. 19, FIG. 19 is a truth table that describes the operation of the control system 1412 in the event of failure of one of the interface modules 1420 and/or one of the input devices 1440. The arrangement shown in FIG. 19 allows the control system 1412 to be able to continue to operate in the event of failure using a "best guess" method of controlling outputs.

In the example of FIG. 19, two output devices are controlled based on two input devices. For example, the first output device may be headlights of the military vehicle 1410, the first input device may be a combat switch or combat override switch that places the entire vehicle into a combat mode of operation, and the second input may be an operator switch for operator control of the headlights. The second output device is discussed further below. For simplicity, only the input states of two binary input devices are shown. In practice, of course, the control logic for most output devices will usually be a function of more input devices, in some cases ten or more input devices including analog input devices. Nevertheless, the simplified truth table of FIG. 19 is sufficient to obtain an understanding of this preferred aspect of the invention.

The truth table of FIG. 19 shows a number of different possible input states and the corresponding output states. In the first two states, when the combat override switch (input #1) is off, then the headlights (output #1) are controlled as a function of the operator switch. Thus, if the operator switch is on, then the control system 1412 turns the headlights on, and if the operator switch is off, then the control system 1412 turns the headlights off. In the third and fourth input states, the combat override switch is on, and therefore the control system 1412 turns the headlights off in order to make the vehicle less detectable by the enemy. It may be noted that the control system 1412 ignores the input state of the second input device when the combat override switch is on. The third column in the truth table could therefore instead be the output of a safety interlock, since safety interlocks are another example of input information that is sometimes ignored when a combat override is turned on. This would allow the control system 1412 to take into account the urgency of a combat situation while still also implementing safety functions to the extent that they do not interfere with the operation of the vehicle 1410.

The truth table also has a number of additional states (five through nine) corresponding to situations in which one or both of the inputs is designated as undetermined ("?" in FIG. 19). Thus, for example, in states five and six, the input state of the operator switch (input #2) is designated as undetermined. The undetermined state of the operator switch may be the result of the failure of the interface module that receives the input signal from the operator switch, a failure of the electrical connection between the switch and the interface module, and/or a failure of the operator switch itself. In the fifth state, when the combat override switch is off and the state of the operator switch is undetermined, the control system 1412 turns on the headlights, based on the assumption that if it is nighttime the operator wants the lights on and if it is daytime the operator does not have a strong preference either way. In the sixth state, when the combat override switch is on and the state of the operator switch is undetermined, the control system 1412 turns off the headlights, because the headlights should always be turned off in the combat mode of operation.

In states seven through nine, the input state of the combat override switch (input #1) is designated as undetermined. The undetermined state of the combat override switch may be caused by generally the same factors that are liable to cause the state of the operator switch to be undetermined. In all of these states, the control system 1412 turns off the headlights, based on the worst case assumption that the military vehicle may be in combat and that therefore the headlights should be turned off.

The arrangement shown in FIG. 19 is thus applied to all output devices 1450 on the military vehicle. In this way, the control logic for controlling the output devices is expanded to take into account a third "undetermined" state for each of the input devices, and an entire additional layer of failure management is added to the control logic. In this way, the control system 1412 is able to remain operational (at least in a best guess mode) when the input states of one or more input devices cannot be determined. This prevents output devices that have an output state based on the input state of a given input device from being crippled when a system failure causes one or more input devices to be lost.

This arrangement also allows the output state of each output device to be programmed individually in failure situations. In other words, when a given input device is lost, the control system can be programmed to assume for purposes of some output devices (using the above described truth table arrangement) that the input device is on and to assume for the purposes of other output devices that the input device is off. For example, in FIG. 19, if output device #2 is another output device that is controlled by the same operator switch, the control system can be programmed to assume for purposes of output device #2 that the operator switch is off in state five rather than on, such that the control system turns off the output device #2 in state five. In this way, it is not necessary to assume the same input state for purposes of all output devices.

It may also be noted that military vehicles tend to make widespread use of redundant sensors. In this case, by connecting the redundant sensors to different ones of the interface modules, the state table for each output device can be modified to accept either input, thereby making it possible for the control system 1412 to obtain the same information by a different route. Further, if the redundant sensors disagree on the input status of a system parameter, then this disagreement itself can be treated as an undetermined input state of an input device. In this way, rather than using a voting procedure in which the sensors vote on the state of the input device for purposes of all output devices, the uncertainty can be taken into account and best guess decisions regarding how to operate can be made for each of the various output devices individually.

As previously described, each interface module 1420 has total system awareness. Specifically, the data memory 1834 of each interface module 1420 stores I/O status information 1848 for not only local I/O devices 1440 and 1450 but also for non-local I/O devices 1440 and 1450 connected to remaining ones of the interface modules 1420. Referring now to FIGS. 21-24, a preferred technique for transmitting I/O status information between the interface modules 1420 will now be described. Although this technique is primarily described in connection with the chassis control system 1511, this technique is preferably also applied to the variant control system 1512 and the auxiliary control system 1513, and/or in the control system 12.

Figure 21:
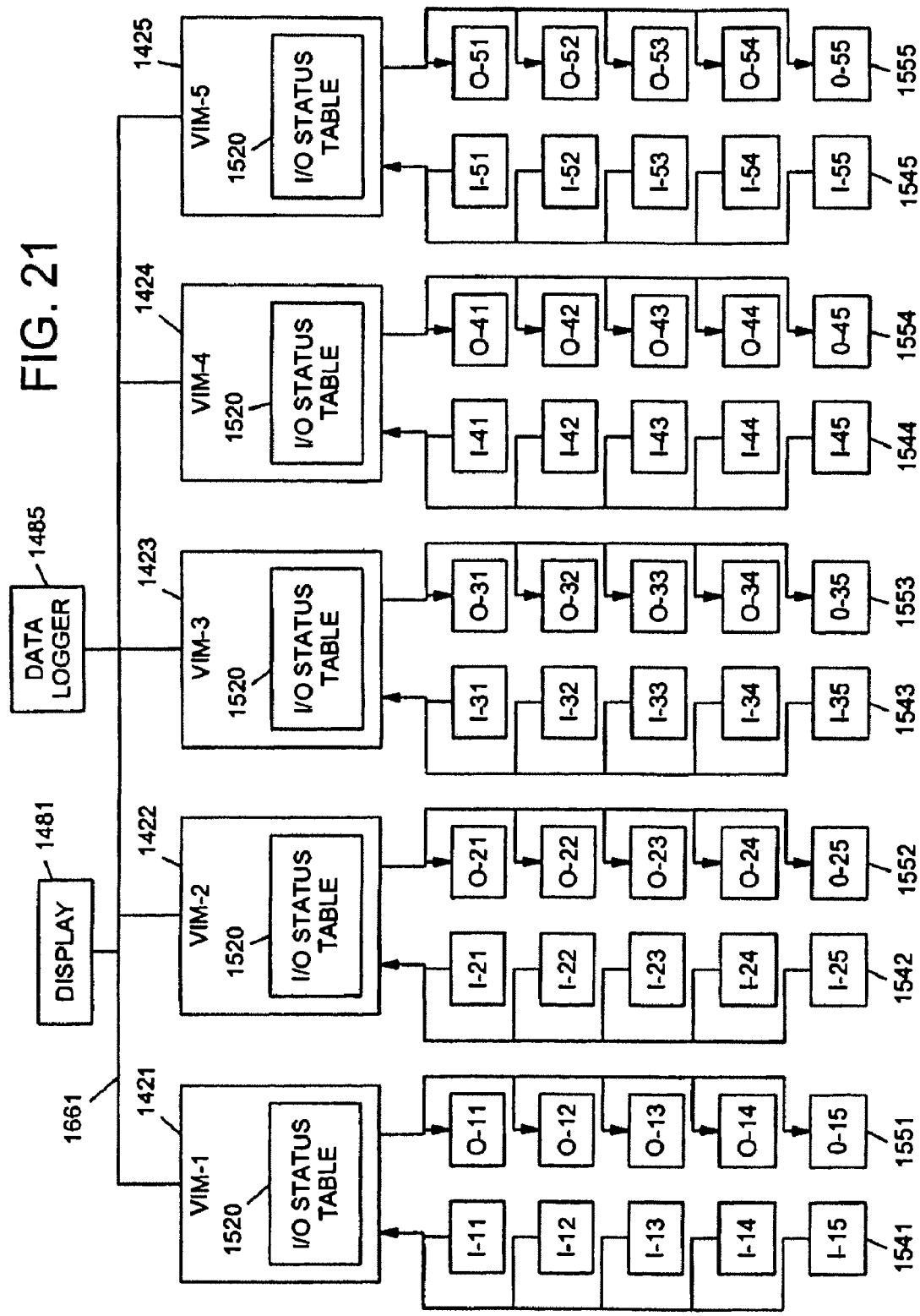
FIG. 21 is a block diagram of the control system of FIG. 14 showing selected aspects of the control system in greater detail.

Referring first to FIG. 21, as previously described, the chassis control system 1511 includes the interface modules 1421-1425, the input devices 1441, and the output devices 1451. Also shown in FIG. 21 are the display 1481, the data logger 1485, and the communication network 1661 which connects the interface modules 1421-1425. In practice, the system may include additional devices, such as a plurality of switch interface modules connected to additional I/O devices, which for simplicity are not shown. The switch interface modules may be the same as the switch interface modules 20 previously described and, for example, may be provided in the form of a separate enclosed unit or in the more simple form of a circuit board mounted with associated switches and low power output devices. In practice, the system may include other systems, such as a display interface used to drive one or more analog displays (such as gauges) using data received from the communication network 1661. Any additional modules that interface with I/O devices preferably broadcast and receive I/O status information and exert local control in the same manner as detailed below in connection with the interface modules 1421-1425. As previously noted, one or more additional communication networks may also be included which are preferably implemented in accordance with SAE J1708/1587 and/or J1939 standards. The communication networks may be used, for example, to receive I/O status information from other vehicle systems, such as an engine or transmission control system. Arbitration of I/O status broadcasts between the communication networks can be performed by one of the interface modules 1420.

To facilitate description, the input devices 1441 and the output devices 1451 have been further subdivided and more specifically labeled in FIG. 21. Thus, the subset of the input devices 1441 which are connected to the interface module 1421 are collectively labeled with the reference numeral 1541 and are individually labeled as having respective input states I-11 to I-15. Similarly, the subset of the output devices 1451 which are connected to the interface module 1421 are collectively labeled with the reference numeral 1551 and are individually labeled as having respective output states O-11 to O-15. A similar pattern has been followed for the interface modules 1422-1425, as summarized in Table I below:

TABLE I

| Interface Module | Input Devices | Input States | Output Devices | Output States |
|---|---|---|---|---|
| 1421 | 1541 | I-11 to I-15 | 1551 | O-11 to O-15 |
| 1422 | 1542 | I-21 to I-25 | 1552 | O-21 to O-25 |
| 1423 | 1543 | I-31 to I-35 | 1553 | O-31 to O-35 |

TABLE I-continued

| Interface Module | Input Devices | Input States | Output Devices | Output States |
|---|---|---|---|---|
| 1424 | 1544 | I-41 to I-45 | 1554 | O-41 to O-45 |
| 1425 | 1545 | I-51 to I-55 | 1555 | O-51 to O-55 |

Of course, although five input devices 1441 and five output devices 1451 are connected to each of the interface modules 1420 in the illustrated embodiment, this number of I/O devices is merely exemplary and a different number of devices could also be used, as previously described.

The interface modules 1420 each comprise a respective I/O status table 1520 that stores information pertaining to the I/O states of the input and output devices 1441 and 1451. Referring now to FIG. 22, an exemplary one of the I/O status tables 1520 is shown. As shown in FIG. 22, the I/O status table 1520 stores I/O status information pertaining to each of the input states I-11 to I-15, I-21 to I-25, I-31 to I-35, I-41 to I-45, and I-51 to I-55 of the input devices 1541-1545, respectively, and also stores I/O status information pertaining to each of the output states O-11 to O-15, O-21 to O-25, O-31 to O-35, O-41 to O-45, and O-51 to O-55 of the output devices 1551-1555, respectively. The I/O status tables 1520 are assumed to be identical, however, each I/O status table 1520 is individually maintained and updated by the corresponding interface module 1420. Therefore, temporary differences may exist between the I/O status tables 1520 as updated I/O status information is received and stored. Although not shown, the I/O status table 1520 also stores I/O status information for the interface modules 1426-1428 of the variant control system 1512 and the interface modules 1429-1430 of the auxiliary control system 1513.

In practice, although FIG. 22 shows the I/O status information being stored next to each other, the memory locations that store the I/O status information need not be contiguous and need not be located in the same physical media. It may also be noted that the I/O status table 1520 is, in practice, implemented such that different I/O states are stored using different amounts of memory. For example, some locations store a single bit of information (as in the case of a digital input device or digital output device) and other locations store multiple bits of information (as in the case of an analog input device or an analog output device). The manner in which the I/O status table is implemented is dependent on the programming language used and on the different data structures available within the programming language that is used. In general, the term I/O status table is broadly used herein to encompass any group of memory locations that are useable for storing I/O status information.

Also shown in FIG. 22 are a plurality of locations that store intermediate status information, labeled IM-11, IM-21, IM-22, and IM-41. The intermediate states IM-11, IM-21, IM-22, and IM-41 are processed versions of selected I/O states. For example, input signals may be processed for purposes of scaling, unit conversion and/or calibration, and it may be useful in some cases to store the processed I/O status information. Alternatively, the intermediate states IM-11, IM-21, IM-22, and IM-41 may be a function of a plurality of I/O states that in combination have some particular significance. The processed I/O status information is then transmitted to the remaining interface modules 1420.

Figure 23:
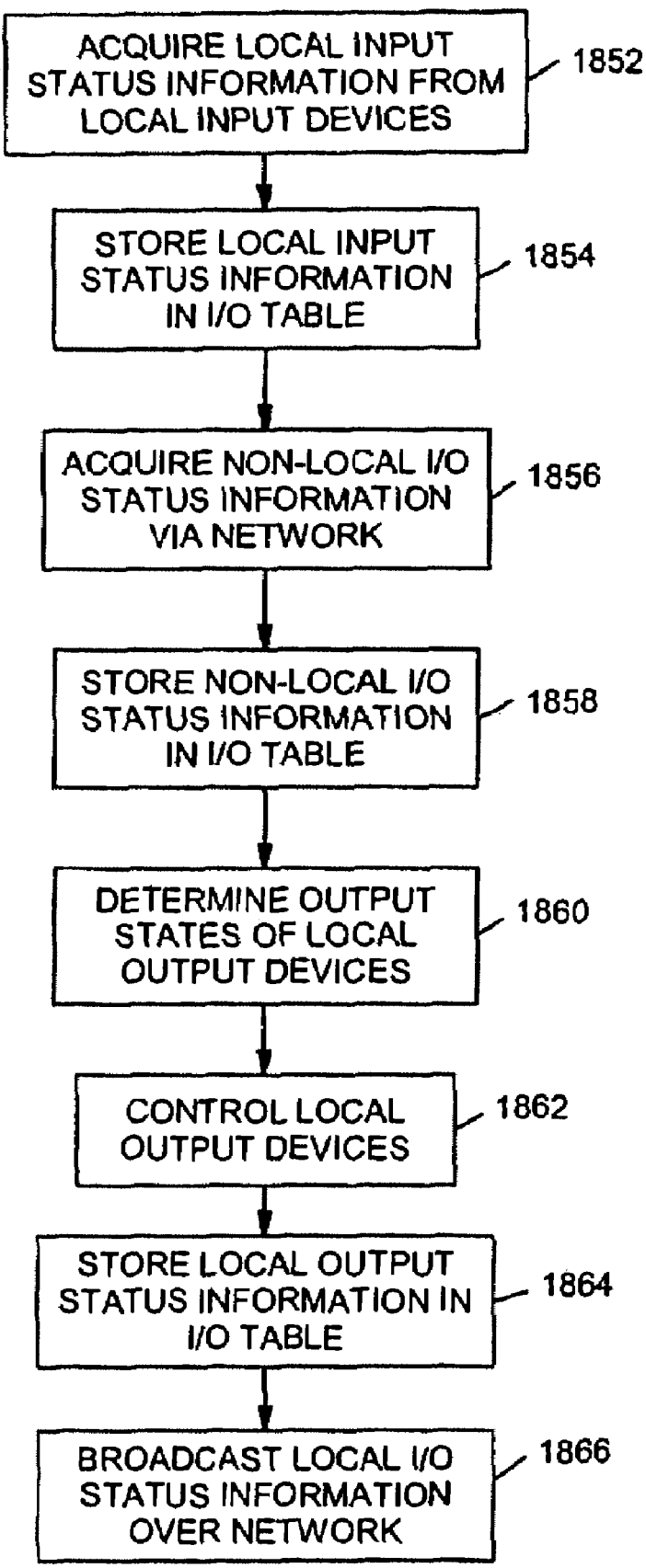
FIG. 23 is a flowchart describing the operation of the control system of FIG. 21 in greater detail.
Figure 24:
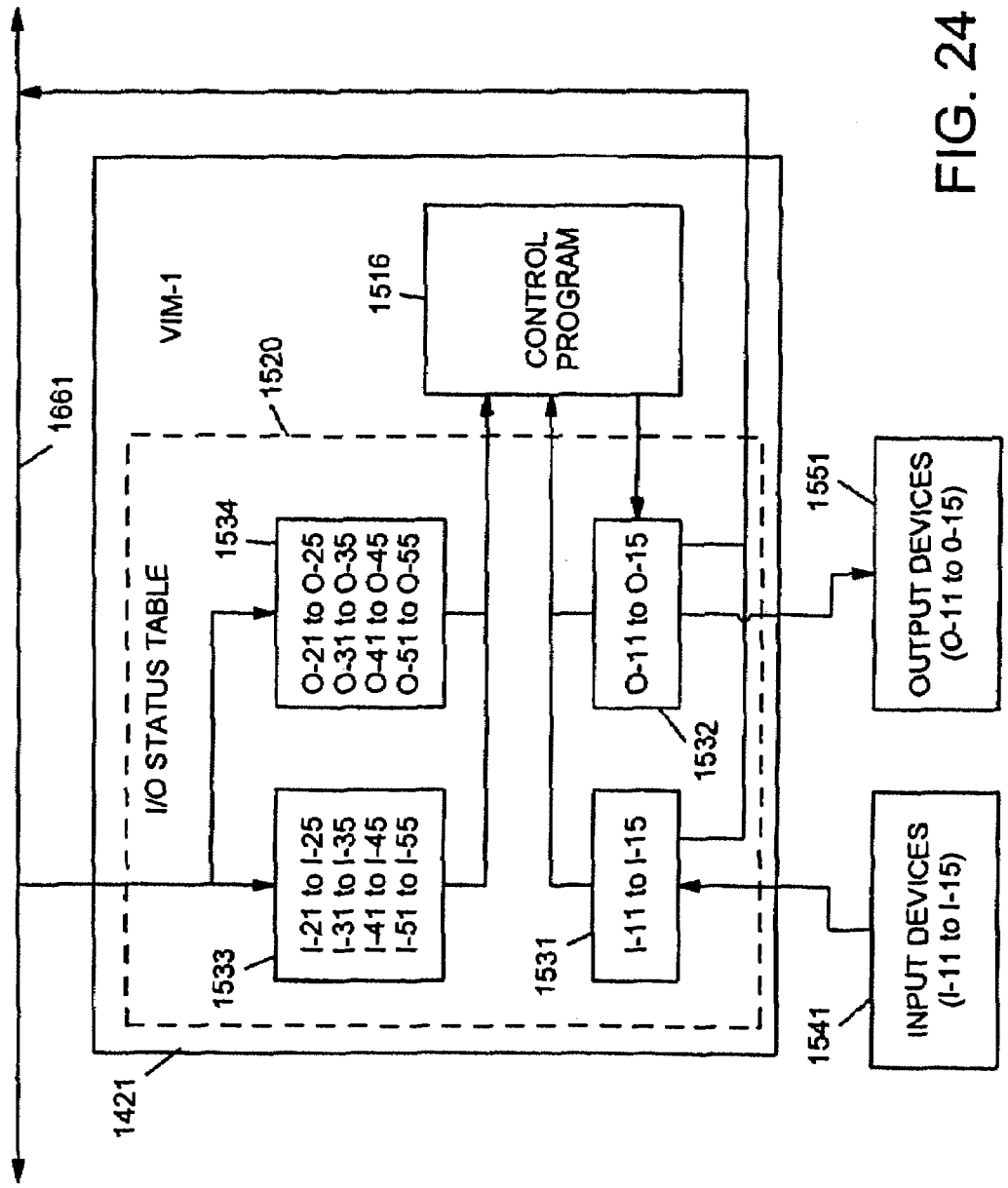
FIG. 24 is a data flow diagram describing data flow through an exemplary interface module during the process of FIG. 23.

Referring now to FIGS. 23-24, FIG. 23 is a flowchart describing the operation of the control system of FIG. 21, and FIG. 24 is a data flow diagram describing data flow through an exemplary interface module during the process of FIG. 23. As an initial matter, it should be noted that although FIG. 23 depicts a series of steps which are performed sequentially, the steps shown in FIG. 23 need not be performed in any particular order. In practice, for example, modular programming techniques are used and therefore some of the steps are performed essentially simultaneously. Additionally, it may be noted that the steps shown in FIG. 23 are performed repetitively during the operation of the interface module 1421, and some of the steps are in practice performed more frequently than others. For example, input information is acquired from the input devices more often than the input information is broadcast over the communication network. Although the process of FIG. 23 and the data flow diagram of FIG. 24 are primarily described in connection with the interface module 1421, the remaining interface modules 1422-1425 operate in the same manner.

At step 1852, the interface module 1421 acquires input status information from the local input devices 1541. The input status information, which pertains to the input states I-11 to I-15 of the input devices 1541, is transmitted from the input devices 1541 to the interface module 1421 by way of respective dedicated communication links, as previously described in connection with FIGS. 3-4. At step 1854, the input status information acquired from the local input devices 1541 is stored in the I/O status table 1520 at a location 1531. For the interface module 1421, the I/O devices 1541 and 1551 are referred to as local I/O devices since the I/O devices 1541 and 1551 are directly coupled to the interface module 1421 by way of respective dedicated communication links, as opposed to the remaining non-local I/O devices and 1542-1545 and 1552-1555 which are indirectly coupled to the interface module 1421 by way of the communication network 1661.

At step 1856, the interface module 1421 acquires I/O status information for the non-local input devices 1542-1545 and the non-local output devices 1552-1555 by way of the communication network 1661. Specifically, the interface module 1421 acquires input status information pertaining to the input states I-21 to I-25, I-31 to I-35, I-41 to I-45, I-51 to I-55 of the input devices 1542-1545, respectively, and acquires output status information pertaining to the output states O-21 to O-25, O-31 to O-35, O-41 to O-45, O-51 to O-55 of the output devices 1552-1555. The input status information and the output status information are stored in locations 1533 and 1534 of the I/O status table 1520, respectively.

At step 1860, the interface module 1421 determines desired output states O-11 to O-15 for the output devices 1551. As previously noted, each of the interface modules 1420 stores a chassis control program 1840, one or more variant control programs 1842, and an auxiliary control program 1844. The interface module 1421 is associated with the chassis control system 1511 and, therefore, executes a portion of the chassis control program 1840. (The portion of the chassis control program 1840 executed by the interface module 1421 is determined by the location of the interface module 1421 on the military vehicle 1410, as previously described.) The interface module 1421 executes the chassis control program 1840 to determine the desired output states 0-11 to 0-15 based on the I/O status information stored in the I/O status table 1520. Preferably, each interface module 1420 has complete control of its local output devices 1450, such that only I/O status information is transmitted on the communication network 1460 between the interface modules 1420.

At step 1862, the interface module 1421 controls the output devices 1551 in accordance with the desired respective output states O-11 to O-15. Once the desired output state for a particular output device 1551 has been determined, control is achieved by transmitting a control signal to the particular output device 1551 by way of a dedicated communication link. For example, if the output is a digital output device (e.g., a headlight controlled in on/off fashion), then the control signal is provided by providing power to the headlight by way of the dedicated communication link. Ordinarily, the actual output state and the desired output state for a particular output device are the same, especially in the case of digital output devices. However, this is not always the case. For example, if the headlight mentioned above is burned out, the actual output state of the headlight may be "off," even though the desired output state of the light is "on." Alternatively, for an analog output device, the desired and actual output states may be different if the control signal is not properly calibrated for the output device.

At step 1864, the interface module 1421 stores output status information pertaining to the desired output states O-11 to O-15 for the output devices 1551 in the I/O status table 1520. This allows the output states 0-11 to 0-15 to be stored prior to being broadcast on the communication network 1661. At step 1866, the interface module 1421 broadcasts the input status information pertaining to the input states I-11 to I-15 of the input devices 1541 and the output status information pertaining to the output states O-11 to O-15 of the output devices 1551 over the communication network 1661. The I/O status information is received by the interface modules 1422-1425. Step 1866 is essentially the opposite of step 1856, in which non-local I/O status information is acquired by the interface module 1421 by way of the communication network 1661. In other words, each interface module 1420 broadcasts its portion of the I/O status table 1520 on the communication network 1661, and monitors the communication network 1661 for broadcasts from the remaining interface modules 1420 to update the I/O status table 1520 to reflect updated I/O states for the non-local I/O devices 1441 and 1451. In this way, each interface module 1420 is able to maintain a complete copy of the I/O status information for all of the I/O devices 1441 and 1451 in the system.

The interface modules 1423 and 1425 are used to transmit I/O status information between the various control systems 1511-1513. Specifically, as previously noted, the interface module 1423 is connected to both the communication network 1661 for the chassis control system 1511 and to the communication network 1662 for the variant control system 1512 (see FIG. 17). The interface module 1423 is preferably utilized to relay broadcasts of I/O status information back and forth between the interface modules 1421-1425 of the chassis control system 1511 and the interface modules 1426-1428 of the variant control system 1512. Similarly, the interface module 1425 is connected to both the communication network 1661 for the chassis control system 1511 and the to the communication network 1663 for the auxiliary control system 1513 (see FIG. 17), and the interface module 1425 is preferably utilized to relay broadcasts of I/O status information back and forth between the interface modules 1421-1425 of the chassis control system 1511 and the interface modules 1429-1430 of the auxiliary control system 1513.

The arrangement of FIGS. 21-24 is advantageous because it provides a fast and efficient mechanism for updating the I/O status information 1848 stored in the data memory 1834 of each of the interface modules 1420. Each interface module 1420 automatically receives, at regular intervals, complete I/O status updates from each of the remaining interface modules 1420. There is no need to transmit data request (polling) messages and data response messages (both of which require communication overhead) to communicate information pertaining to individual I/O states between individual I/O modules 1420. Although more I/O status data is transmitted, the transmissions require less overhead and therefore the overall communication bandwidth required is reduced.

This arrangement also increases system responsiveness. First, system responsiveness is improved because each interface module 1420 receives current I/O status information automatically, before the information is actually needed. When it is determined that a particular piece of I/O status information is needed, there is no need to request that information from another interface module 1420 and subsequently wait for the information to arrive via the communication network 1661. The most current I/O status information is already assumed to be stored in the local I/O status table 1520. Additionally, because the most recent I/O status information is always available, there is no need to make a preliminary determination whether a particular piece of I/O status information should be acquired. Boolean control laws or other control laws are applied in a small number of steps based on the I/O status information already stored in the I/O status table 1520. Conditional control loops designed to avoid unnecessarily acquiring I/O status information are avoided and, therefore, processing time is reduced.

It may also be noted that, according to this arrangement, there is no need to synchronize the broadcasts of the interface modules 1420. Each interface module 1420 monitors the communication network 1661 to determine if the communication network 1661 is available and, if so, then the interface module broadcasts the I/O status information for local I/O devices 1441 and 1451. (Standard automotive communication protocols such as SAE J1708 or J1939 provide the ability for each member of the network to monitor the network and broadcast when the network is available.) Although it is desirable that the interface modules rebroadcast I/O status information at predetermined minimum intervals, the broadcasts may occur asynchronously.

The technique described in connection with FIGS. 21-24 also provides an effective mechanism for detecting that an interface module 1420 has been rendered inoperable, for example, due to damage incurred in combat. As just noted, the interface modules 1420 rebroadcast I/O status information at predetermined minimum intervals. Each interface module 1420 also monitors the amount of time elapsed since an update was received from each remaining interface module 1420. Therefore, when a particular interface module 1420 is rendered inoperable due to combat damage, the inoperability of the interface module 1420 can be detected by detecting the failure of the interface module 1420 to rebroadcast its I/O status information within a predetermined amount of time. Preferably, the elapsed time required for a particular interface module 1420 to be considered inoperable is several times the expected minimum rebroadcast time, so that each interface module 1420 is allowed a certain number of missed broadcasts before the interface module 1420 is considered inoperable. A particular interface module 1420 may be operable and may broadcast I/O status information, but the broadcast may not be received by the remaining interface modules 1420 due, for example, to noise on the communication network.

This arrangement also simplifies the operation of the data logger 1485 and automatically permits the data logger 1485 to store I/O status information for the entire control system 1412. The data logger 1485 monitors the communication network 1661 for I/O status broadcasts in the same way as the interface modules 1420. Therefore, the data logger 1485 automatically receives complete system updates and is able to store these updates for later use.

As previously noted, in the preferred embodiment, the interface modules 1423 and 1425 are used to transmit I/O status information between the various control systems 1511-1513. In an alternative arrangement, the interface module 1429 which is connected to all three of the communication networks 1661-1663 could be utilized instead. Although less preferred, the interface module 1429 may be utilized to receive I/O status information from each of the interface modules 1421-1428 and 1430, assemble the I/O status data into an updated I/O status table, and then rebroadcast the entire updated I/O status table 1520 to each of the remaining interface modules 1421-1428 and 1430 at periodic or aperiodic intervals. Therefore, in this embodiment, I/O status information for the all of the interface modules 1420 is routed through the interface module 1429 and the interface modules 1420 acquire I/O status information for non-local I/O devices 1440 and 1450 by way of the interface module 1429 rather than directly from the remaining interface modules 1420.

From the foregoing description, a number of advantages of the preferred military vehicle control system are apparent, some of which have already been mentioned. First, the control system is constructed and arranged such that failure at a single location does not render the entire vehicle inoperable. The control system has the ability to dynamically reconfigure itself in the event that one or more interface modules are lost. By avoiding the use of a central control unit that is fixed at one location, and using a moving central control unit, there is no single point failure. If a master interface modules fails, another interface module will assume the position of the central control unit.

Additionally, because the interface modules are interchangeable, if one interface module is damaged, it is possible to field service the control system by swapping interface modules, obtained either from within the vehicle itself or from another vehicle, even if the other vehicle is not the same variant type. This allows the effectiveness of the military vehicle to be maximized by allowing undamaged interface modules to be utilized in the most optimal manner.

The use of the control system 1412 in connection with multipurpose modular vehicles is also advantageous. When the variant module is mounted to the chassis, all that is required is to connect power, ground and the communication network. Only one connector is required for all of the different types of variants. This avoids the need for a separate connector on the chassis for each different type of variant module, along with the additional unutilized hardware and wiring, as has conventionally been the approach utilized.

Moreover, since every interface module has a copy of the application program, it is possible to test each interface module as an individual unit. The ability to do subassembly testing facilitates assembly of the vehicle because defective mechanisms can be replaced before the entire vehicle is assembled.

Finally, the advantages regarding flexibility, robustness, ease of use, maintainability, and so on, that were discussed above in connection with fire fighting vehicles also apply to military vehicles. For example, it is often desirable in military applications to provide vehicles with consoles for both a left-hand driver and a right-hand driver. This option can be implemented without complex wiring arrangements with the preferred control system, due to the distributed data collection and the intelligent processing of information from input devices. Likewise, features such as "smart start" (in which vehicle starting is controlled automatically to reduce faulty starts due to operator error) can be implemented by the control system without any additional hardware.

C. Electric Traction Vehicle

Referring now to FIGS. 25-29, a control system for an electric traction vehicle 1910 is shown. An electric traction vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric traction vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The disclosure herein can be used to implement electric vehicles in general and/or hybrid electric vehicles in particular. The electric vehicle 1910 can implement any of the other vehicle types described herein (e.g., fire fighting vehicle, military vehicle, snow blower vehicle, refuse-handling vehicle, concrete mixing vehicle) as well as others not described herein. Thus, the following teachings regarding the electric vehicle system may be combined with any/all of the teachings contained herein.

The electric traction vehicle 1910 preferably comprises a vehicle platform or vehicle support structure 1912, drive wheels 1914, a power source or principal power unit 1916, a power storage unit 1922, electric motors 1928, servo or drive controllers 1930, an energy dissipation device 1932, and interface modules 1934. The vehicle 1910 further comprises a control system with a plurality of input and output devices which vary depending on the application for which the vehicle 1920 is used. For example, if the vehicle 1910 is a fire truck, then the vehicle 1910 has input and output devices such as those described in connection with FIGS. 1-13 in connection with the fire truck 10. Except to the extent that different I/O devices are used, the control system the same as the control system 1412 as described in FIGS. 14-24 and is used to receive inputs from these input devices and control these output devices. The interface modules 1934 are part of this control system and preferably are constructed and operate in the same manner as the interface modules 1420 as described above. Specifically, each interface module 1934 may process its own inputs and outputs based on I/O status information received via I/O status broadcasts from the other interface modules 1934.

Interconnecting the interface modules 1934 on the electric traction vehicle 1910 is a communication network 1976 and an AC power bus assembly 1942 through which the vehicle and its various functions are controlled and operated. The communication network 1976 corresponds to the communication network 60 of FIG. 2 in the case of an electric fire truck vehicle and to the communication network 1460 in the case of a electric military vehicle. The communication network 1976 is used to communication I/O status information between the interface modules 1934. The AC bus assembly 1942 is a power transmission link and corresponds to the power transmission link 102 of FIG. 2 in the case of an electric fire truck vehicle and to the power transmission link 1502 of FIG. 15 in the case of an electric military vehicle. Also connected to the AC bus assembly 1942 are the principal power unit 1916, the power storage unit 1922, and the energy dissipation device 1932. The interface modules 1934 include rectifier circuitry to convert AC power from the AC bus assembly 1942 to DC power for output devices such as LED indicators. Also, it may be noted that the AC power is also provided directly to the drive controllers 1930, which operate under the control of the interface modules 1934. It is also contemplated that wireless communication between the interface modules 1934 and the various modules 1984 can be achieved including communication of signals 1974 via radio waves, microwaves, and fiber optical paths including relay via satellite to a central command center.

Figure 25:
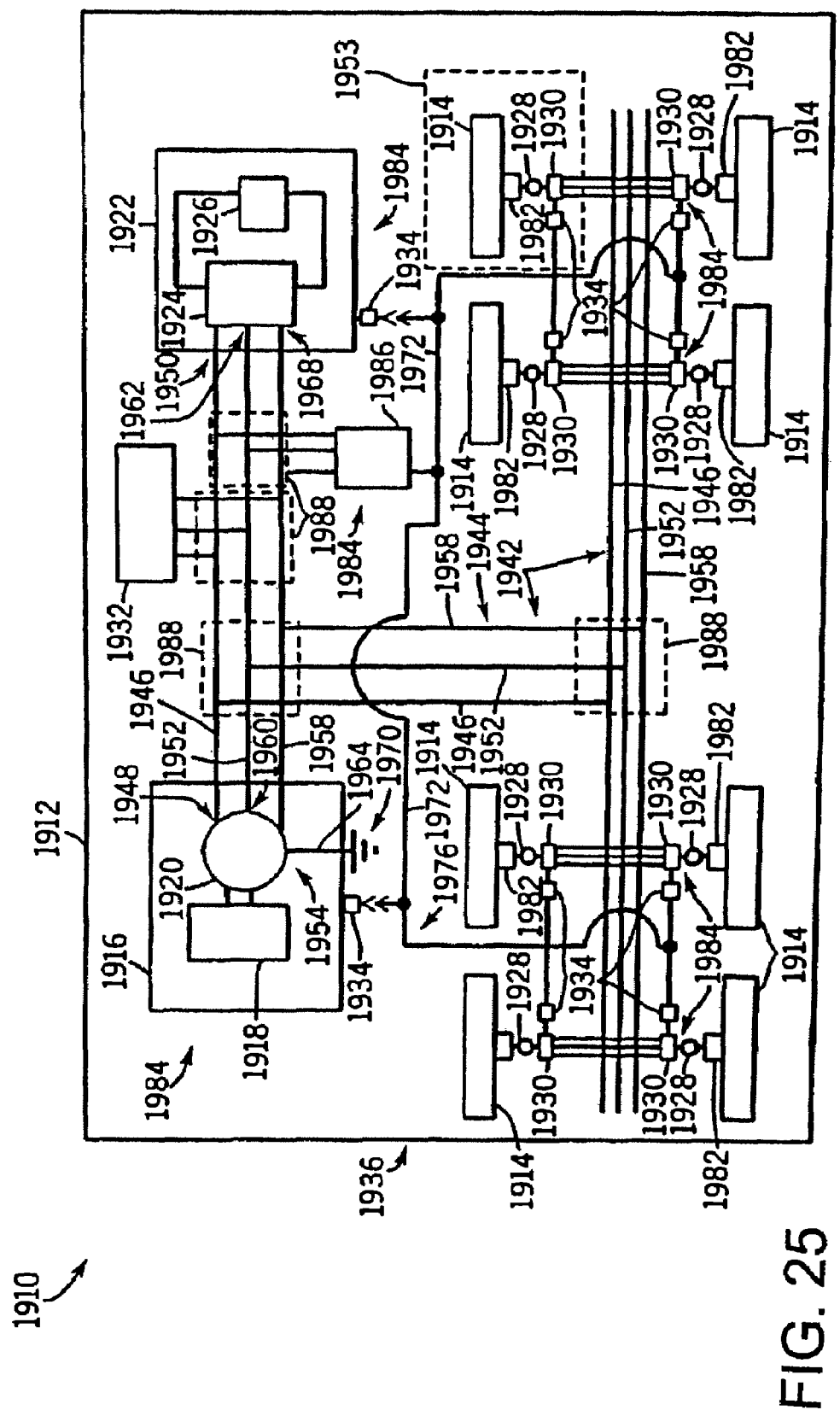
FIG. 25 is a schematic diagram of an exemplary embodiment of an electric traction vehicle providing an exemplary embodiment of an AC bus assembly coupled to various modules on the vehicle.
Figure 32A:
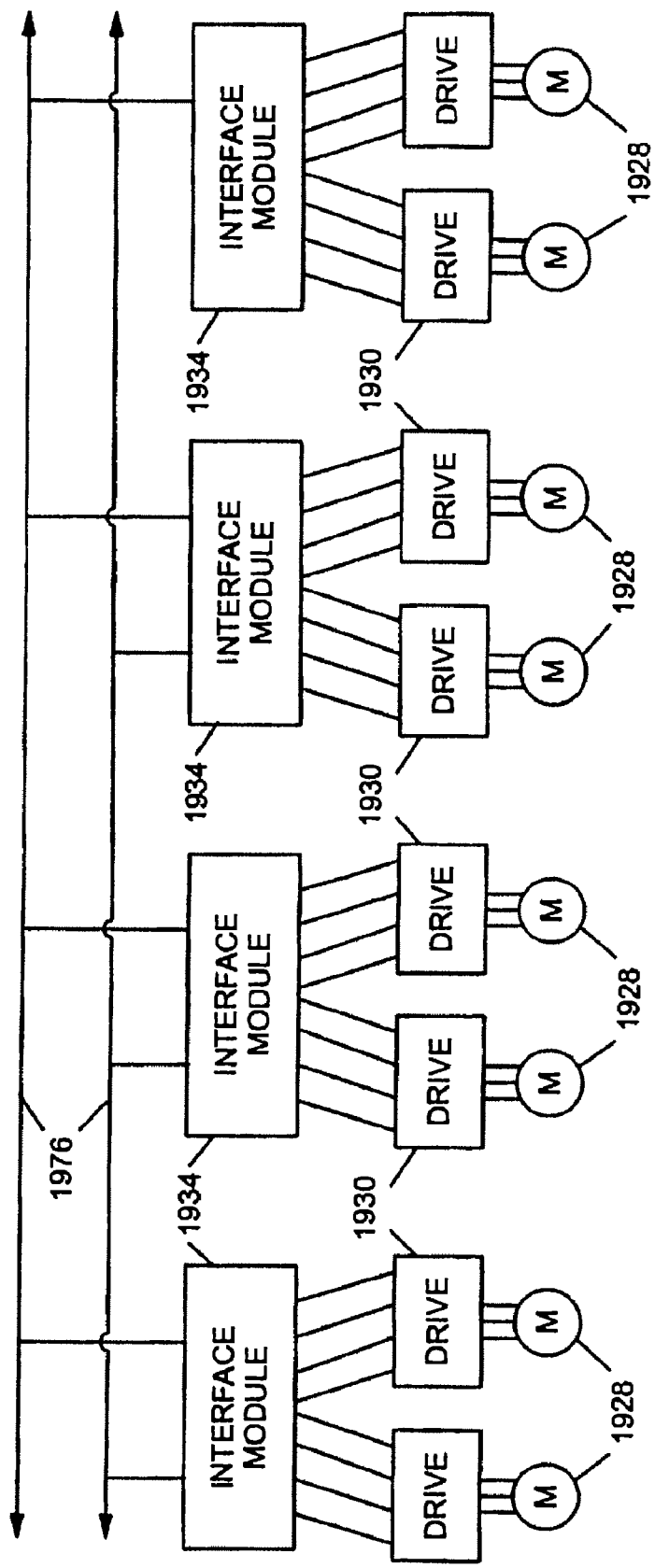
FIGS. 32A-32B is a block diagram showing various configurations for connecting interface modules to drive controllers in the electric traction vehicle of FIG. 25.
Figure 32B:
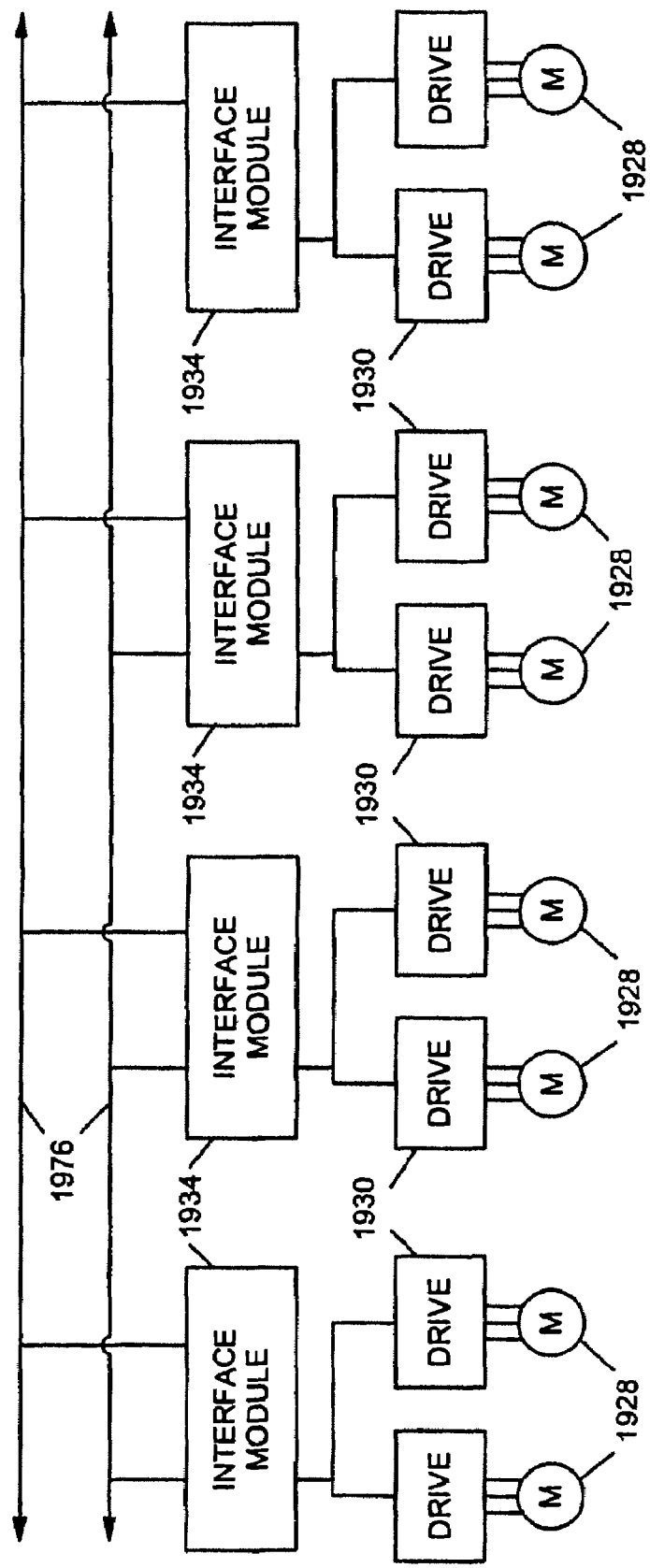

With reference to FIG. 32A-32B, it may be noted that many commercially-available servo drive controllers may be network-enabled and therefore an option exists as to the manner in which the interface modules 1934 are connected to the drive controllers 1930. Thus, in FIG. 32A, each interface module 1934 is connected to one or more drive controllers 1930 by way of dedicated communication links for hardwired control of the drive controllers 1930. In the illustrated embodiment, three digital links and one analog link are shown for each drive controller 1930 representing, for example, a stop/run output, a forward/reverse output, a generation/regeneration output, and a variable torque command (0-100%) output from the interface module 1934. As indicated in FIG. 25, power from the AC bus assembly 1942 is preferably provided directly to the drive controllers 1930 (rather than through the interface modules 1934), and therefore each of the dedicated communication links is used to transmit only information and not power. Each interface module 1934 is then connected to the communication network 1976 which, in FIG. 32A, is implemented as two separate networks (e.g., a network dedicated for use with the interface modules 1934, and a separate J1939 network to connect to the electronic control units for the engine, transmission, anti-lock brake and central tire inflation systems).

In FIG. 32B, each interface module 1934 is connected to one or more drive controllers 1930 by way of a communication network for network control of the drive controllers 1930. The same information may be transmitted as in FIG. 32A except that the information is transmitted by way of the communication network. Because the AC bus assembly 1942 is connected directly to the drive controllers 1930, there is no need to transmit power from the interface modules 1934 to the drive controllers 1930. Each interface module 1934 is then connected to the communication network 1976. If only two network ports are included on the interface modules 1934, then information obtained from the electronic control units for the engine, transmission, anti-lock brake and central tire inflation systems may be obtained from other interface modules (not shown) connected to a J1939 network. Alternatively, the interface modules 1934 may be provided with a third network port.

The electric motors 1928 are appropriately sized traction motors. An exemplary embodiment of an electric traction vehicle 1910 employs an AC, three phase induction electric motor having a simple cast rotor, machine mount stator and sealed ball bearings. An induction motor is preferred because it avoids brushes, internal switches and sliding contact devices, with the rotor being the only moving part of the traction motor. Control of the electric motor 1928 is achieved by the interface module 1934 through the drive controller 1930 which is coupled to the motor 1928. The torque output of the motor 1928 is adjusted based on inputs received from the operator and transmitted to the interface module 1934 over the communication network 1976.

The drive wheels 1914 are rotatably mounted on the vehicle platform 1912 with an electric motor 1928 coupled to at least one wheel 1914. In one embodiment, the drive wheels 1914 are each be coupled to respective electric motors 1928, which in turn are each coupled to respective drive controllers 1930, which in turn are coupled to respective interface modules 1934.

Various embodiments of an electric traction vehicle 1910 are based on the number of wheels 1914 that are driven on the vehicle 1910. For instance, one embodiment includes a drive wheel 1914 coupled to an electric motor 1928, which in turn is coupled to a drive controller 1930, which in turn is coupled to an interface module 1934, which in turn is coupled to other interface modules (for other vehicle I/O) by way of the communication network 1976. The vehicle can also include four drive wheels 1914 coupled to four respective electric motors 1928, which in turn are coupled to four respective drive controllers 1930, which in turn are coupled to four respective interface modules 1934, which in turn are coupled to other interface modules and to each other by way of the communication network 1976. In the embodiment of FIG. 1, eight drive wheels 1914 are coupled to eight respective electric motors 1928, which in turn are coupled to eight respective drive controllers 1930, which in turn are coupled to eight respective interface modules 1934, which in turn are coupled to other interface modules and to each other by way of the communication network 1976. Other configurations may also be used, and the ratio of motors, wheels, servo drives and interface modules need not be one-to-one relative to each other. Thus, for example, each interface module 1934 may control one wheel, one axle, a tandem set of axles, or other set of wheels. As described in greater detail below, the vehicle 1910 can also include pairs of drive wheels 1914 which are driven in tandem by a respective one of the plurality of electric motors 1928. Typically, at least two of the wheels are steerable.

The torque output of each motor 1928 is adjusted to meet the requirements established in the associated interface module 1934 from the I/O status information. The electric motors 1928 may operate to produce electric torque to drive the drive wheels 1914 or may operate in a regenerative braking mode to provide power to the power storage unit 1922, as determined by inputs received from an operator of the electric traction vehicle 1910.

The electric traction vehicle 1910 can be configured with one or more modular independent coil spring suspensions for steerable and non-steerable wheel assemblies and driver and non-driver axles. Details of such modular independent coil spring suspensions can be found in U.S. Pat. Nos. 5,538,274, 5,820,150, and 6,105,984 incorporated herein by this reference, which are assigned to the assignee of the present invention.

The principal power unit 1916 and the power storage unit 1922 are mounted on the vehicle platform 1912. As previously noted, the principal power unit 1916 provides power for multiple electric motors 1928 coupled to individual drive wheels 1914. This simplifies the transmission of power to the wheels 1914 as compared to a non-electric vehicle by eliminating the torque converter, transmission, transfer case, and drive shafts. Further, because multiple electric motors 1928 are used, the horse power requirements of each electric motor 1928 are such that standard commercially available electric motors may be used even in the case of a heavy duty military vehicle.

The principal power unit 1916 includes a prime mover or engine 1918 coupled to a generator or alternator 1920. The prime mover 1918 can be a gas turbine or an internal combustion engine. The principal power unit 1916 can also be a fuel cell or a nuclear power device. The fuel cell may for example be a hydrogen-oxygen fuel cell that produces electrical power in the process of a chemical reaction that combines oxygen and hydrogen to create water. If a DC source is used, an inverter may be used to convert DC power from the DC source to AC power for the AC bus assembly 1942. In the preferred embodiment, the prime mover 1918 is a diesel engine optimized for operation at a constant speed (revolutions per minute). Operating the diesel engine at a constant, optimal speed eliminates inefficiencies associated with changing RPM levels during acceleration and deceleration, improves overall efficiency, and reduces emissions.

The generator/alternator 1920 is preferably a synchronous generator producing 460 to 480 volts, three phase, AC 60 Hz power for the electric traction vehicle 1910. However, it is contemplated that different sized generators or alternators can be coupled to the prime mover for purposes of generating either higher or lower electrical power. For instance, a single phase system can be utilized or a system that generates 720 volt power system can be used or a system that operates at a frequency other than 60 Hz, such as 50 Hz which is typical in European countries. It is also contemplated that the power generated by the principal power unit 1916 can be modified by appropriate auxiliary modules such as a step-down transformer to provide power to operate ancillary equipment on or associated with the electric traction vehicle 1910 such as pumps, instruments, tools, lights, and other equipment.

The AC bus assembly 1942 includes a plurality of phase conductors 1944. A first conductor 1946 having a first end 1948 and second end 1950 together with a second conductor 1952 having a first end 1954 and a second end 1956 can be configured together with a neutral 1964 to provide single phase power in one embodiment of the vehicle 1910. A third conductor 1958 having a first end 1960 and a second end 1962 can be used in conjunction with the first conductor 1946 and the second conductor 1952 to provide three phase power as shown in FIG. 1. The conductors 1944 can be stranded metal wire such as copper or aluminum sized and clad to transmit the power generation contemplated in the vehicle 1910 design. The conductors 1944 can also be solid metal bars, generally referred to as bus bars, composed of appropriate clad metals, such as copper or aluminum, as will be appreciated by one ordinarily skilled in the art.

Also connected to the AC power bus assembly 1942 is the power storage unit 1922, as previously mentioned. The power storage unit 1922 includes an electric power converter 1924 and an energy storage device 1926. The power storage unit 1922 can be configured to provide electric power above and beyond that required of the principal power unit 1916. The energy storage device 1926 can be electric capacitors, storage batteries, a flywheel, or hydraulic accumulators. The electric power converter 1924 can be configured to convert the AC power generated by the principal power unit 1916 to DC power and transfer such converted power to the storage device 1926. The electrical power converter 1924 can also convert the energy stored in the energy storage device 1926 back to AC power to augment and supplement the AC power generated by the principal power unit 1916 over the AC power bus assembly 1942. Applicants have determined that additional horsepower of short-term power can be provided into the AC power bus assembly 1942 over the phase conductors 1944 by discharge of an on-board capacitor or battery pack (energy storage device 1926) under control of the power storage unit 1922. (Depending on the application, the additional power may be in the range of 100-600 or more horsepower, such as 200-300 horsepower.) In one embodiment, the energy storage device 1926 is formed of a bank of ultracapacitors, such as the PC 2500 ultracapacitor available from Maxwell Technologies, 9244 Balboa Avenue San Diego, Calif. 92123. These devices provide a high electrical energy storage and power capacity and have the ability to deliver bursts of high power and recharge rapidly from an electrical energy source/sink over hundreds of thousands of cycles.

An advantage constructing the energy storage device 1926 of capacitors is that capacitors are relatively easy to discharge. Therefore, it is possible to discharge the energy storage device 1926 when maintenance is to be performed on the vehicle 1910 to avoid electrocution of maintenance personnel. In FIG. 25, the power storage unit 1922 (including the energy storage device 1926) operates under the control of one of the interface modules 1934. In one embodiment, the interface module 1934 is used to discharge the energy storage device responsive to operator inputs. For example, a capacitor discharge switch may be provided in the cab of the vehicle 1910 and/or near the energy storage device 1926 and coupled to a nearby interface module 1934. When the operator activates the switch, the interface modules 1934 cooperate responsive to ensure that no electrical power is being coupled to the AC bus assembly 1942 by the generator 1920 and any other power generating devices, such that the energy storage device 1926 is the only power source coupled to the AC bus assembly 1942 (e.g., when the prime mover or engine 1918 is not moving or is not coupled to the AC bus assembly 1942, the generator 1920 does not provide electrical power to the AC bus assembly 1942). Therefore, any stored electrical power in the energy storage device 1926 dissipates to power consuming devices that are coupled to the AC bus assembly 1942. A variety of power consuming devices may be provided for this purpose. For example, an energy dissipation device 1932 (described in greater detail below) may be used for this purpose. The dissipating capacity (e.g., resistor size and power ratings) of the energy dissipation device may be determined as a function of the desired amount of discharge time. Other power consuming devices already coupled to the AC bus assembly 1942, such as an engine cooling fan, may also be used. In this configuration, the interface module 1934 to which the engine cooling fan is connected turns on the engine cooling fan when it is determined that the operator input at the capacitor discharge switch has been received.

The power storage unit 1922 may be coupled to the communication network 1976 and controlled by the interface module 1934. The combined electrical power from the principal power unit 1916 and the power storage unit 1922 will all be available on the AC power bus assembly 1942 for use by the electric motors 1928 or by any other module 1984 or auxiliary module 1986 as determined by the operator at the user interface 1936 of the interface module 1934.

In operation, the power storage unit 1922 receives power from the principal power unit 1916 over conductors 1944 of the AC power bus assembly 1942. The power received is converted into the appropriate energy mode required by the energy storage device 1926 and maintained in the energy storage device 1926 until required during the operation of the vehicle 1910. If the principal power unit 1916 is not functioning for any reason, the energy in the power storage unit can be utilized to operate, for a given period of time, the vehicle 1910 or any of the modules 1984 or auxiliary modules 1986 mounted on the vehicle 1910. In the context of a military vehicle, the power storage unit 1922 may also be used in stealth modes of operation to avoid the noise associated with the prime mover (e.g., diesel engine) 1918 and the generator 1920.

Energy storage recharge of the power storage unit 1922 by the principal power unit 1916 begins automatically and immediately after the vehicle 1910 arrives at its destination and continues during the vehicle's return run to its original location. The state of charge of the power storage unit 1922 is maintained between missions by a simple plug connection to a power receptacle in the vehicle's garage or storage location, which receptacle will automatically disconnect as the vehicle 1910 leaves such site. The power storage unit 1922 can also receive energy generated by the electric motors 1928 when the motors are configured in a regeneration mode in which case they function as a generator. Such functionality is utilized in a braking procedure for the vehicle as determined by the operator at a user interface 1936 (see FIG. 26). The electric motor 1928 and AC power bus assembly 1942 can also be configured to regenerate power back to the principal power unit 1916.

Figure 26:
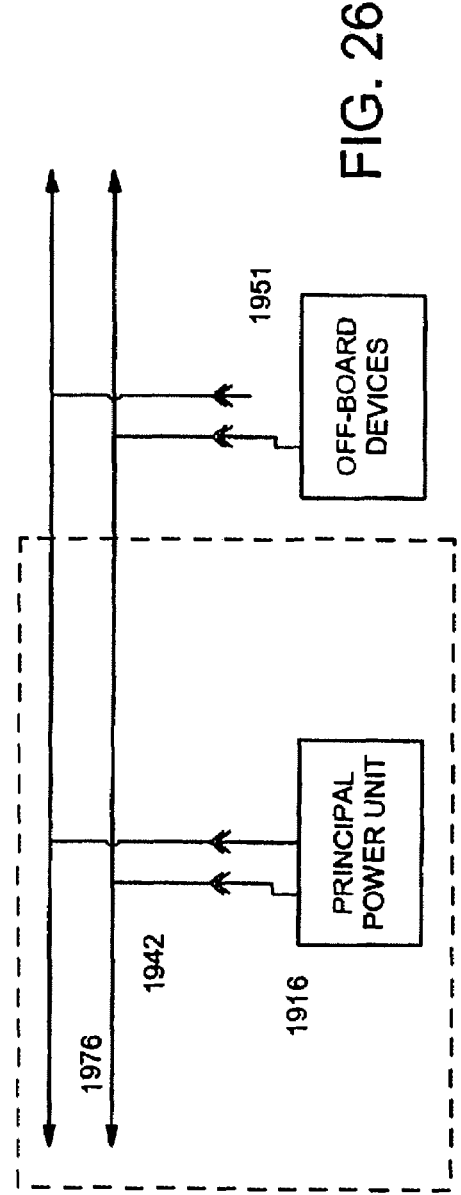
FIG. 26 is a schematic diagram showing the vehicle of FIG. 25 being used as a mobile electric power plant.

As shown in FIG. 26, the vehicle 1910 can also serve as an on-site power source for off-board electric power consuming devices 1951. For example, in the context of a military vehicle, the vehicle 1910 can serve as a mobile electric generator. When the vehicle is stationary, the electric motors 1928 consume substantially zero power. Therefore, electric power that would otherwise be used to drive movement of the vehicle 1910 can be supplied to off-board equipment. In the context of an ARFF vehicle, if an airport loses electricity due to a failure in the power grid, an ARFF vehicle that implements the system described herein can be used to generate power for the airport by connecting the power bus for the airport to the AC bus assembly 1942 through the use of a suitable connector. Likewise, at the scene of a fire, the AC bus assembly 1942 can be used to provide power for scene lighting. In one preferred embodiment, the power generating capacity of the vehicle 1910 is in the neighborhood of about 500 kilowatts of electricity, which is enough to power approximately 250-300 typical homes. Depending on the size of the vehicle 1910 and the principal power unit 1916, the power generating capacity may be smaller (e.g., 250 kilowatts) or larger (e.g., 750 kilowatts). Additionally, because the AC bus assembly 1942 provides 480V, three phase, AC 60 Hz power, which is commonly used in industrial settings, there is no need to convert the power from the AC bus assembly 1942. In this regard, in FIG. 26, the off-board power-consuming devices 1951 are shown not to be connected to the communication network 1976, because the power provided by the AC bus assembly 1942 can be provided to a variety of standard devices, including devices which are not specifically designed for use with the vehicle 1910.

Preferably, an energy dissipation device 1932 is coupled to the AC bus assembly 1942 and the communication network 1976. If it is determined that the principal power unit 1916 or the electric motors 1928 or any other auxiliary module 1986 generating too much power or are not utilizing sufficient power, the excess power can be dissipated through the energy dissipation device 1932. An example of an energy dissipation device 1932 is a resistive coil that may be additionally cooled by fans or an appropriate fluid. Another example of an energy dissipation device 1932 is a steam generator which utilizes excess heat generated in the vehicle to heat water to produce steam. Another example of an energy dissipation device is to have the system back feed the generator to act as a motor and use the engine as an air pump to pull power out of the system. The energy dissipation device, for example, may be used during regenerative braking when the level of charge in the capacitor bank forming the energy storage device 1926 is near its peak.

Figure 27:
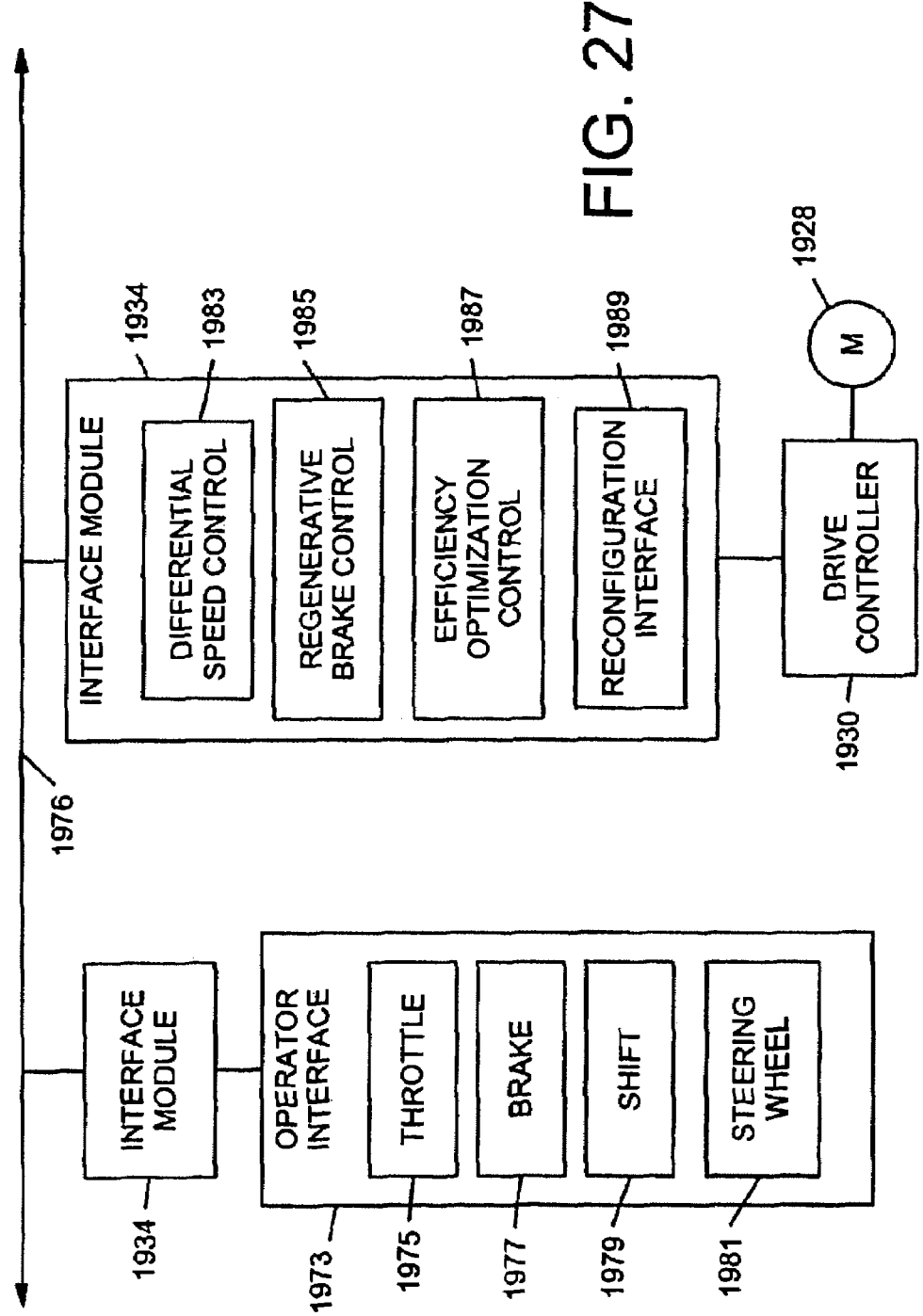
FIG. 27 is a schematic diagram showing selected aspects of a control system of FIG. 25 in greater detail.

Referring now to FIG. 27, selected aspects of the vehicle 1910 of FIG. 25 are shown in greater detail. The vehicle 1910 further comprises an operator interface 1973 which includes a throttle pedal 1975, brake pedal 1977, shift control 1979, and steering wheel 1981. In FIG. 27, these input devices are shown as being connected to a common interface module 1934 which is connected to the communication network 1976 along with the interface modules 1934 coupled to the electric motors 1928 (only one of which is shown in FIG. 26).

Although the input devices 1975-1981 are shown as being coupled to a common same interface module, the input devices may also be coupled to different interface modules. The operator interface may also receive inputs from other input devices to raise or lower the vehicle, lock the suspension, control a load-handling system, and control vehicle operation in stealth modes of operation (e.g., operating exclusively on the power storage unit 1922). The operator interface 1973 may include a display that displays information to the operator such as speed, charge level of the storage unit 1922, generator efficiency, direction of travel, alarm status, fuel economy, temperatures, pressures, and data logging information.

Each interface module 1934 receives the I/O status information from the operator interface 1973. For those interface modules that are connected to a respective drive controller 1930 and electric motor 1928, the I/O status information from the operator interface 1973 is processed to provide control signals to control the electric motor 1928. This process is shown in FIG. 27.

Figure 28:
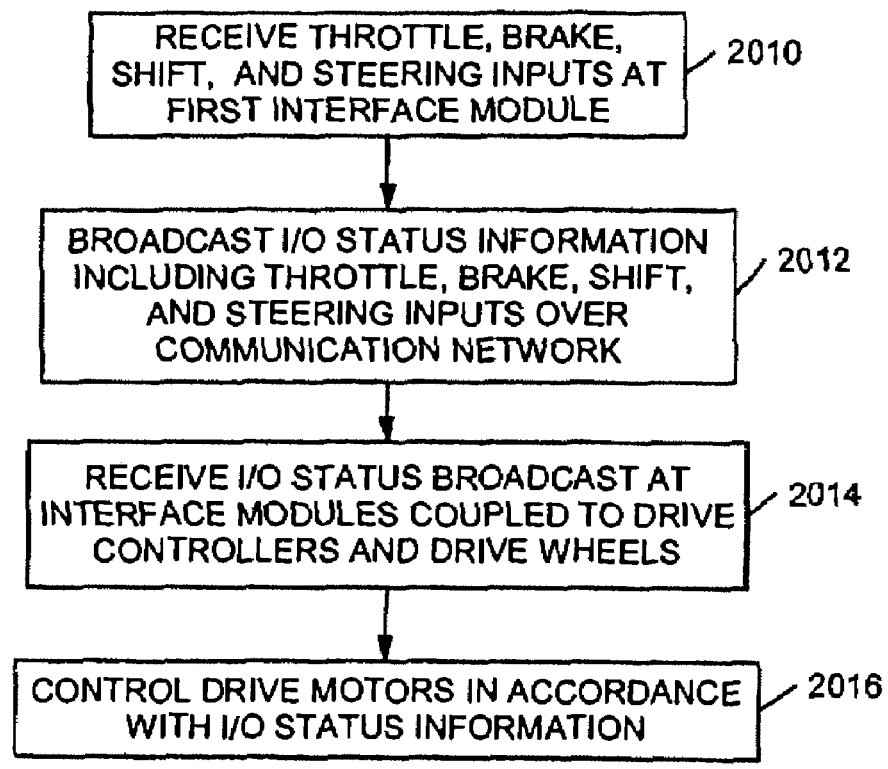
FIG. 28 is a flowchart showing the operation of a control system of FIG. 25 in greater detail.
Figure 30:
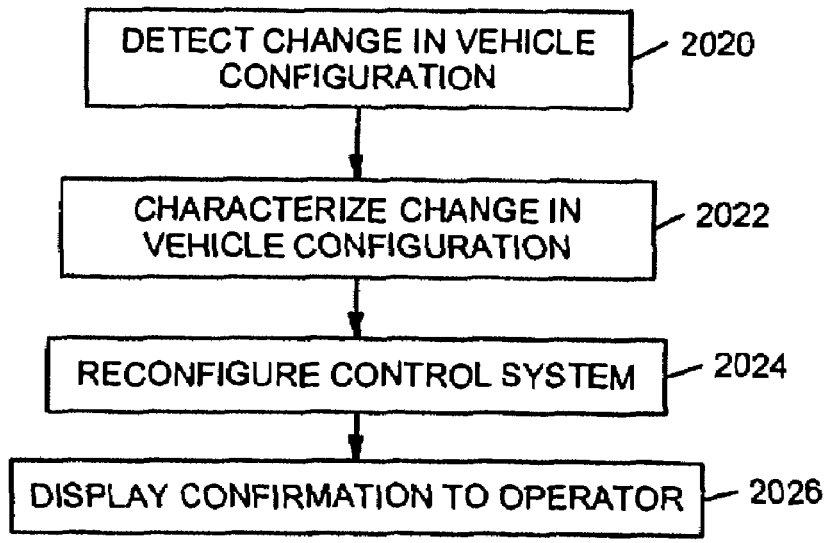
FIG. 30 is a flowchart showing another aspect of the operation of a control system of FIG. 25 in greater detail.

Referring now to FIG. 28, at step 2010, throttle, brake, shift, and steering inputs are received from the operator at the interface module 1934 which is connected to the operator interface 1973. At step 2012, the throttle, brake, shift and steering inputs are transmitted by way of the communication network 1976 (during I/O status broadcasts as previously described). At step 2014, this information is received at each of the remaining interface modules 1934. At step 2016, the interface modules 1934 that control the electric motors 1928 use the throttle, brake, shift and steering inputs to control the electric motors 1928. To this end, the interface modules 1934 determine a speed or torque command and provide this command to the drive controller 1930. Other information, such as vehicle weight, minimum desired wheel speed, wheel slip control parameters, and other information may also be used. Although the vehicle 1910 does not include a mechanical transmission, the shift input from the shift input device 1979 may be used to cause the electric motors 1928 to operate at different operating points depending on a status of the shift input device, with each of the operating points corresponding to different torque production capabilities (or different tradeoffs between vehicle responsiveness/acceleration capability and motor efficiency).

Each interface module 1934 preferably includes a number of control subprograms, including a subprogram 1983 for differential speed control, a subprogram 1985 for regenerative brake control, a subprogram 1987 for efficiency optimization control, and a configuration interface 1989. These programs provide for further control of the torque/speed command given by each interface module 1934 to the respective drive controller 1930.

The differential speed control program 1987 accepts the steering angle as an input and controls the motor speed of each motor 1928 such that the wheels 1914 rotate at slightly different speeds during vehicle turning maneuvers. The differential speed control program 1987 is an electronic implementation of a mechanical differential assembly. The steering angle input may also be used by another interface module 1934 to control a steering mechanism of the vehicle 1910 to thereby control a direction of travel of the vehicle 1910. Preferably, steering control takes into account other I/O status information (such as vehicle speed) and is optimized to avoid vehicle slippage ("scrubbing") during turn maneuvers. The differential speed control program 1987 monitors motor torque output along with other system parameters such that the speed difference between motors does not go above a predefined limit. This can be controlled both side by side and front to back and combinations of both. By commanding torque and monitoring and adjusting for speed difference, optimal tractive force can be put to ground in any traction condition.

Regenerative brake control program 85 controls the motor 1928 such that the motor provides a braking action to brake the vehicle 1910 in response a regeneration/auxiliary signal is received. For example, a signal may be received from a brake pedal request (the brake pedal 1977 is pressed), no TPS count, or other user controlled input/switch. This causes the motor 1928 to act as a generator to regenerate power back to the power storage unit 1922 or the principal power unit 1916 via the AC bus assembly 1942. In addition to regenerative braking, a standard anti-lock brake system is also used.

The efficiency optimization control program 87 controls motor speed and torque conditions to allow a first subset of the motors 1928 to operate at an optimal power for a particular speed, and a second subset of the motors 1928 to operate in a regenerative mode. Having one set of motors operate 1928 at an optimal power for a particular speed and a second set of motors 1928 operate in a regenerative mode is more efficient and draws less net power than having all of the motors 1928 operating at a non-optimal speed. Alternative power matching schemes may also be used in which optimum efficiency for some of the motors 1928 is reached by having some of the remaining motors 1928 operate in a non-torque producing mode.

Configuration interface program 1989 allows for reconfiguration of the vehicle 1910 depending on which types of auxiliary modules are mounted to the vehicle 1910. The configuration program 1989 detects what type of auxiliary modules are connected to the vehicle, and adjusts the configuration of the control program executed by the interface modules 1934 to take into account the particular configuration of the vehicle 1910 as determined by which auxiliary modules are present.

In particular, in the preferred embodiment, the principal power unit 1916, the power storage unit 1922, and the energy dissipation device 1932 are provided as auxiliary modules 1984 that are removably mounted on the vehicle platform and are removably connected to the communication network 1976 and the AC bus assembly 1942 by way of a suitable connector assembly. Other auxiliary modules 1986 may also be provided. An auxiliary module 1986 can be any type of equipment or tool required or associated with the function and operation of the vehicle 1910. For example, the auxiliary module can be a pump, a saw, a drill, a light, etc. The auxiliary module 1986 is removably connected to the communication network 1976 and the AC bus assembly 1942. A junction 1988 is used to facilitate the connection of the modules to the communication network 1976 and the AC power bus assembly 1942 and multiple junctions 1988 are located at convenient locations throughout the vehicle 1910. The junctions 1988 can accommodate various types of connections such as quick connectors, nuts and bolts, solder terminals, or clip terminals or the like. The junction 1988 can include a connector to accommodate connection to the communication network 1976 and/or the AC bus assembly 1942. Additional auxiliary modules can be added to the vehicle 1910 as circumstances and situations warrant.

Figure 29:
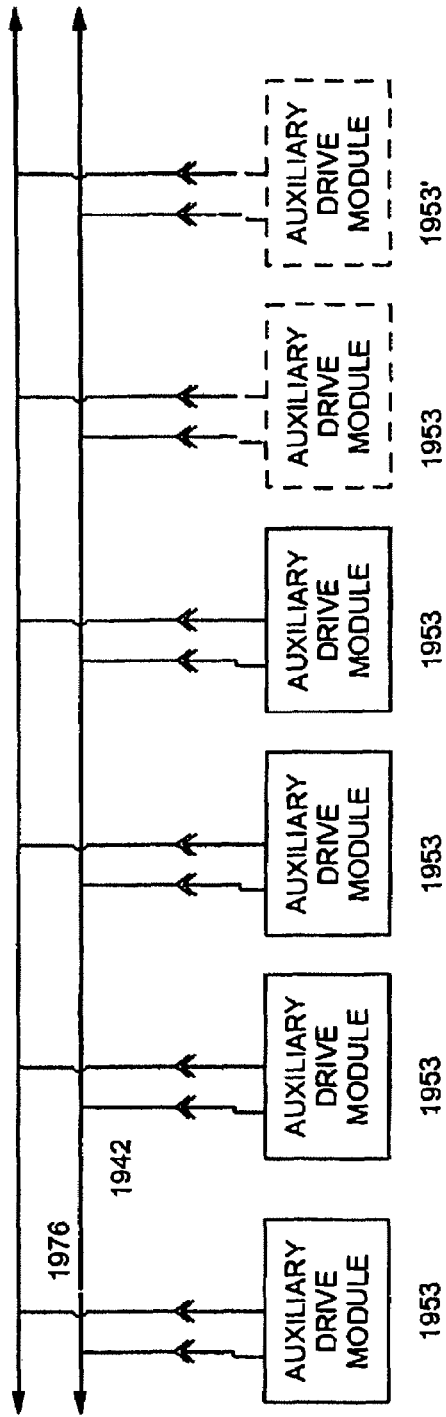
FIG. 29 is a schematic diagram showing auxiliary drive modules used in the vehicle of FIG. 25.

In the preferred embodiment, and as shown in FIG. 29, auxiliary drive modules 1953 are used that each include a respective one of the drive wheels 1914, a respective one of the electric motors 1928, a respective one of the drive controllers 1930, and a respective one of the interface modules 1934. Like the other auxiliary modules discussed above, the auxiliary drive modules 1953 are capable of being removed, replaced, and added to the vehicle 1910. To this end, each auxiliary drive module includes an electrical connector that mates with a compatible electrical connector one the vehicle platform 1912 and a mechanical mounting system (e.g., a series of bolts) that allows the auxiliary drive module 1953 to be quickly mounted to or removed from the vehicle 1910. The electrical connector connects the interface module 1934 to a communication network 1976 and connects the drive controller 1930 to the AC bus assembly 1942. Therefore, if one auxiliary drive module 1953 malfunctions, the auxiliary drive module 1953 can be removed and replaced with a properly functioning auxiliary drive module 1953. This allows the vehicle 1910 to return immediately to service while the inoperable drive module is serviced. This arrangement also allows the same vehicle to be provided with different drive capacities depending on intended usage. For example, under one usage profile, the vehicle 1910 may be provided with four auxiliary drive modules 1953. Under a second usage profile, the vehicle 1910 may be provided with two additional auxiliary drive modules 1953' for extra drive capacity. Additionally, the vehicle platform 1912 is preferably a generic vehicle platform that is used with several different types of vehicles having different application profiles requiring different drive capacities. In this regard, it may also be noted that the principal power unit 1916 is also capable of being removed and replaced with a principal power unit 1916 with a larger electric generation capacity. This feature is therefore advantageous in that auxiliary drive modules 1953 are capable of being added to and removed from the vehicle as a unit to achieve a corresponding increase or decrease in the drive capacity of the vehicle 1910, thereby giving the vehicle 1910 a reconfigurable drive capacity. As previously indicated, the system can be configured to have one of the interface modules 1934 control a single drive wheel 1914, an entire axle assembly (one or two motor configuration) as well as a tandem axle assembly (one and two motor axle configurations), as well as other permutations and combinations.

Referring to FIG. 28, FIG. 28 shows the operation of the configuration program 1989. At step 2020, it is detected that there has been a change in vehicle configuration. The auxiliary module may be any of the auxiliary modules described above. Step 2020 comprises detecting that an auxiliary module has been added in the case of an added auxiliary module, and comprises detecting that an auxiliary module has been removed in the case of a removed auxiliary module. If an auxiliary module has been rendered in operable (e.g., one of the electric motors 1928 has failed), then step 2020 comprises detecting that the inoperable auxiliary module has failed.

At step 2022, the configuration change is characterized. For example, if an auxiliary module has been added or removed, the type and location of the added/removed auxiliary module is determined. If one auxiliary module has been replaced with another auxiliary module, the location at which the change was made as well as the module type of the added and removed auxiliary modules is determined. In the case where the auxiliary module comprises an interface module 1934, the different characteristics of the different auxiliary modules may be stored in the respective interface modules 1934. As a result, step 2022 may be performed by querying the interface module 1934 of the removed auxiliary module (before it is removed) and by querying the interface module of the added auxiliary module.

At step 2024, the vehicle 1910 is reconfigured to accommodate the added auxiliary drive module. Step 2024 comprises updating control algorithms in the interface modules 1934. For example, if two auxiliary drive modules are added, the control algorithms may be updated to decrease the horsepower produced by the original motors 1928 in response to a particular throttle input to take into account the additional horsepower provided by the added electric motors 1928. Alternatively, if one of the electric motors 1928 fails or is otherwise rendered inoperable, then the updating compensates for less than all drive wheels being driven by causing the remaining electric motors to be controlled to provide additional horsepower. This gives the vehicle 1910 different modes of operation, for example, a first mode of operation in which the electric motors are controlled such that all of the plurality of drive wheels are driven, and a second mode of operation in which the electric motors are controlled such that less than all of the plurality of drive wheels are driven.

At step 2026, a confirmation is sent to the operator of the vehicle 1910 via a display of the operator interface 1973 to confirm that the vehicle has been reconfigured. It may also be desirable to transmit this information to other systems. For example, one of the interface modules 1934 may be provided with a wireless modem, and the change in configuration information may be transmitted wireless to an off-board computer using a radio frequency (RF) communication link. Indeed, any of the information stored in any of the interface modules or any of the other vehicle computers (e.g., engine control system, transmission control system, and so on) may be transmitted to an off-board computer system in this manner to allow off-board vehicle monitoring and/or off-board vehicle troubleshooting. The transfer of information may occur through a direct modem link with the off-board vehicle computer or through an Internet connection.

Thus, the vehicle 1910 has a modular construction, with the principal power unit 1916, the power storage unit 1922, the energy dissipation device 1932, the auxiliary drive modules 1953, other drive modules 1984 and 1986, and so on, being provided as modules that can be easily added to or removed from the vehicle. Any number of such modules can be added and is limited only by the extent to which suitable locations which connections to the communication network and AC bus assembly 1942 exist on the vehicle 1910. Once such a device is added, the control system is automatically reconfigured by the interface modules 1934.

Figure 31A:
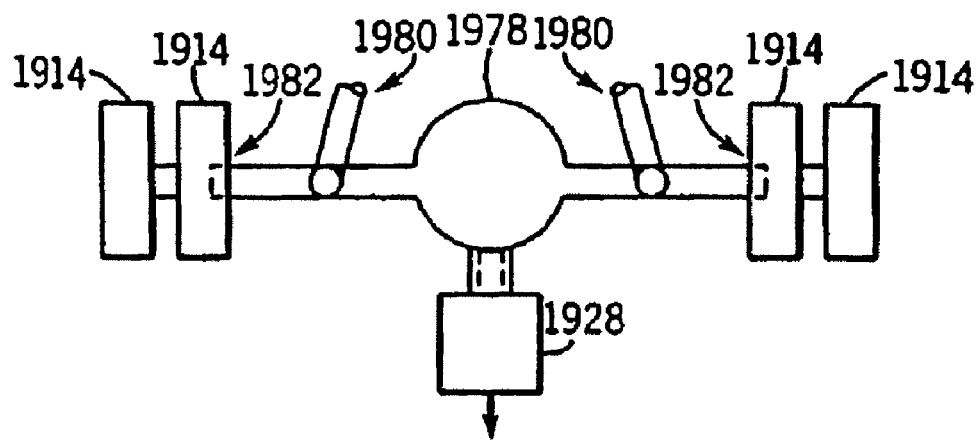
FIG. 31A is a top plan view illustration of an exemplary embodiment of a differential assembly coupled to an electric motor for driving at least two wheels and supported by a suspension assembly.
Figure 31B:
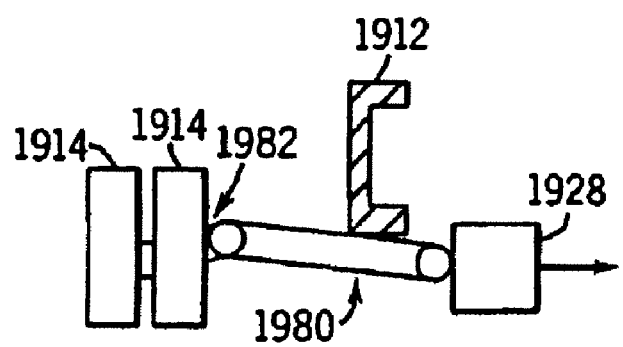
FIG. 31B is an end view partial sectional view of an exemplary embodiment of an electric traction vehicle support structure coupled to a suspension assembly which suspends at least one wheel relative to the vehicle support structure.

FIG. 25 illustrates the wheels 1914 being driven directly by an electric motor 1928 through an appropriate wheel-end reduction assembly 1982 if necessary. Referring now to FIGS. 31A-31B, a wheel-end reduction assembly 1982 can also couple the wheels 1914 to a differential assembly 1978 via drive shafts. A plurality of wheel-end reduction assemblies 1982 can couple the wheels 1914 to their respective electric motors 1928. Another embodiment of the vehicle 1910 includes a differential assembly 1978 coupled to the electric motor 1928 for driving at least two wheels 1914 as shown in FIG. 27. Additional differential assemblies 1978, such as three assemblies 1978, with each differential assembly coupled to an electric motor 1928 for driving at least two wheels, can also be configured in the vehicle 1910.

Figure 33:
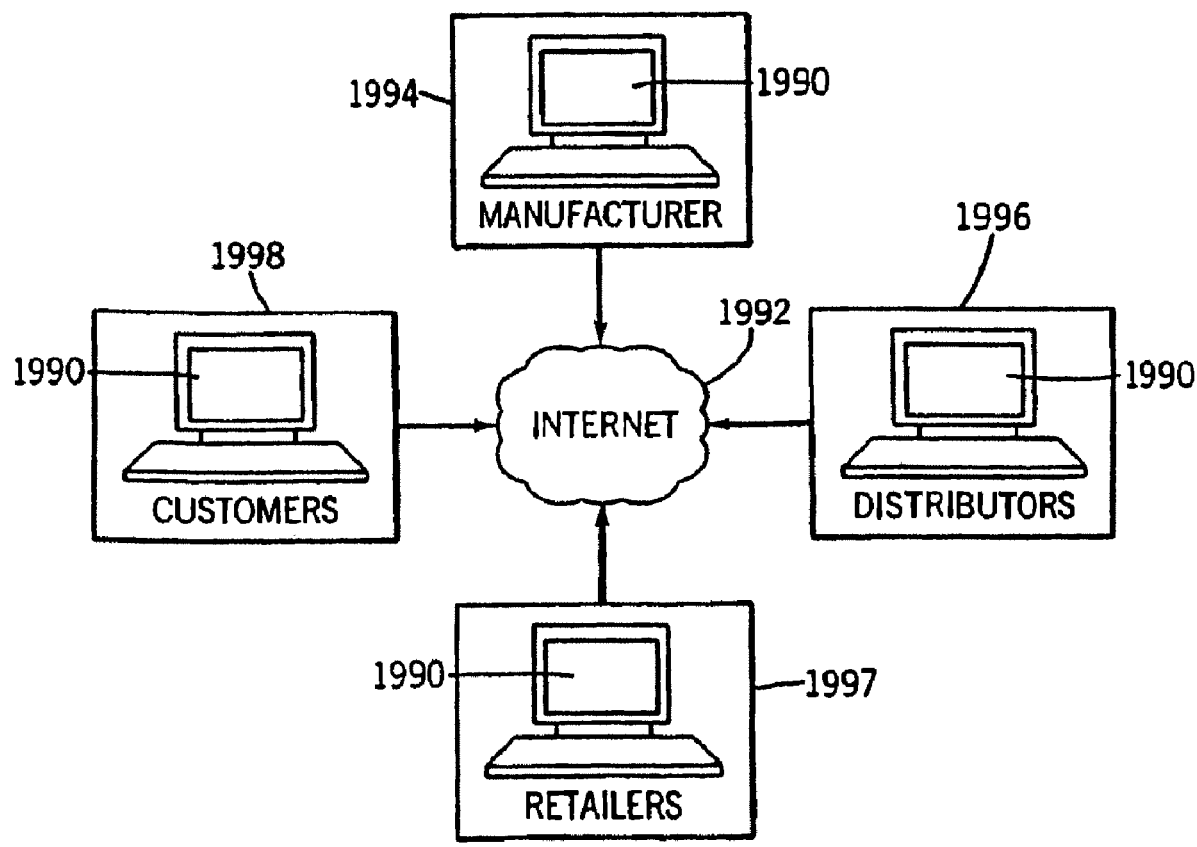
FIG. 33 is a schematic block diagram illustrating various entities connected to the Internet for the transmission of data indicative of an electric traction vehicle.

Referring now to FIG. 33, a method of transferring data indicative of an electric traction vehicle 1910 to potential customers over the Internet 1992 includes obtaining information on an electric traction vehicle 1910 including dates, prices, shipping times, shipping locations, general shipping data, module type, inventory, specification information, graphics, source data, trademarks, certification marks and combinations thereof. The method further includes entering the information on to a terminal 1990 that is operationally connected to an Internet server. Terminal 1990 may be microprocessor, a computer, or other conventionally known device capable of operationally connecting to a conventionally known Internet server. The method further includes transmitting to the information from terminal 1990 to the Internet server that is operationally connected to Internet 1992. Information be transmitted to the internet from the interface modules 1934 and may include any of the information stored in the interface modules 1934 or any other vehicle computer, as previously noted. The method allows manufacturers 1994, distributors 1996, retailers 1997 and customers 1998, throughout the use of terminals 1990, to transmit information, regarding the electric traction vehicle 1910 and the potential sale of the electric traction vehicle 1910 to customers, to one another individually, collectively or by any combination thereof.

Thus, there is provided an electric traction vehicle of modular design with the modules interconnected by an AC bus assembly and a data bus network. Other embodiments using other types of vehicles are possible. For example, an electric traction vehicle using a modular component design can be utilized as a fire truck for use at an airport or one that can negotiate severe off-road terrain. The vehicle can also be used in a military configuration with the ability to negotiate extreme side slopes and negotiate extreme maneuvers at high speeds. The modular aspect of the vehicle architecture will allow for optimum placement of components to maximize performance with regard to center of gravity which will facilitate its operational capabilities.

Throughout the specification, numerous advantages of preferred embodiments have been identified. It will be understood of course that it is possible to employ the teachings herein so as to without necessarily achieving the same advantages. Additionally, although many features have been described in the context of a vehicle control system comprising multiple modules connected by a network, it will be appreciated that such features could also be implemented in the context of other hardware configurations. Further, although various figures depict a series of steps which are performed sequentially, the steps shown in such figures generally need not be performed in any particular order. For example, in practice, modular programming techniques are used and therefore some of the steps may be performed essentially simultaneously. Additionally, some steps shown may be performed repetitively with particular ones of the steps being performed more frequently than others. Alternatively, it may be desirable in some situations to perform steps in a different order than shown.

Many other changes and modifications may be made to the present invention without departing from the spirit thereof.

What is claimed is:

1. An electric traction vehicle comprising:
a vehicle platform;
a plurality of drive wheels coupled to the vehicle platform;
a plurality of electric motors coupled to respective ones of the plurality of drive wheels, the plurality of electric motors being used to drive the plurality of drive wheels;
an electrical connector which is configured to be used to allow an electrical power-consuming system off-board the vehicle to be connected to the vehicle and draw electrical power from the vehicle when a power consumption for the plurality of electric motors is substantially zero;
a power storage unit;
a power source coupled to the vehicle platform, the power source being used to provide electrical power to the plurality of electric motors and the electrical connector, the power source being configured to supply power to the electrical power-consuming system off-board the vehicle which are not specifically designed to be supplied power from the power source;
a communication network interconnecting a plurality of drive controllers associated with respective one of the plurality of the electric motors; and
microprocessor-based interface modules coupled to each other by way of the communication network; each one of the microprocessor-based interface modules being configured to store I/O information for input and output devices coupled to the other microprocessor-based interface modules, wherein the microprocessor-based interface modules are configured to control via the communication network an energy supply from the power storage unit;
wherein the vehicle is configured to provide at least about 250 kilowatts of power to the off-board power-consuming system.

2. The vehicle of claim 1, wherein the communication network is configured to transmit data related to the electric power-consuming system off-board the vehicle.

3. The vehicle of claim 1, wherein the electric power-consuming system off-board the vehicle is an airport.

4. The vehicle of claim 1, wherein the electric power-consuming system off-board the vehicle is scene lighting.

5. The vehicle of claim 1, wherein the power source provides three phase AC power to the plurality of electric motors and the electrical connector.

6. The vehicle of claim 1, wherein the plurality of electric motors are induction motors.

7. The vehicle of claim 1, wherein the power source provides at least about 750 kilowatts of power to the electrical connector.

8. The vehicle of claim 1, wherein the vehicle is a hybrid electric vehicle and the power source comprises a diesel engine coupled to an electric generator.

9. The vehicle of claim 1, wherein the power source comprises a fuel cell coupled to an inverter, the inverter being used to convert DC power from the fuel cell to AC power for the plurality of electric motors and the electrical connector.

10. An electric traction vehicle comprising:
a vehicle platform;
a plurality of drive wheels coupled to the vehicle platform;
a plurality of electric motors coupled to respective ones of the plurality of drive wheels, the plurality of electric motors being used to drive the plurality of drive wheels;
a communication network;
wherein a plurality of microprocessor-based interface modules coupled to each other by way of the communication network, each of the plurality of microprocessor-based interface modules being configured to store I/O information for input and output devices coupled to the remaining microprocessor-based interface modules, the plurality of microprocessor-based interface modules also being coupled to the plurality of electric motors and being configured to process input information received by way of the communication network to control the plurality of electric motors;
an electrical connector which is configured to be used to allow an electrical power-consuming system off-board the vehicle to be connected to the vehicle and draw AC power from the vehicle when a power consumption for the plurality of electric motors is substantially zero via a DC power to AC power converter;
a power storage unit;
a power source coupled to the vehicle platform, the power source being used to provide AC power to the plurality of electric motors and the electrical connector, the power source being configured to supply power to the electrical power-consuming system off-board the vehicle which are not specifically designed to be supplied power from the power source;

wherein the communication network interconnecting a plurality of drive controllers associated with respective one of the plurality of the electric motors;

wherein the microprocessor-based interface modules are configured to control via the communication network an energy supply from the power storage unit;

wherein the power source provides AC power to the plurality of electric motors by way of an AC bus assembly;

wherein the power source provides three phase AC power to the plurality of electric motors and the electrical connector; and wherein the communication network is configured to transmit data related to the electric power-consuming system off-board the vehicle.

11. The vehicle of claim 10, wherein the power source comprises a fuel cell coupled to an inverter, the inverter being used to convert DC power from the fuel cell to AC power for the plurality of electric motors and the electrical connector.

12. The vehicle of claim 10, wherein the electrical power-consuming system off-board the vehicle is an airport.

13. The vehicle of claim 10, wherein the electrical power-consuming system off-board the vehicle is scene lighting.

14. The vehicle of claim 10, wherein the power storage unit being configured to receive energy generated by one or more of the plurality of electric motors when one or more of the plurality of electrical motors is in regeneration mode.

15. The vehicle of claim 14, wherein the plurality of electrical motors are traction motors.

16. The vehicle of claim 10, wherein the power source provides at least about 250 kilowatts of AC power to the electrical connector.

17. The vehicle of claim 10, wherein the power source provides at least about 750 kilowatts of AC power to the electrical connector.

18. The vehicle of claim 10, wherein the vehicle is a hybrid electric vehicle and the power source comprises a diesel engine coupled to an electric generator.

19. An electric traction vehicle comprising:
a vehicle platform;
a communication network;
wherein a plurality of microprocessor-based interface modules coupled to each other by way of the communication network, each of the plurality of microprocessor-based interface modules being configured to store I/O information for input and output devices coupled to the remaining microprocessor-based interface modules, the plurality of microprocessor-based interface modules also being coupled to the plurality of electric motors and being configured to process input information received by way of the communication network to control the plurality of electric motors;
a plurality of drive wheels coupled to the vehicle platform;
a plurality of electric motors coupled to respective ones of the plurality of drive wheels, the plurality of electric motors being used to drive the plurality of drive wheels;
an electrical connector which is used to allow an electrical power-consuming system off-board the vehicle to be connected to the vehicle and draw AC power from the vehicle;
a power storage unit; and
a power source coupled to the vehicle platform, the power source being used to provide AC power to the plurality of electric motors and the electrical connector;

wherein the power source provides AC power to the plurality of electric motors by way of an AC bus assembly;

wherein the power source provides three phase AC power to the plurality of electric motors and the electrical connector;

wherein the electrical power-consuming system off-board the vehicle is not specifically designed to be supplied power from the vehicle;

wherein the communication network is configured to transmit data related to the electric power-consuming system off-board the vehicle; and wherein the vehicle is configured to provide at least about 250 kilowatts of power to the off-board power-consuming system.

20. The vehicle of claim 19, wherein the power source comprises a fuel cell coupled to an inverter, the inverter being used to convert DC power from the fuel cell to AC power for the plurality of electric motors and the electrical connector.

21. An electric traction vehicle comprising:
a vehicle platform;
a communication network;
a plurality of drive wheels coupled to the vehicle platform;
a plurality of electric motors coupled to respective ones of the plurality of drive wheels, the plurality of electric motors being used to drive the plurality of drive wheels;
an AC bus assembly which provides AC power to the plurality of electric motors;
an electrical energy storage device which is configured to provide power to the plurality of electric motors using the AC bus assembly;
an electrical connector configured to be used to allow an electrical power-consuming system off-board the vehicle to be connected to the vehicle and draw AC power from the vehicle; and
a power source configured to provide power to the plurality of electric motors using the AC bus assembly, the power source also being configured to provide power to the electrical energy storage device;
microprocessor-based interface modules coupled to each other by way of the communication network; each one of the microprocessor-based interface modules being configured to store I/O information for input and output devices coupled to the other microprocessor-based interface modules, wherein the microprocessor-based interface modules are configured to control via the communication network an energy supply from the electrical energy storage device;
wherein the electrical energy storage device is configured to be discharged using an energy dissipation device other than the plurality of electric motors, the energy dissipation device being coupled to the AC bus assembly;
wherein the communication network is configured to transmit data related to the electric power-consuming system off-board the vehicle; and
wherein the electrical power-consuming system off-board the vehicle is not specifically designed to be supplied power from the vehicle.

22. The vehicle of claim 21, comprising a user input device which is used to selectively discharge the electrical energy storage device using the energy dissipation device and wherein the electrical power-consuming system off-board the vehicle is an airport.

23. The vehicle of claim 21, wherein the electrical power-consuming system off-board the vehicle is scene lighting and wherein the power source includes a diesel engine coupled to an electric generator which is used to provide power to the electrical energy storage device.

24. The vehicle of claim 21 wherein the energy dissipation device includes an engine fan.

25. The vehicle of claim 19, wherein the vehicle is a hybrid electric vehicle and the power source comprises a diesel engine coupled to an electric generator.

26. The vehicle of claim 19, wherein the electrical power-consuming system off-board the vehicle is an airport.

27. The vehicle of claim 19, wherein the electrical power-consuming system off-board the vehicle is scene lighting.

28. The vehicle of claim 19, wherein the power source provides at least 750 kilowatts of AC power to the electrical connector.

\* \* \* \* \*